(12) United States Patent
Fukushima et al.

(10) Patent No.: US 11,368,093 B2
(45) Date of Patent: Jun. 21, 2022

(54) SWITCHING POWER SUPPLY DEVICE

(71) Applicant: ROHM Co., LTD., Kyoto (JP)

(72) Inventors: Shun Fukushima, Kyoto (JP); Yosuke Fukumoto, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 93 days.

(21) Appl. No.: 17/026,595

(22) Filed: Sep. 21, 2020

(65) Prior Publication Data

US 2021/0091671 A1 Mar. 25, 2021

(30) Foreign Application Priority Data

Sep. 19, 2019 (JP) .............................. JP2019-170255

(51) Int. Cl.
*H02M 3/158* (2006.01)
*H02M 1/00* (2006.01)

(52) U.S. Cl.
CPC ....... *H02M 3/1588* (2013.01); *H02M 1/0025* (2021.05); *H02M 1/0032* (2021.05)

(58) Field of Classification Search
CPC . H02M 3/1588; H02M 1/0032; H02M 1/0025
See application file for complete search history.

(56) References Cited

U.S. PATENT DOCUMENTS

| | | | |
|---|---|---|---|
| 7,382,114 B2 * | 6/2008 | Groom | H02M 3/157 361/18 |
| 10,320,292 B2 * | 6/2019 | Fukushima | H02M 3/1588 |
| 10,879,811 B2 * | 12/2020 | Fukushima | H02H 7/1213 |
| 11,050,348 B2 * | 6/2021 | Fukushima | H02M 3/158 |
| 2017/0279359 A1 * | 9/2017 | Goncalves | H02M 1/088 |

FOREIGN PATENT DOCUMENTS

| | | |
|---|---|---|
| JP | 2018107930 A | 7/2018 |
| JP | 2018107931 A | 7/2018 |

* cited by examiner

*Primary Examiner* — Kyle J Moody
(74) *Attorney, Agent, or Firm* — Chip Law Group

(57) ABSTRACT

A main control circuit includes a PWM comparator that compares a contrast voltage generated according to a feedback voltage with a ramp voltage having a periodically varying voltage value, and causes an output stage circuit to perform a switching action based on a result of the comparison in the PWM control. A feedback path switch is inserted in a feedback path for propagating a signal according to the feedback voltage to the PWM comparator. The main control circuit controls, upon switching from sleep control that stops the switching action to the PWM control, within a specific period equal to one or more periods of the PWM control, the feedback path switch off and sets a voltage within a variation range of the ramp voltage as an initial voltage for the contrast voltage to thereby start a switching action and controlling the feedback path switch on after the specific period.

18 Claims, 25 Drawing Sheets

[FIRST REFERENCE CONFIGURATION]

[FIRST REFERENCE ACTION]

[SECOND REFERENCE CONFIGURATION]

[SECOND REFERENCE ACTION]

[SECOND REFERENCE CONFIGURATION]

[SECOND REFERENCE ACTION]

EXAMPLE OF ACTION OF SECOND REFERENCE CONFIGURATION

[EX1_1]

[EX1_1]

DURING SPECIFIC PERIOD (PERIOD OF $T_{A1} - T_{A2}$)

AFTER SPECIFIC PERIOD

[EX1_2]

[EX1_2]

DURING SPECIFIC PERIOD (PERIOD OF $T_{B1}$ - $T_{B2}$)

AFTER SPECIFIC PERIOD

[EX1_3]

[EX1_4]

[EX1_4]

DURING SPECIFIC PERIOD (PERIOD OF $T_{C1} - T_{C2}$)

AFTER SPECIFIC PERIOD

[EX1_5]

[EX1_5]

DURING SPECIFIC PERIOD (PERIOD OF $T_{D1}$ - $T_{D2}$)

AFTER SPECIFIC PERIOD

[EX1_6]

ORDINARY VARIATION RANGE (ORDINARY CLAMP STATE)

EXTENDED VARIATION RANGE (EXTENDED CLAMP STATE)

LOW LOAD CONTROL

FIG.27

| SLP | OVP_DET | CONTROL | SWITCHING ACTION | CLAMP CIRCUIT | Vcmp |
|-----|---------|---------|------------------|---------------|------|
| Lo | Lo | FIRST CONTROL | EXECUTION | ORDINARY CLAMP STATE | CONTROL BY ERROR AMPLIFIER |
| Hi | Lo | SECOND CONTROL | STOP (SLEEP) | — | CONTROL BY ERROR AMPLIFIER |
| Hi | Hi | THIRD CONTROL | EXECUTION | EXTENDED CLAMP STATE | TO Vmin2 |
| Lo | Hi | FOURTH CONTROL | EXECUTION | EXTENDED CLAMP STATE | TO Vmin2 |

※NOTE THAT, AFTER OVP_DET SWITCHES FROM Hi TO Lo, SWITCHING ACTION IS EXECUTED AND EXTENDED CLAMP STATE IS ESTABLISHED FOR PREDETERMINED TIME PERIOD $T_{HLD}$ WITHOUT DEPENDING UPON LEVEL OF SLP

FIG.28

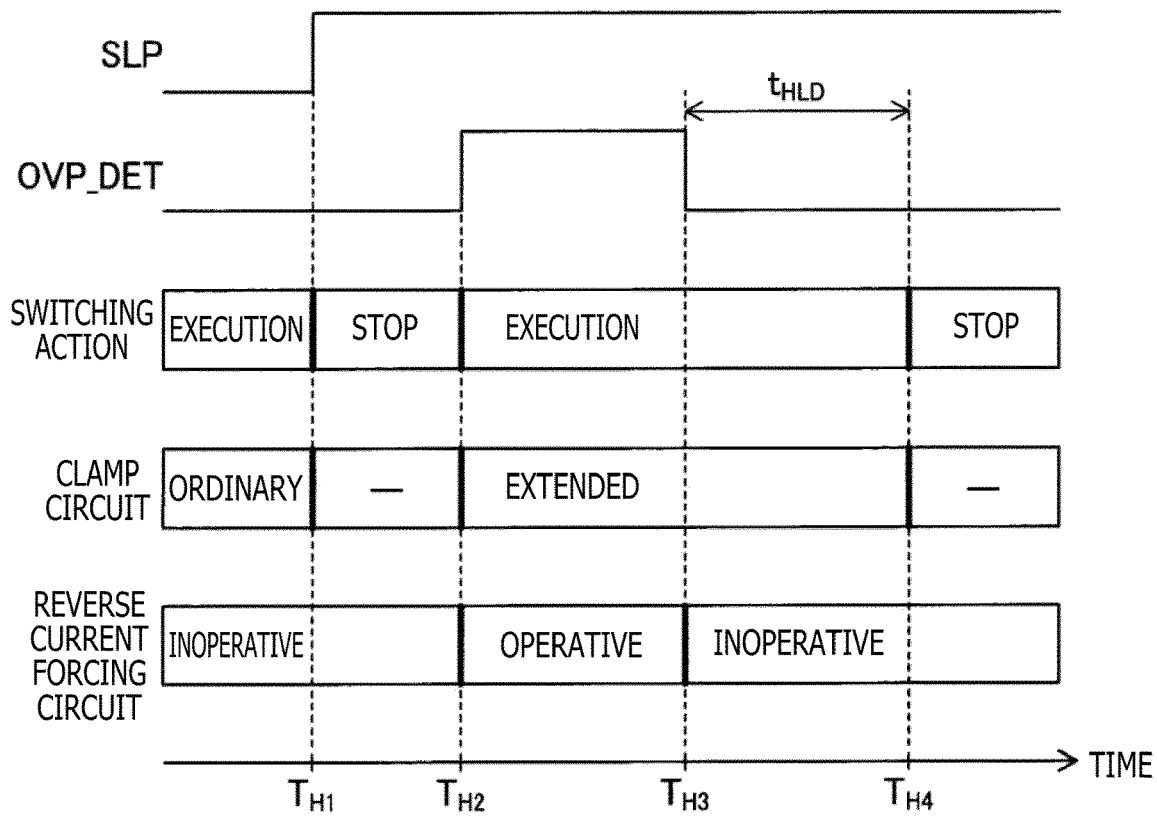

SWITCHING POWER SUPPLY DEVICE

CROSS REFERENCE TO RELATED APPLICATIONS

This application claims priority benefit of Japanese Patent Application No. JP 2019-170255 filed in the Japan Patent Office on Sep. 19, 2019. Each of the above-referenced applications is hereby incorporated herein by reference in its entirety.

BACKGROUND

The present disclosure relates to a switching power supply device.

A switching power supply device that generates an output voltage from an input voltage by a switching action by pulse width modulation (PWM) control is popularly used. In a switch power supply device of the type described, a contrast voltage to be compared with a ramp voltage whose voltage value changes periodically is generated on the basis of a feedback voltage according to the output voltage. Then, duty control of an output stage circuit (for example, a half bridge circuit) is performed on the basis of a result of comparison between the contrast voltage and the ramp voltage.

Further, in a switching power supply device, it is common to achieve reduction of power consumption by stopping, in a low load state, the switching action and stopping an unnecessary circuit action.

Examples of the related art are disclosed in Japanese Patent Laid-Open No. 2018-107930 and No. 2018-107931.

SUMMARY

When a switching action by PWM control is to be started from a switching stopped state in response to reception of a signal from an external apparatus or the like, in order to allow an output stage circuit to act with a desired duty, a circuit for providing an appropriate initial voltage to the contrast voltage is required.

However, the technology for providing an appropriate initial voltage to the contrast voltage has room for improvement, and it is sometimes difficult to start the switching action from a switching stopped state appropriately.

It is desirable to provide a switching power supply device that can appropriately start a switching action from a switching stopped state.

According to an aspect of the present disclosure, there is provided a switching power supply device configured such that it includes an output stage circuit that generates an output voltage from an input voltage by a switching action and a main control circuit that is capable of executing PWM control of controlling the output stage circuit to perform a switching action on the basis of a feedback voltage according to the output voltage or sleep control of stopping the switching action of the output stage circuit. The main control circuit includes a contrast voltage generation section configured to generate a contrast voltage according to the feedback voltage in the PWM control, and a PWM comparator configured to compare the contrast voltage with a ramp voltage, the ramp voltage having a voltage value that changes periodically, in the PWM control, and causes the output stage circuit to perform a switching action on the basis of a result of the comparison of the PWM comparator in the PWM control. The main control circuit further includes a feedback path switch inserted in a feedback path for propagating a signal according to the feedback voltage to the PWM comparator, and causes, when switching from the sleep control to the PWM control is to be performed, the contrast voltage generation section to control the contrast voltage by controlling, within a specific period equal to one or more cycles of the PWM control, the feedback path switch off and setting a voltage within a variation range of the ramp voltage as an initial voltage for the contrast voltage to thereby start a switching action and then controlling the feedback path switch on after the specific period (first configuration).

The switching power supply device according to the first configuration described above may be configured such that the main control circuit includes a phase compensation circuit connected to a specific wire, the specific wire being interposed between the PWM comparator and the feedback path switch and being applied the contrast voltage, and configured to compensate for a phase of the contrast voltage, and a transition controlling circuit. The transition controlling circuit controls, during the specific period, the feedback path switch off and controls the phase compensation circuit to generate a voltage within the variation range of the ramp voltage and applies the generated voltage as an initial voltage for the contrast voltage to the specific wire through the phase compensation circuit (second configuration).

The switching power supply device according to the second configuration described above may be configured such that the phase compensation circuit includes a phase compensation capacitance section including a plurality of capacitors and connected to a predetermined node, and a phase compensation resistance section provided between the specific wire and the predetermined node. The transition controlling circuit controls, during the specific period, the feedback path switch off and controls the predetermined node to generate a voltage within the variation range of the ramp voltage and applies the generated voltage as the initial voltage for the contrast voltage to the specific wire through the phase compensation resistance section (third configuration).

The switching power supply device according to the third configuration may be configured such that the phase compensation circuit further includes a switch group including a plurality of switches whose state is controlled by the transition controlling circuit. The phase compensation capacitance section includes a first capacitor connected at a first end thereof to a ground and at a second end thereof to the predetermined node, and a second capacitor connected at a first end thereof to the ground. The switch group includes a first switch connected in parallel to the first capacitor and a second switch that switchably connects a second end of the second capacitor to an application end of the output voltage or the predetermined node (fourth configuration).

The switching power supply device according to the fourth configuration may be configured such that the transition controlling circuit controls, when the sleep control is performed, the first switch on and sets a connection destination of the second end of the second capacitor through the second switch to the application end of the output voltage to charge the second capacitor by using the output voltage, and switches, when switching from the sleep control to the PWM control is to be performed, the first switch from on to off and switches the connection destination of the second end of the second capacitor through the second switch to the predetermined node such that a voltage according to the output voltage is generated as the voltage within the variation range of the ramp voltage in the predetermined node during the specific period (fifth configuration).

The switching power supply device according to the third configuration may be configured such that the phase compensation circuit further includes a switch group including a plurality of switches whose state is controlled by the transition controlling circuit. The phase compensation capacitance section includes a first capacitor connected at a first end thereof to a ground and at a second end thereof to the predetermined node, and a second capacitor connected at a first end thereof to the predetermined node. The switch group includes a first switch connected in parallel to the first capacitor and a second switch configured to switchably connect a second end of the second capacitor to an application end of the output voltage or the ground (sixth configuration).

The switching power supply device according to the sixth configuration described above may be configured such that the main control circuit controls, when the sleep control is performed, the first switch on and sets the connection destination of the second end of the second capacitor through the second switch to the ground, and switches, when switching from the sleep control to the PWM control is to be performed, the first switch from on to off and switches the connection destination of the second end of the second capacitor through the second switch to the application end of the output voltage to cause a voltage according to the output voltage during the specific period to be generated as the voltage within the variation range of the ramp voltage by the predetermined node (seventh configuration).

The switching power supply device according to any one of the second to seventh configurations may be configured such that the contrast voltage generation section includes an amplifier configured to input and output current from and to the specific wire on the basis of the feedback voltage or on the basis of a signal generated according to the feedback voltage in the PWM control (eighth configuration).

According to another aspect of the present disclosure, there is provided a switching power supply device configured such that it includes an output stage circuit that generates an output voltage from an input voltage by a switching action and a main control circuit that is capable of executing PWM control of controlling the output stage circuit to perform a switching action on the basis of a feedback voltage according to the output voltage or sleep control of stopping the switching action of the output stage circuit. The main control circuit includes a contrast voltage generation section configured to generate a contrast voltage in response to the feedback voltage in the PWM control, a PWM comparator configured to compare the contrast voltage with a ramp voltage, the ramp voltage having a voltage value that changes periodically, in the PWM control, and a phase compensation circuit connected to a specific wire to which the contrast voltage is applied and configured to compensate for a phase of the contrast voltage, and causes the output stage circuit to perform a switching action on the basis of a result of the comparison of the PWM comparator in the PWM control. The phase compensation circuit includes a phase compensation resistance section and a phase compensation capacitance section. When switching from the sleep control to the PWM control is to be performed, the main control circuit sets, while temporarily decreasing, a resistance value of the phase compensation resistance section from a predetermined resistance value within a specific period equal to or longer than one period of the PWM control, a voltage within a variation range of the ramp voltage as an initial voltage for the contrast voltage to start a switching action and returns the resistance value of the phase compensation resistance section to the predetermined resistance value after the specific period (ninth configuration).

The switching power supply device according to the ninth configuration may be configured such that the main control circuit includes a transition controlling circuit configured to control the phase compensation circuit to generate, within the specific period, a voltage within the variation range of the ramp voltage and apply the generated voltage as an initial voltage for the contrast voltage to the specific wire through the phase compensation circuit (tenth configuration).

The switching power supply device according to the tenth configuration may be configured such that the phase compensation capacitance section is connected to a predetermined node, the phase compensation resistance section is provided between the specific wire and the predetermined node, and the transition controlling circuit causes a voltage within the variation range of the ramp voltage to be generated at the predetermined node during the specific period and causes the generated voltage to be applied as the initial voltage for the contrast voltage to the specific wire through the phase compensation resistance section (eleventh configuration).

The switching power supply device according to the eleventh configuration may be configured such that the phase compensation circuit further includes a switch group including a plurality of switches whose state is controlled by the transition controlling circuit. The phase compensation capacitance section includes a first capacitor connected at a first end thereof to a ground and at a second end thereof to the predetermined node, and a second capacitor connected at a first end thereof to the ground. The switch group includes a first switch connected in parallel to the first capacitor, a second switch configured to switchably connect a second end of the second capacitor to an application end of the output voltage or the predetermined node, and a third switch connected in parallel to a resistor provided between the specific wire and the predetermined node. The phase compensation resistance section includes a parallel circuit of the resistor and the third switch. The predetermined resistance value is a resistance value of the resistor, and the resistance value of the phase compensation resistance section decreases from the predetermined resistance value when the third switch is switched on (twelfth configuration).

The switching power supply device according to the twelfth configuration may be configured such that the transition controlling circuit controls, when the speed control is performed, the first switch on and sets a connection destination of the second end of the second capacitor through the second switch to the application end of the output voltage to charge the second capacitor using the output voltage, switches, when switching from the sleep control to the PWM control is to be performed, the first switch from on to off and switches the connection destination of the second end of the second capacitor through the second switch to the predetermined node to cause a voltage according to the output voltage to be generated as the voltage in the variation range of the ramp voltage at the predetermined node during the specific period, and switches the third switch on within the specific period to cause the resistance value of the phase compensation resistance section generated by the parallel circuit of the resistor and the third switch to be made lower than the predetermined voltage value and then switches, after the specific period, the third switch off to set the resistance value of the resistor as the resistance value of the phase compensation resistance section (thirteenth configuration).

The switching power supply device according to the eleventh configuration may be configured such that the phase compensation circuit further includes a switch group including a plurality of switches whose state is controlled by the transition controlling circuit. The phase compensation capacitance section includes a first capacitor connected at a first end thereof to a ground and at a second end thereof to the predetermined node, and a second capacitor connected at a first end thereof to the predetermined node. The switch group includes a first switch connected in parallel to the first capacitor, a second switch configured to switchably connect a second end of the second capacitor to an application end of the output voltage or the ground, and a third switch connected in parallel to a resistor provided between the specific wire and the predetermined node. The phase compensation resistance section includes the parallel circuit of the resistor and the third switch. The predetermined resistance value is a resistance value of the resistor, and the resistance value of the phase compensation resistance section decreases from the predetermined resistance value when the third switch is controlled on (fourteenth configuration).

The switching power supply device according to the fourteenth configuration may be configured such that the main control circuit controls, when the sleep control is performed, the first switch on and sets the connection destination of the second end of the second capacitor through the second switch to the ground, switches, when switching from the sleep control to the PWM control is to be performed, the first switch from on to off and switches the connection destination of the second end of the second capacitor through the second switch to the application end of the output voltage to cause a voltage according to the output voltage to be generated as the voltage within the variation range of the ramp voltage at the predetermined node within the specific period, and switches the third switch on within the specific period to cause the resistance value of the phase compensation resistance section generated by the parallel circuit of the resistor and the third switch to be made lower than the predetermined voltage value and then switches, after the specific period, the third switch off to set the resistance value of the resistor as the resistance value of the phase compensation resistance section (fifteenth configuration).

The switching power supply device according to any one of the ninth to fifteenth configuration may be configured such that the contrast voltage generation section includes an amplifier configured to input and output current from and to the specific wire on the basis of the feedback voltage or on the basis of a signal generated according to the feedback voltage in the PWM control (sixteenth configuration).

The switching power supply device according to any one of the first to sixteenth configurations may be configured such that the main control circuit sets the specific period when switching from the sleep control to the PWM control is to be performed, on the basis of a signal from an external apparatus provided outside the switching power supply device (seventeenth configuration).

The switching power supply device according to any one of the first to sixteenth configurations may be configured such that the main control circuit further includes an overvoltage detection circuit configured to detect whether or not the output voltage is in an overvoltage state on the basis of the feedback voltage or the output voltage, and performs, when the overvoltage state is detected while the switching action of the output stage circuit is stopped by the sleep control, switching from the speed control to the PWM control and sets the specific period at the time of the switching (eighteenth configuration).

According to the present disclosure, a switching power supply device in which a switching action can be started appropriately from a switching stopped state can be provided.

BRIEF DESCRIPTION OF THE DRAWINGS

FIG. 27 is a view related to the second embodiment and illustrating a relation between a control signal generated in a switching power supply IC and presence/absence of execution of switching control and so forth;

FIG. 28 is a view related to the second embodiment and illustrating signal waveforms, presence/absence of switching control and so forth when a specific failure occurs;

DETAILED DESCRIPTION OF THE PREFERRED EMBODIMENTS

Figure 1:
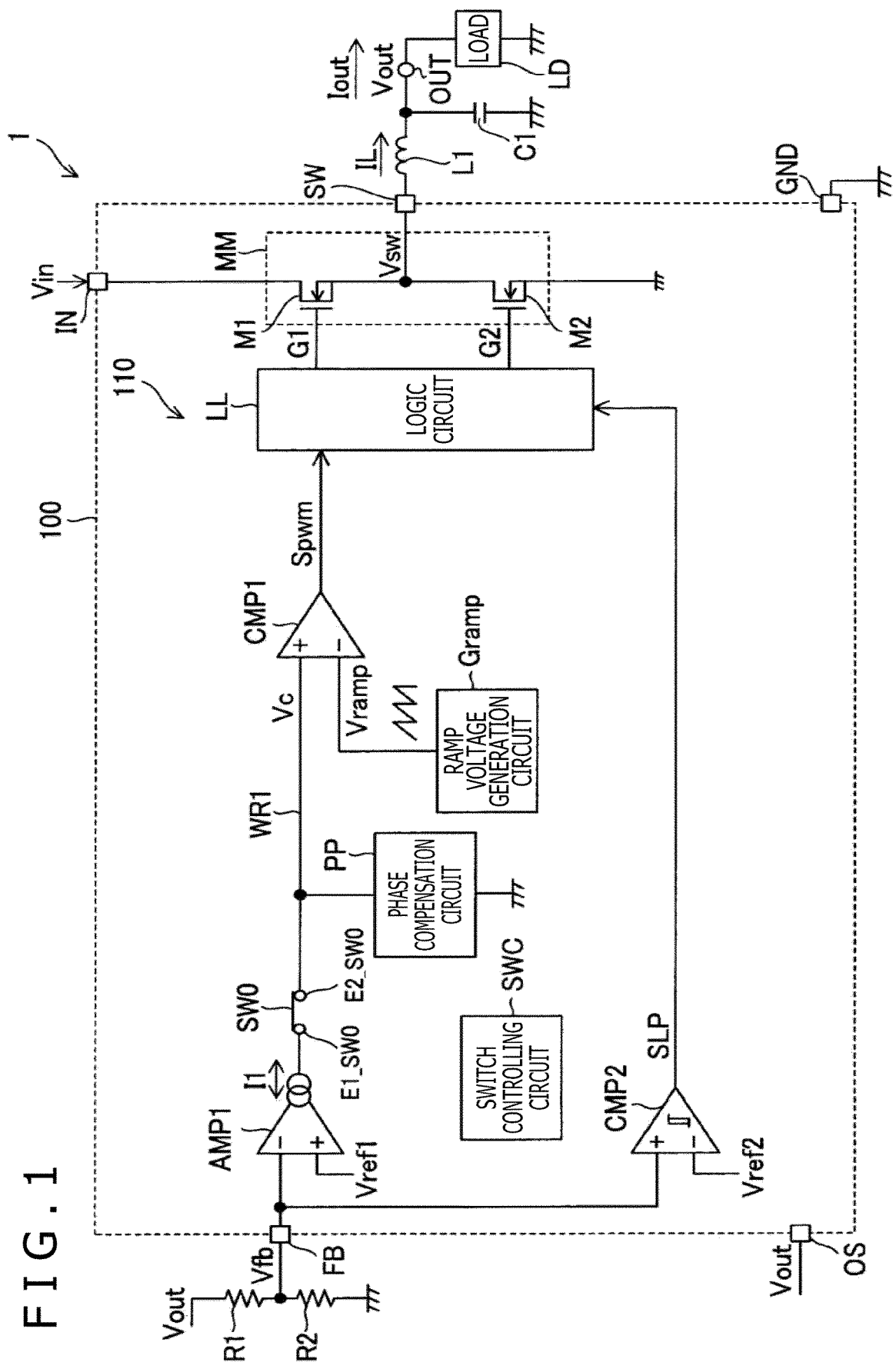
FIG. 1 is a block diagram of an overall switching power supply device according to a first embodiment of the present disclosure.

In the following, examples of embodiments of the present disclosure are described in detail with reference to the accompanying drawings. In the figures referred to, like elements are denoted by like reference signs, and overlapping description of them is omitted herein in principle. It is to be noted that, in the present specification, for the object of simplification of the description, by inscribing a reference symbol or sign that refers to information, a signal, a physical quantity, a device, a part or the like, the name of the information, signal, physical quantity, device, part or the like corresponding to the reference symbol or sign is sometimes omitted or abbreviated. Although, for example, a switching power supply IC that is referred to with "100" in the description given below (refer to FIG. 1) may possibly be referred to as a switching power supply IC 100 or as an IC 100 in abbreviation, they indicate the same thing.

First, several terms used in the description of the embodiments of the present disclosure are explained. IC is an abbreviation for an integrated circuit. Ground indicates a conductive part having the potential of 0 V (zero volt) that is used as a reference or indicates the potential of 0 V itself. The potential of 0 V is sometimes referred to as ground potential. In the description of the embodiments of the present disclosure, a voltage indicated without a reference given specifically represents a potential as viewed from the ground. Level indicates a level of the potential, and in regard to any signal or potential, high level has a potential higher than a low level. In regard to any signal or potential, that a signal or a potential has the high level signifies that the level of the signal or voltage is the high level, and that a signal or a voltage has a low level signifies that the level of the signal or voltage is the low level. A level of a signal is sometimes represented as a signal level, and a level of a voltage is sometimes represented as a voltage level.

In regard to any transistor configured as a field effect transistor (FET) including a MOSFET, an on state indicates that the drain and the source of the transistor are in a conducting state to each other, and an off state indicates that the drain and the source of the transistor are in a non-conducting state (in a cutoff state). Similarly, this also applies to a transistor that is not classified into an FET. It may be interpreted that, unless otherwise specified, a MOSFET is an enhancement type MOSFET. MOSFET is an abbreviation for "metal-oxide semiconductor field-effect transistor."

Any switch can include one or more FETs, and when a certain switch is in an on state, the opposite ends of the switch are conducting therebetween, but when the switch is in an off state, the opposite ends of the switch are non-conducting therebetween.

In regard to any transistor or switch, switching from an off state to an on state is represented as turn-on, and switching from an on state to an off state is represented as turn-off. In the following description, in regard to any transistor or switch, an on state or an off state is sometimes represented merely as on or off. In regard to any transistor or switch, a period during which the transistor or switch is in an on state is sometimes referred to as an on period, and a period during which the transistor or switch is in an off state is sometimes referred to as an off period.

Further, in regard to any signal that has a signal level of the high level or the low level, a period during which the level of the signal is the high level is referred to as a high level period, and a period during which the level of the signal is the low level is referred to as a low level period. Similarly, this also applies to any voltage that assumes a signal level of the high level or the low level.

First Embodiment

A first embodiment of the present disclosure is described. FIG. 1 is a block diagram of an overall switching power supply device 1 according to the first embodiment of the present disclosure. The switching power supply device 1 of FIG. 1 includes a switching power supply IC 100 that is a switching power supply circuit (switching power supplying semiconductor device), and a plurality of discrete parts externally connected to the switching power supply IC 100. The plurality of discrete parts includes a capacitor C1, a coil L1, and resistors R1 and R2. The switching power supply device 1 is configured as a step-down type switching power supply device (direct current (DC)/DC converter) that generates a desired output voltage Vout from a desired input voltage Vin. The output voltage Vout is supplied to a load LD connected to an output terminal OUT. The input voltage Vin and the output voltage Vout are positive DC voltages, and the output voltage Vout is lower than the input voltage Vin. The output voltage Vout appears at the output terminal OUT of the switching power supply device 1. For example, the input voltage Vin is 12 V, and the output voltage Vout is stabilized at a desired positive voltage value (for example, 3.3 V or 5 V) lower than 12 V by adjusting the resistance value of the resistors R1 and R2. Current that flows to the load LD through the output terminal OUT is referred to as an output current Iout.

Figure 2:
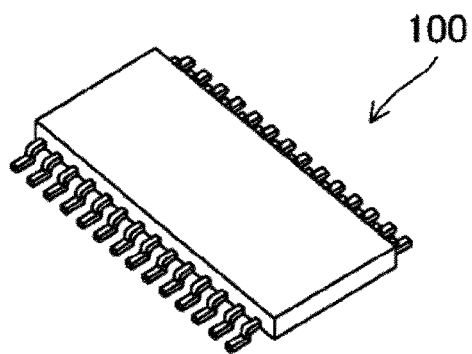
FIG. 2 is a perspective view depicting an appearance of a switching power supply integrated circuit (IC) according to the first embodiment.

The switching power supply IC 100 is an electronic part, as depicted in FIG. 2, formed by sealing a semiconductor integrated circuit in a housing (package) including resin (similarly, this also applies to an IC 200 hereinafter described: refer to FIG. 24). A plurality of external terminals is provided in an exposed relation on the housing of the switching power supply IC 100. The plurality of external terminals includes the input terminal IN, a switch terminal SW, a feedback terminal FB, an output monitoring terminal OS, and a ground terminal GND depicted in FIG. 1 (this similarly applies also to the IC 200 hereinafter described). Also terminals other than the terminals mentioned can be included in the plurality of external terminals. It is to be noted that the number of external terminals of the switching power supply IC 100 and the appearance of the switching power supply IC 100 depicted in FIG. 2 are nothing but exemplifications (similarly, this also applies to the IC 200 hereinafter described).

First, an external configuration of the switching power supply IC 100 is described. The input voltage Vin is supplied to the input terminal IN from the outside of the switching power supply IC 100. The coil L1 is interposed between the switch terminal SW and the output terminal OUT. In particular, the coil L1 is connected at one end thereof to the switch terminal SW and at the other end thereof to the output terminal OUT. Further, the output terminal OUT is connected to the ground through the capacitor C1. Further, the output terminal OUT is connected to one end of the resistor R1, which in turn is connected at the other end thereof to the ground through the resistor R2. The connection node between the resistors R1 and R2 is connected to the feedback terminal FB. Further, the output voltage Vout is applied to the output monitoring terminal OS, and the ground terminal GND is connected to the ground.

Now, an internal configuration of the switching power supply IC 100 is described. The switching power supply IC 100 includes an output stage circuit MM and a main control circuit 110 for controlling the output stage circuit MM.

The output stage circuit MM includes transistors M1 and M2 each configured as an N-channel MOSFET. The transistors M1 and M2 are a pair of switching elements connected in series between the input terminal IN and the ground terminal GND (in other words, the ground), and when they are driven for switching, the input voltage Vin is switched, and a switch voltage Vsw of a rectangular wave appears at the switch terminal SW. The transistor M1 is provided on the high voltage side, and the transistor M2 is provided on the low voltage side. In particular, the transistor M1 is connected at the drain thereof to the input terminal IN, and the source of the transistor M1 and the drain of the transistor M2 are connected in common with the switch terminal SW. The transistor M2 is connected at the source thereof to the ground.

The transistor M1 functions as an output transistor, and the transistor M2 functions as a synchronous rectification transistor. The coil L1 and the capacitor C1 configure a rectification smoothing circuit that rectifies and smoothes the switch voltage Vsw appearing at the switch terminal SW and having a rectangular waveform to generate the output voltage Vout. The resistors R1 and R2 configure a voltage dividing circuit that divides the output voltage Vout. The connection node between the resistors R1 and R2 is connected to the feedback terminal FB such that the divided voltage appearing at the connection node is inputted as a feedback voltage Vfb to the feedback terminal FB.

To the gates of the transistors M1 and M2, gate signals G1 and G2 are supplied as driving signals, respectively, and the transistors M1 and M2 are tuned on and off in response to the gate signals G1 and G2, respectively. Although basically the transistors M1 and M2 are turned on and off alternately, both of the transistors M1 and M2 are sometimes kept in an off state (details are hereinafter described).

The main control circuit 110 includes an amplifier AMP1, a comparator CMP1 that is a PWM comparator, a phase compensation circuit PP, a ramp voltage generation circuit Gramp, a logic circuit LL, a switch SW0, a switch controlling circuit SWC, and a low load detection comparator CMP2. It is to be noted that PWM is an abbreviation of "pulse width modulation."

The amplifier AMP1 is a transconductance amplifier of the current output type and functions as an error amplifier in the main control circuit 110. To the negated input terminal of the amplifier AMP1, a voltage applied to the feedback terminal FB (that is, the feedback voltage Vfb) is supplied, and to the non-negated input terminal of the amplifier AMP1, a predetermined reference voltage Vref1 is supplied. The reference voltage Vref1 and a reference voltage Vref2 hereinafter described are DC voltages having positive voltage values different from each other and are generated by an unillustrated reference voltage generation circuit in the switching power supply IC 100.

The amplifier AMP1 is connected at the output terminal thereof to a first end E1_SW0 of the switch SW0, and the switch SW0 is connected at a second end E2_SW0 thereof to the non-negated input terminal of the comparator CMP1. A wire that connects the second end E2_SW0 of the switch SW0 and the non-negated input terminal of the comparator CMP1 is specifically referred to as a wire WR1. It may be considered that the switch SW0 is inserted in series in the wire WR1 for connecting the output terminal of the amplifier AMP1 and the non-negated input terminal of the comparator CMP1.

The amplifier AMP1 outputs a current signal I1 according to the difference between the feedback voltage Vfb and the reference voltage Vref1 from the output terminal thereof. Only when the switch SW0 is on, charge from the current signal I1 is inputted to and outputted from the wire WR1 through the switch SW0. In particular, under the assumption that the switch SW0 is on, when the feedback voltage Vfb is lower than the reference voltage Vref1, the amplifier AMP1 outputs therefrom current according to the current signal I1 toward the wire WR1 such that the potential at the wire WR1 rises, but when the feedback voltage Vfb is higher than the reference voltage Vref1, the amplifier AMP1 draws current according to the current signal I1 from the wire WR1 toward the amplifier AMP1 such that the potential at the wire WR1 drops. As the absolute value of the difference between the feedback voltage Vfb and the reference voltage Vref1 increases, also the magnitude of current according to the current signal I1 increases.

The phase compensation circuit PP is provided between the ground and the wire WR1 between the second end E2_SW0 of the switch SW0 and the non-negated input terminal of the comparator CMP1 and cooperates with the amplifier AMP1 to generate a voltage signal on the wire WR1. The voltage applied to the wire WR1 is referred to as a contrast voltage Vc. The phase compensation circuit PP has a function of compensating for the phase of the contrast voltage Vc. When the switch SW0 is on, a voltage signal is generated on the wire WR1 on the basis of the current signal I1, and at this time, the phase compensation circuit PP compensates for the phase of the contrast voltage Vc to prevent oscillation of the output feedback loop. Action of the phase compensation circuit PP when the switch SW0 is off is hereinafter described.

Figure 3:
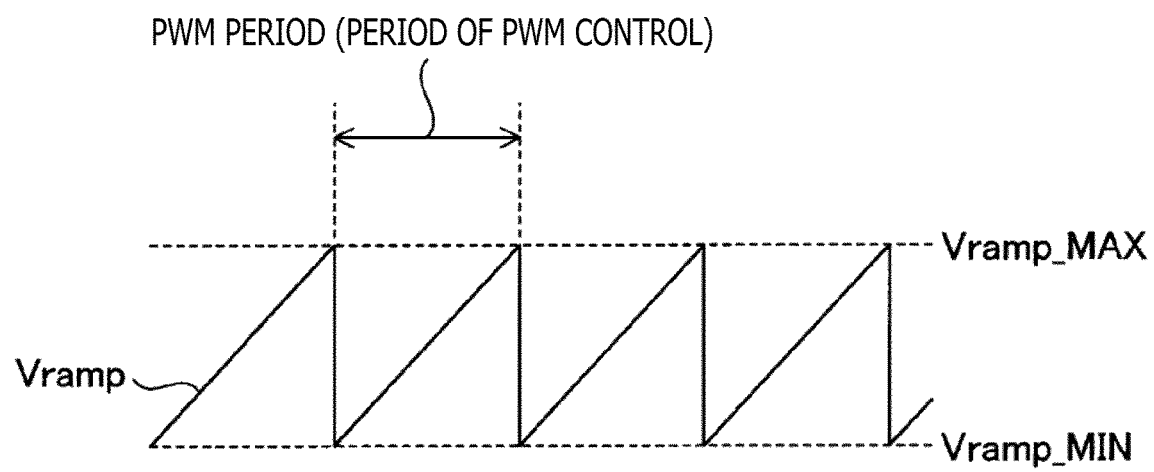
FIG. 3 is a waveform diagram of a ramp voltage according to the first embodiment.

The ramp voltage generation circuit Gramp generates a ramp voltage Vramp whose voltage value periodically changes in a predetermined PWM period. The ramp voltage Vramp has a voltage waveform, for example, of a triangular wave or a sawtooth wave. Here, it is assumed that, when the ramp voltage generation circuit Gramp acts to perform generation of a ramp voltage Vramp, as depicted in FIG. 3, the ramp voltage Vramp changes from a predetermined positive lower limit voltage value Vramp_MIN to a predetermined positive upper limit voltage value Vramp_MAX (similarly, this also applies to the other embodiments hereinafter described). In particular, the range of the lower limit voltage value Vramp_MIN to the upper limit voltage value Vramp_MAX is a variation range of the ramp voltage Vramp and satisfies "Vramp_MAX>Vramp_MIN." The period of the variation of the ramp voltage Vramp is the PWM period (in other words, the period of PWM control), and within each PWM period, the ramp voltage Vramp monotonously increases linearly as time passes from a start point given by the lower limit voltage value Vramp_MIN and, after it reaches the upper limit voltage value Vramp_MAX, it instantaneously returns to the lower limit voltage value Vramp_MIN (similarly, this also applies to the other embodiments hereinafter described). Here, it is assumed that the lower limit voltage value Vramp_MIN is higher than 0 V and is, for example, 0.6 V. However, the lower limit voltage value Vramp_MIN may otherwise be equal to 0 V.

The contrast voltage Vc is supplied to the non-negated input terminal of the comparator CMP1, and the ramp voltage Vramp is supplied to the negated input terminal of the comparator CMP1. The comparator CMP1 compares the contrast voltage Vc with the ramp voltage Vramp and outputs a pulse width modulation signal Spwm indicative of a result of the comparison. The pulse width modulation signal Spwm indicates a high level in a period during which the contrast voltage Vc is higher than the ramp voltage Vramp, but indicates a low level in a period during which the contrast voltage Vc is lower than the ramp voltage Vramp.

The logic circuit LL supplies gate signals G1 and G2 based on the pulse width modulation signal Spwm to the transistors M1 and M2, respectively, to cause the output stage circuit MM to perform a switching action. In the switching action, the transistors M1 and M2 are turned on and off alternately on the basis of the signal Spwm. Since the amplifier AMP1 generates the current signal I1 such that the feedback voltage Vfb and the reference voltage Vref1 become equal to each other, the output voltage Vout is stabilized at a predetermined target voltage Vtg according to the reference voltage Vref1 and the voltage division ratio by the resistors R1 and R2 through the execution of the switching action. Although the value of the input voltage Vin and the value of the target voltage Vtg to the output voltage Vout are freely selected (however, Vin>Vtg), for example, the input voltage Vin is 12 V or 24 V, and the target voltage Vtg is 3.3 V or 5 V.

More particularly, in the switching action, during a period during which the signal Spwm has the high level, the gate signal G1 of the high level and the gate signal G2 of the low level are supplied to the gates of the transistors M1 and M2 to place the transistors M1 and M2 into an on state and an off state, respectively. In contrast, in the switching action, during a period during which the signal Spwm has the low level, the gate signal G1 of the low level and the gate signal G2 of the high level are supplied to the gates of the transistors M1 and M2 to place the transistors M1 and M2 into an off state and an on state, respectively. However, in order to prevent appearance of through-current with certainty, a dead time period within which both of the transistors M1 and M2 are placed in an off state may be inserted between the period during which the transistor M1 is placed in an on state and the period during which the transistor M2 is placed in an on state.

The switch controlling circuit SWC controls the state of a plurality of switches provided in the IC 100 including the switch SW0 (description in regard to the switches other than the switch SW0 is hereinafter given). Any switch is an analog switch as a bidirectional switch and may be a transmission gate configured, for example, using a complementary metal-oxide-semiconductor (CMOS) field effect transistor.

The low load detection comparator CMP2 is a comparator for detecting a low load state, and compares the feedback voltage Vfb inputted to the non-negated input terminal thereof and the reference voltage Vref2 inputted to the negated input terminal thereof with each other and outputs a control signal SLP indicative of a result of the comparison. In this comparison, a hysteresis is set. Here, it is assumed that, using a state in which the feedback voltage Vfb is lower than the reference voltage Vref2 and the control signal SLP has the low level as a start point, if the feedback voltage Vfb becomes higher than the reference voltage Vref2, then the comparator CMP2 outputs the control signal SLP of the high level, and if the feedback voltage Vfb thereafter becomes lower than a voltage (Vref2−ΔHYS2), then the comparator CMP2 switches the level of the control signal SLP from the high level to the low level. The voltage (Vref2−ΔHYS2) is a voltage lower by a positive hysteresis voltage ΔHYS2 than the reference voltage Vref2.

The voltage (Vref2−ΔHYS2) is higher than the reference voltage Vref1. Since the output voltage Vout is stabilized at the predetermined target voltage Vtg when the feedback voltage Vfb coincides with the reference voltage Vref1, only when the output voltage Vout reasonably exceeds the target voltage Vtg, does the control signal SLP become the high level.

The control signal SLP is supplied to the logic circuit LL. When the control signal SLP has the low level, the logic circuit LL causes the output stage circuit MM to perform a switching action, on the basis of the pulse width modulation signal Spwm. However, when the control signal SLP has the high level, the logic circuit LL performs sleep control (switching stopped control) for stopping the switching action. When the control signal SLP has the high level (that is, when sleep control is performed), the logic circuit LL keeps, without depending upon the signal Spwm, both of the gates G1 and G2 to the low level to keep both of the transistors M1 and M2 in the off state.

In this manner, the main control circuit 110 can execute PWM control of controlling the output stage circuit MM to perform a switching action, on the basis of the feedback voltage Vfb according to the output voltage Vout or sleep control of stopping the switching action of the output stage circuit MM.

Figure 4:
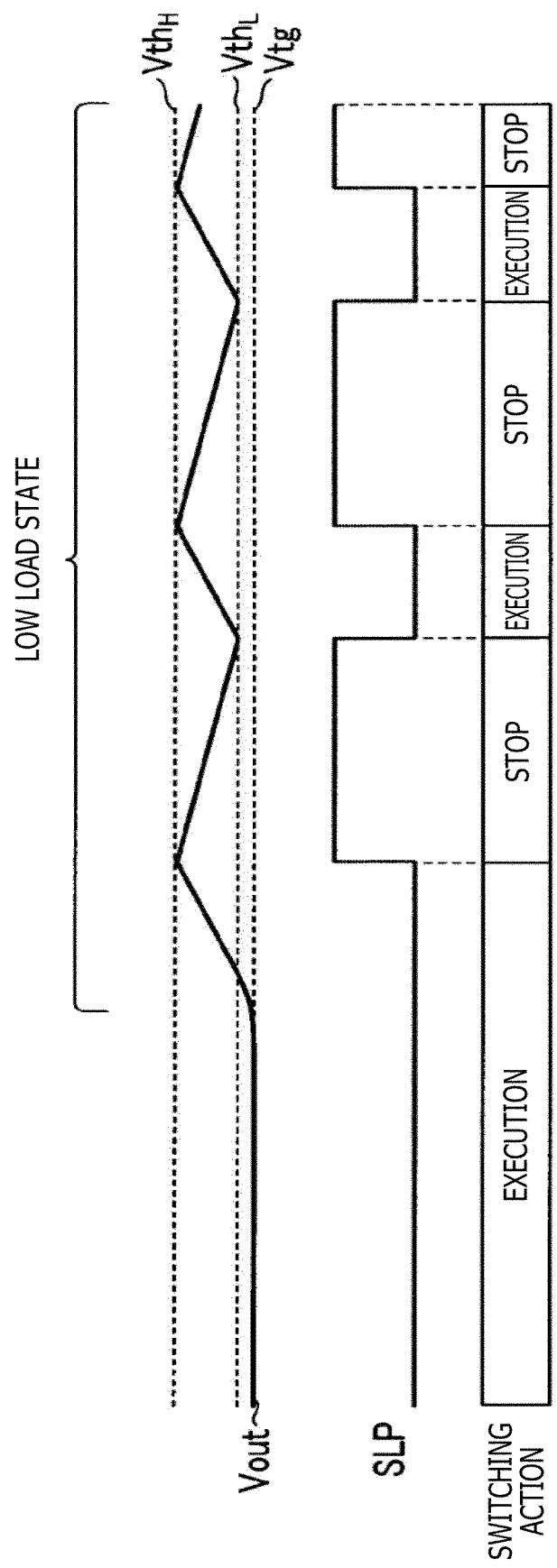
FIG. 4 is a timing chart illustrating a manner of an output voltage and so forth in a low load state according to the first embodiment.

FIG. 4 depicts an example of a relation among the output voltage Vout, the control signal SLP, and the switching action in a low load state. It is assumed that, when the output voltage Vout and a predetermined voltage $Vth_H$ coincide with each other, the feedback voltage Vfb coincides with the reference voltage Vref2 and besides, when the output voltage Vout coincides with a predetermined voltage $Vth_L$, the feedback voltage Vfb coincides with the voltage (Vref2−

ΔHYS2). While a low load state is maintained, stopping and restarting of a switching action are repeated and the output voltage Vout generally reciprocates between the predetermined voltage $Vth_H$ and the predetermined voltage $Vth_L$. The control signal SLP of the high level functions as a signal indicating that the state of the switching power supply device 1 is a low load state. By such control, in a low load state, the switching action is executed intermittently, by which improvement in efficiency is achieved through reduction of switching loss. Further, when sleep control is being performed, preferably, action of the amplifier AMP1, the comparator CMP1, and the ramp voltage generation circuit Gramp is stopped, by which reduction of the power consumption is achieved.

Here, control modes of the IC 100 are described. The IC 100 can act in one of a plurality of control modes including an auto mode and a forced PWM mode. In the auto mode, on the basis of the control signal SLP, when the control signal SLP has the low level, PWM control including a switching action is performed, but when the control signal SLP has the high level, sleep control in which the switching action is stopped is performed as described above. In the forced PWM mode, PWM control in which a switching action is performed forcibly is performed irrespective of the level of the control signal SLP.

It may be understood that setting of a control mode (setting regarding in which control mode the IC 100 is to act) is performed by a mode setting section in the IC 100. It may be understood that the mode setting section is implemented by the logic circuit LL or may be understood that the mode setting section is provided separately from the logic circuit LL. An initial control mode of the IC 100 may be the auto mode. If the mode setting section receives a predetermined forced PWM mode designation signal from an external apparatus (a microcomputer or the like not depicted) provided outside the IC 100 and the switching power supply device 1, then it sets the control mode of the IC 100 to the forced PWM mode, but if a predetermined auto mode designation signal is received from the external apparatus, then the mode setting section sets the control mode of the IC 100 to the auto mode.

In the following description, the on-duty of the output stage circuit MM when the PWM control is performed is sometimes referred to with a reference sign "Don." The on-duty Don of the output stage circuit MM indicates a ratio of the length of an on period of the transistor M1 that occupies, in each PWM period, a length of the PWM period, and is also a ratio of the length of a high level period of the signal Spwm that occupies the PWM period. As recognized from the foregoing description, the on-duty Don of the output stage circuit MM increases as the contrast voltage Vc becomes higher.

Note that it is assumed that, in the present embodiment, the amplifier AMP1 can control the contrast voltage Vc within a range of a voltage equal to or higher than 0 V in a state in which the switch SW0 is on (similarly, this also applies to the other embodiment hereinafter described).

[First Reference Configuration and First Reference Action]

Figure 5A:
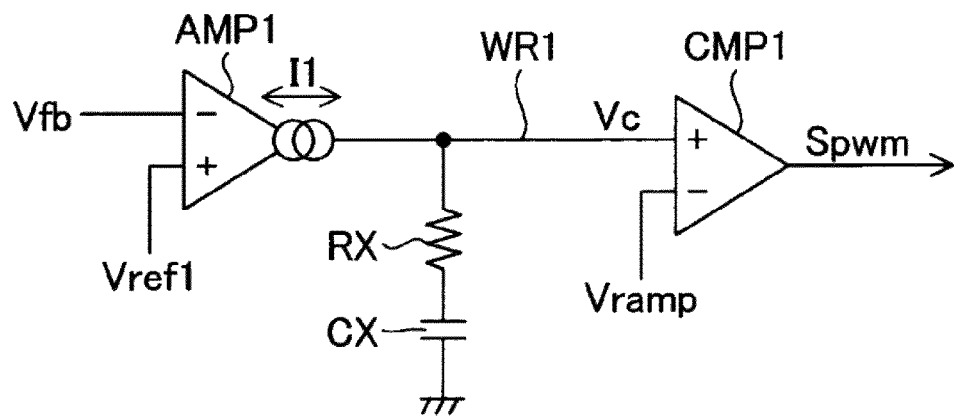
FIGS. 5A and 5B are a circuit diagram and a waveform diagram, respectively, illustrating a first reference configuration and a first reference action.
Figure 5B:
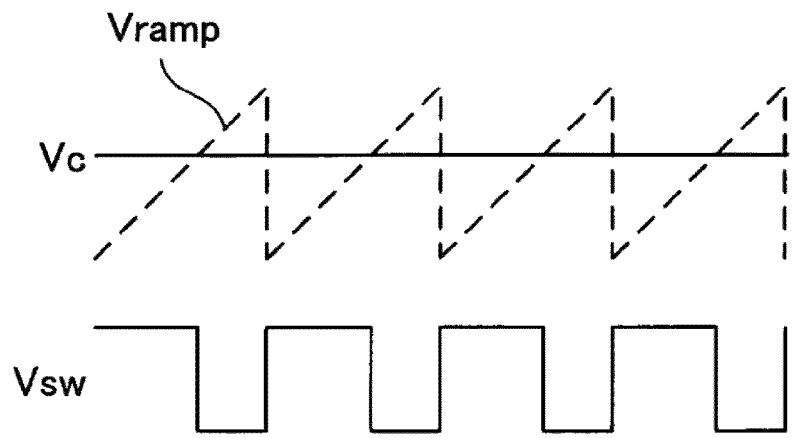

Here, a first reference configuration and a first reference action are described. FIG. 5A is a circuit diagram according to the first reference configuration, and FIG. 5B is a view illustrating the first reference action. In the first reference configuration, the output terminal of the amplifier AMP1 is connected directly to the non-negated input terminal of the comparator CMP1, and the wire WR1 is connected to one end of a capacitor CX through a resistor RX while the capacitor CX is connected at the other end thereof to the ground. The phase compensation circuit of the first reference configuration includes the resistor RX and the capacitor CX.

In the switching power supply device according to the first reference configuration, when the output voltage Vout is stabilized by the PWM control, the on-duty Don of the output stage circuit MM is determined generally on the basis of the input voltage Vin and the output voltage Vout, and the theoretical value of the on-duty Don is "Vout/Vin." This applies not only to the first reference configuration but also widely to a step-down type switching power supply device (DC/DC converter) including the switching power supply device 1.

On the other hand, as described hereinabove, in a low load state, the power consumption can be reduced by stopping the action of the amplifier AMP1 and so forth with use of the sleep control. However, in the case where it is considered starting switching action by transiting from the sleep control to the PWM control (in order words, return and restart) in the first reference configuration, in order to cause the switching power supply device to act with a desired on-duty Don at the time of starting of switching action, a circuit for providing an appropriate initial voltage to the contrast voltage Vc is necessitated.

[Second Reference Configuration and Second Reference Action]

Figure 6A:
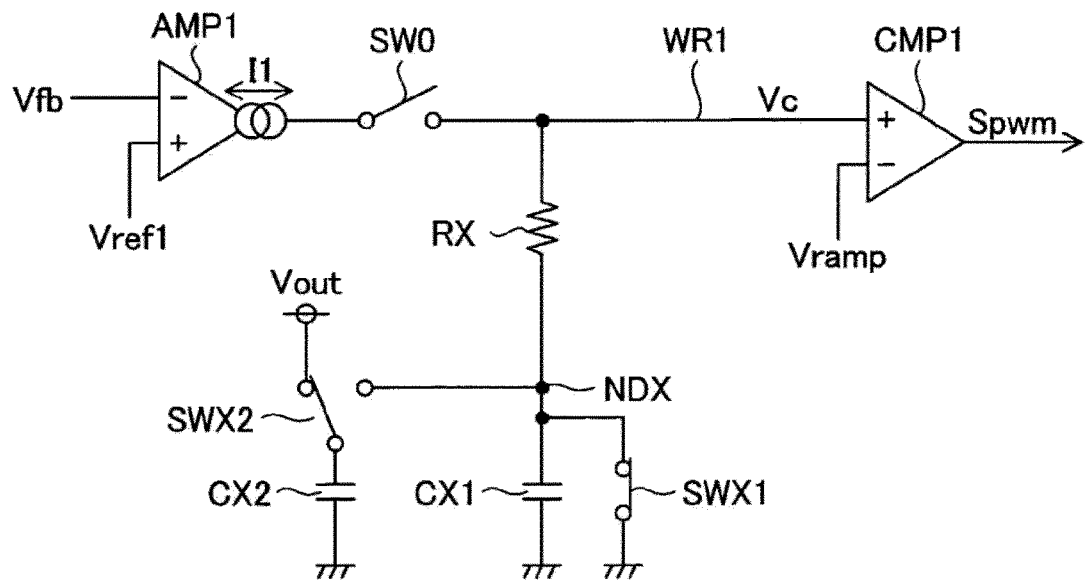
FIGS. 6A and 6B are a circuit diagram and a waveform diagram, respectively, illustrating a second reference configuration and a second reference action.

As a configuration and an action capable of providing an initial voltage to the contrast voltage Vc at the time of starting of switching action, a second reference configuration and a second reference action are described. FIG. 6A is a circuit diagram according to the second reference configuration, and FIG. 6B is a view illustrating the second reference action.

The second reference configuration uses the first reference configuration as a reference, and the capacitor CX is divided into a capacitor CX1 and another capacitor CX2. A switch SWX1 is connected in parallel to the capacitor CX1. The capacitor CX2 is connected at one end thereof to the ground. The switch SWX2 switchably connects the other end of the capacitor CX2 to an application end of the output voltage Vout or a connection node NDX between the capacitor CX1 and the resistor RX.

Thus, in the second reference action of the second reference configuration, within a period within which the switching action is stopped because of the sleep control, the switch SW0 is turned off, and the switch SWX1 is switched on as depicted in FIG. 6A, and the capacitor CX2 is connected to the application end of the output voltage Vout through the switch SWX2 to charge the capacitor CX2 with the output voltage Vout. When a switching action is to be started, the states of the switches SW0, SWX1, and SWX2 are all switched from the respective states of them in the sleep control (refer to FIG. 7A).

Figure 6B:
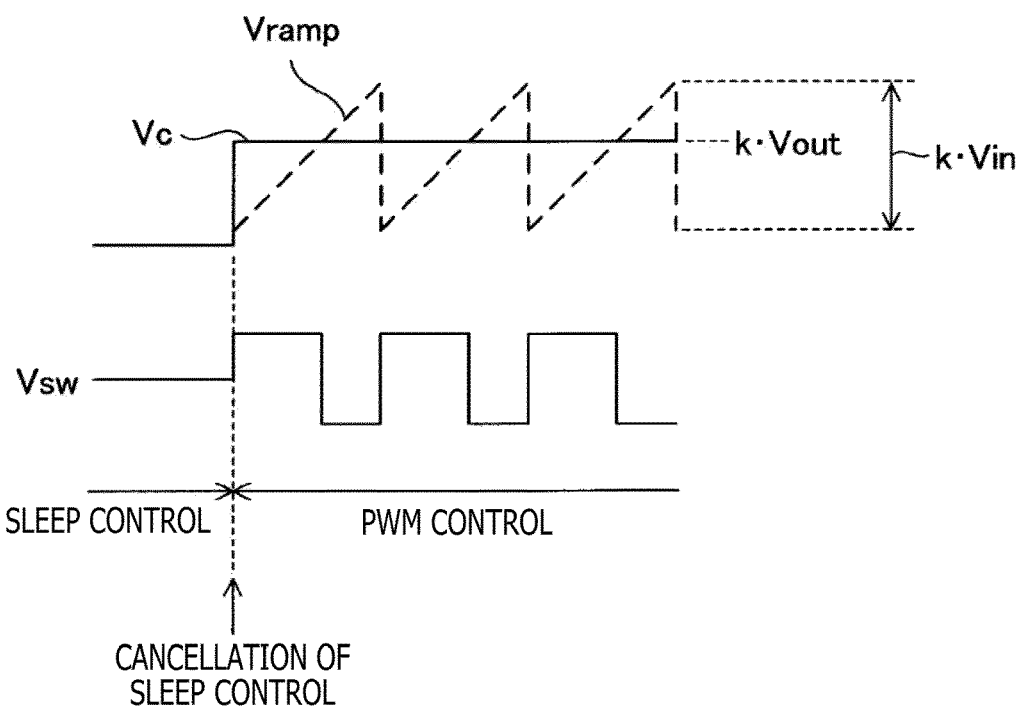

Here, if the relation between the first and second reference configurations is set so as to satisfy "CX1=(1−k)×CX" and "CX2=k×CX," then the contrast voltage Vc immediately after the connection destination of the capacitor CX2 through the switch SWX2 is switched, that is, the initial voltage of the contrast voltage Vc when the sleep control transits to the PWM control to start a switching action, is "k×Vout" (refer to FIG. 6B). At this time, if the amplitude of the ramp voltage Vramp is set to "k×Vin," then the initial value of the on-duty Don when a switching action is started becomes "Vout/Vin" coincident with the theoretical value described hereinabove (note that it is assumed that the lower limit of the variation range of the ramp voltage Vramp is 0 V or is sufficiently low). As a result, an overshoot or an undershoot of the output voltage Vout at the time of starting of an initial action can be prevented.

Figure 7A:
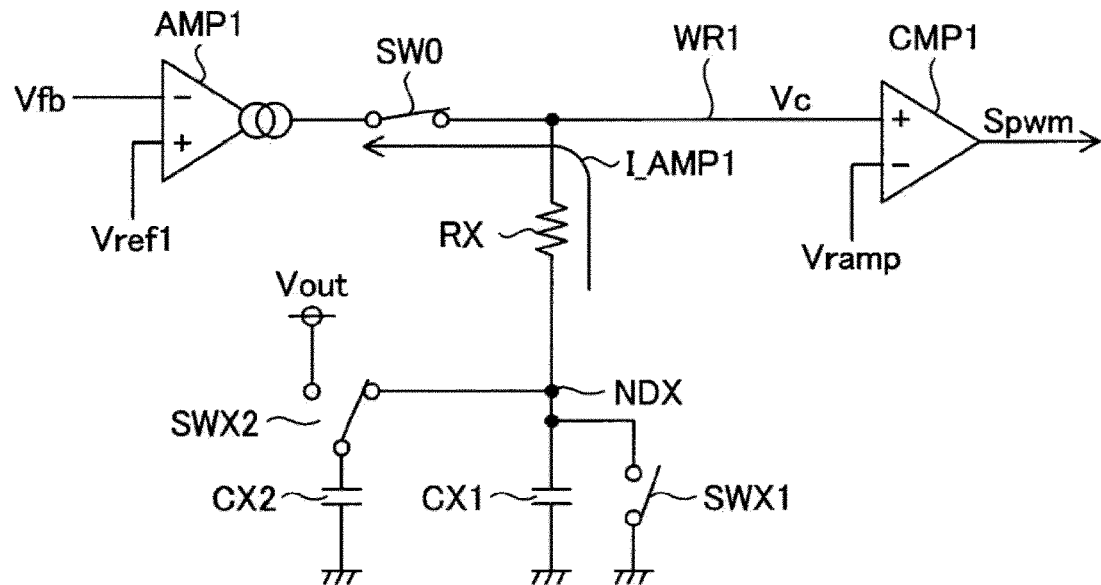
FIGS. 7A and 7B are a circuit diagram and a waveform diagram, respectively, illustrating the second reference configuration and the second reference action.

However, in the state where the output voltage Vout is displaced rather high with respect to the target voltage Vtg, when a switching action is started, since the amplifier AMP1 draws current I_AMP1 as depicted in FIG. 7A, the initial voltage of the contrast voltage Vc at the time of starting of a switching action is lower by the voltage drop (I_AMP1× RX) at a resistor RX than the voltage at the connection node NDX. As a result, the on-duty Don at the time of starting of a switching action is lower than the theoretical value described above.

Figure 7B:
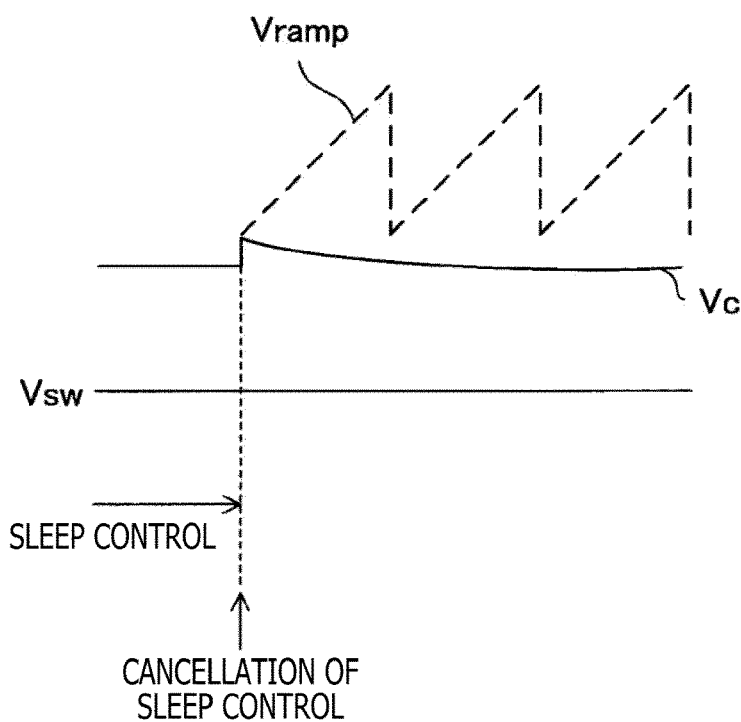

Such a situation as described above occurs when the control mode is switched from a state in which the switching action is stopped due to a low load in the auto mode to the forced PWM mode. In particular, in a low load state, the switching power supply device acts in a state in which the output voltage Vout is slightly higher than the target voltage Vtg (refer to FIG. 4). However, if the control mode is forcibly switched to the PWM control at a timing at which the output voltage Vout is reasonably high in comparison with the target voltage Vtg (that is, if the control mode switches to the forced PWM mode), then immediately after the switching, the contrast voltage Vc drops by a great amount from its ideal voltage and the on-duty Don at the time of starting of the switching action becomes significantly lower than the theoretical value. In some cases, as depicted in FIG. 7B, the contrast voltage Vc becomes lower than the variation range of the ramp voltage Vramp and a switching action is not started.

An actual circuit is restricted such that, at the time of starting of a switching action, between the transistors M1 and M2, the high-side transistor M1 is turned on first. This is common to the second reference configuration and the IC 100. In other words, when a switching action is to be started from a state in which the switching action is stopped in any of the second reference configuration and the IC 100, the gate signals G1 and G2 are controlled such that, between the transistors M1 and M2, the transistor M1 is turned on first without fail.

Figure 8:
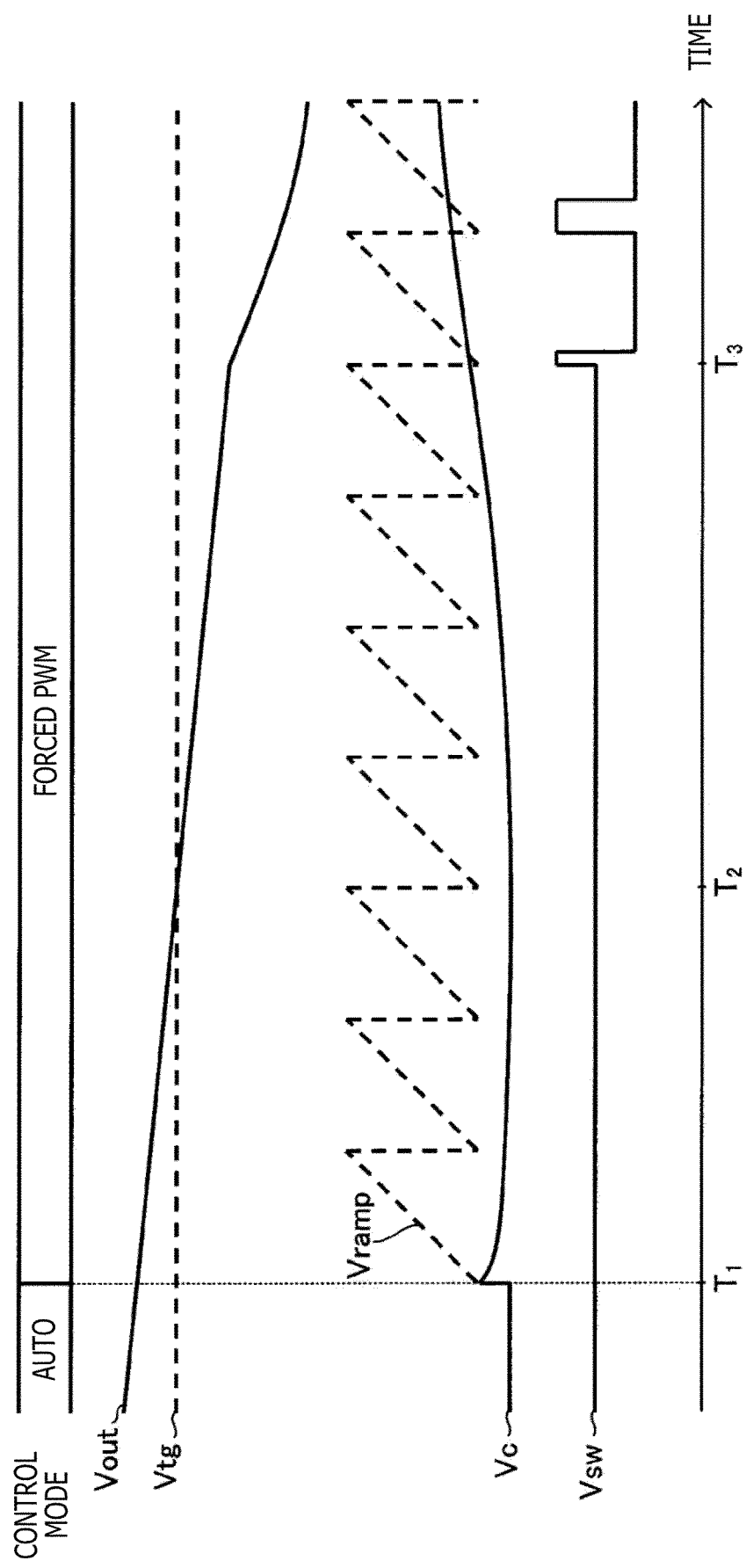
FIG. 8 is a timing chart illustrating a behavior of the second reference configuration upon control mode switching.

Therefore, in the second reference configuration, when the control mode is switched from a state in which a switching action is stopped in the auto mode to the forced PWM mode as depicted in FIG. 8, if the contrast voltage Vc immediately after the switching is lower than the variation range of the ramp voltage Vramp, then a switching action is not started immediately (that is, even if the forced PWM mode is entered, the transistors M1 and M2 are kept in an off state for a little while). Consequently, in the second reference configuration, the voltage at the node NDX is displaced from an ideal voltage within a period until a switching action is started, and at the time of starting of a switching action, the output voltage Vout sometimes undershoots.

Additional description is given of the timing chart of FIG. 8 that illustrates an example of action of the second reference configuration. In the example of FIG. 8, the switching power supply device acts in the auto mode until a timing $T_1$, and immediately before the timing $T_1$, the switching action is stopped because of a low load and the output voltage Vout is higher than the target voltage Vtg. At the timing $T_1$, the control mode is switched from the auto mode to the forced PWM mode. Together with the switching, the state of the switches SW0, SWX1, and SWX2 is switched from the state of FIG. 6A to the state of FIG. 7A across the timing $T_1$. However, due to an influence of the current I_AMP1, the contrast voltage Vc immediately after the timing $T_1$ is lower than the lower limit of the variation range of the ramp voltage Vramp (that is, the lower limit voltage value Vramp_MIN of FIG. 3). Therefore, a switching action is not started at the timing $T_1$.

Since the switching action is not executed, the output voltage Vout gradually drops, and if the output voltage Vout becomes lower than the target voltage Vtg, then the contrast voltage Vc soon starts rising by the function of the amplifier AMP1 (refer to the neighborhood of a timing $T_2$). Then, if the contrast voltage Vc becomes higher than the lower limit of the variation range of the ramp voltage Vramp (equivalent to the lower limit voltage value Vramp_MIN of FIG. 3), then a switching action is started (refer to the neighborhood of a timing $T_3$). It is to be noted that the on-duty Don immediately after the switching action is started is considerably small. In other words, from between an on period of the transistor M1 and an on period of the transistor M2, the latter period becomes dominant, and therefore, a further undershoot occurs with the output voltage Vout.

A configuration, an action and so forth of the switching power supply device 1 that can avoid occurrence of such an undershoot and so forth as described above are described in the following description of working examples. The first embodiment includes the following working examples EX1_1 to EX1_7. The matters described hereinabove in connection with the first embodiment (except the matters relating to the first reference configuration and the second reference configuration as well as the first reference action and the second reference action) are applied to the following working examples EX1_1 to EX1_7 unless otherwise specified and as long as there is no contradiction, and in the working examples, as regards matters contradictory to the matters described in connection with the first embodiment, description of the working examples may take precedence. Further, as long as there is no contradiction, matters described in the description of any one of the working examples EX1_1 to EX1_7 can be applied to any one of the other working examples (in other words, it is possible to combine two or more any ones of the plurality of working examples).

Working Example EX1_1

Figure 9:
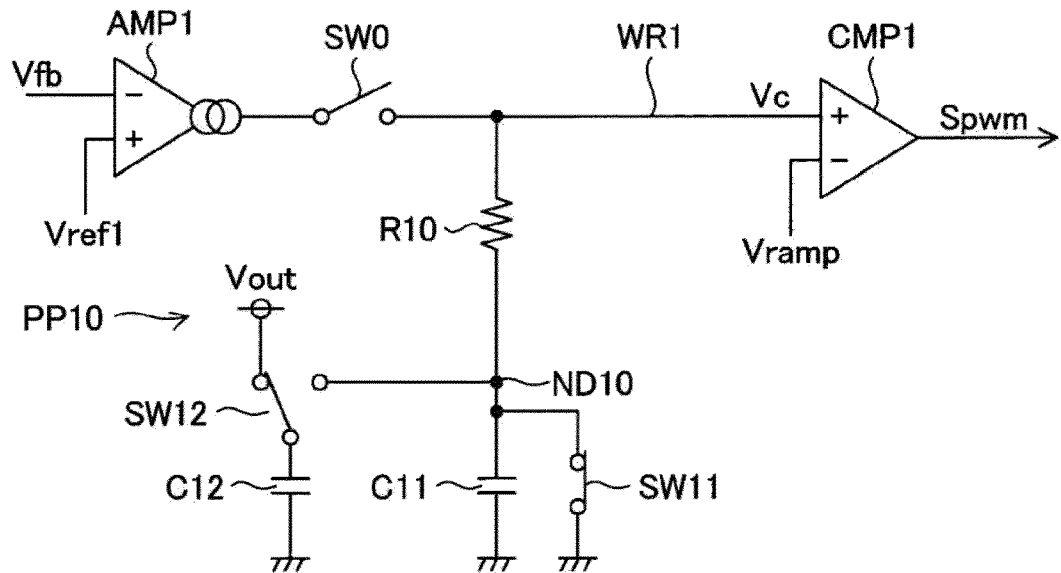
FIG. 9 is a circuit diagram of a phase compensation circuit and peripheral circuits according to a working example EX1_1 belonging to the first embodiment.

The working example EX1_1 is described. FIG. 9 depicts a phase compensation circuit PP10 according to the working example EX1_1 together with associated peripheral circuits. In the working example EX1_1, the phase compensation circuit PP10 is used as the phase compensation circuit PP of FIG. 1. The configuration itself of the phase compensation circuit PP10 of FIG. 9 is equivalent to that of the phase compensation circuit in the second reference configuration depicted in FIG. 6B.

The phase compensation circuit PP10 includes a phase compensation resistance section including a resistor R10, a phase compensation capacitance section including capacitors C11 and C12, and a switch group including switches SW11 and SW12. The state of the switches SW0, SW11, and SW12 is controlled by the switch controlling circuit SWC (refer to FIG. 1).

In the phase compensation circuit PP10, the resistor R10 is connected at one end thereof to the wire WR1 and the non-negated input terminal of the comparator CMP1 and at the other end thereof to a predetermined node ND10. The capacitor C11 is connected at one end thereof to the node ND10 and at the other end to the ground. The switch SW11 is connected in parallel to the capacitor C11. In other words, the switch SW11 is connected at one end and the other end thereof to the one end and the other end of the capacitor C11, respectively. Therefore, when the switch SW11 is off, the node ND10 is cut off in terms of DC from the ground, but when the switch SW11 is on, the node ND10 is connected to the ground through the switch SW11 and the voltage at the node ND10 becomes 0 V. The capacitor C12 is connected at one end thereof to the ground. Here, from between the opposite ends of the capacitor C12, one end that is connected to the ground is referred to as a first end and the other end is referred to as a second end. The switch SW12 switchably connects the second end of the capacitor C12 to the application end of the output voltage Vout (that is, to the terminal to which the output voltage Vout is applied) or to the node ND10.

Figure 10:
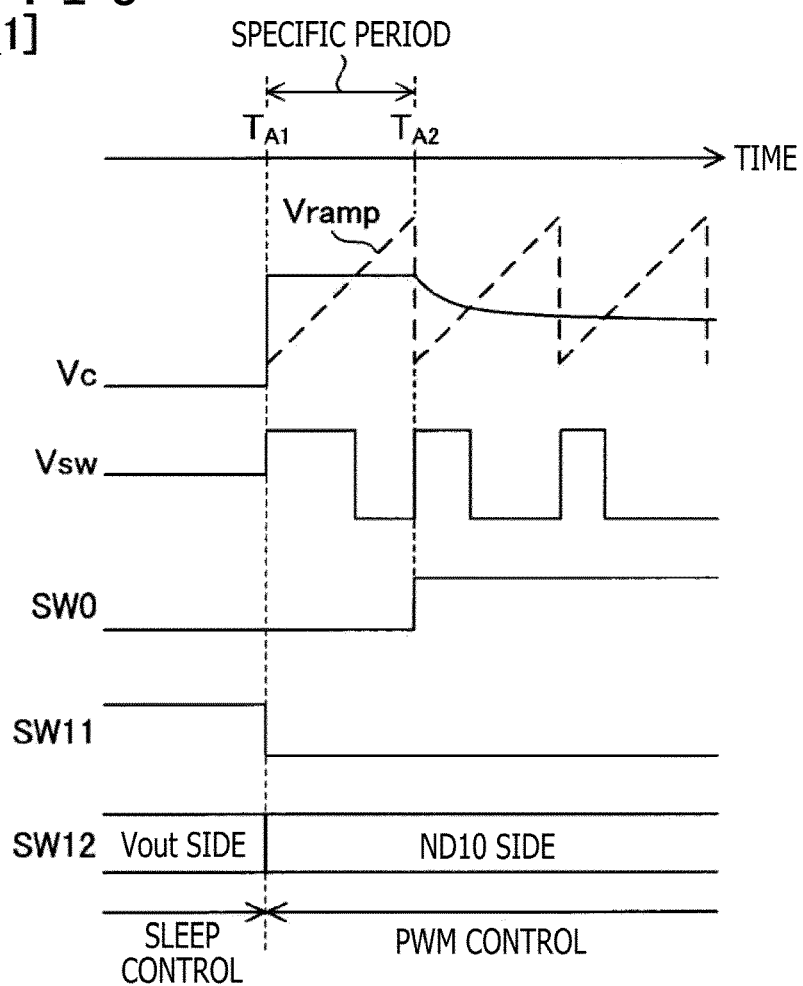
FIG. 10 is a timing chart at the time of control mode switching in the working example EX1_1.

FIG. 10 is a timing chart relating to the working example EX1_1. It is assumed that the switching power supply device acts in the auto mode until a timing $T_{A1}$ and, immediately before the timing $T_{A1}$, the switching action is stopped by the sleep control due to a low load. In FIG. 9, the state of the switches when the switching action is stopped by the sleep control is depicted. In the phase compensation circuit PP10, when the switching action is stopped by the sleep control, the switch SW0 is controlled off and the switch SW11 is controlled on, and the second end of the capacitor C12 is connected to the application end of the output voltage Vout by the switch SW12. Therefore, when the switching action is stopped by the sleep control, the capacitor C12 is charged by the output voltage Vout. Further, when the switching action is stopped by the sleep control, the switch SW11 is on, and therefore, the contrast voltage Vc is 0 V, and the ramp voltage Vramp becomes 0 V by stop of action of the ramp voltage generation circuit Gramp.

Figure 11A:
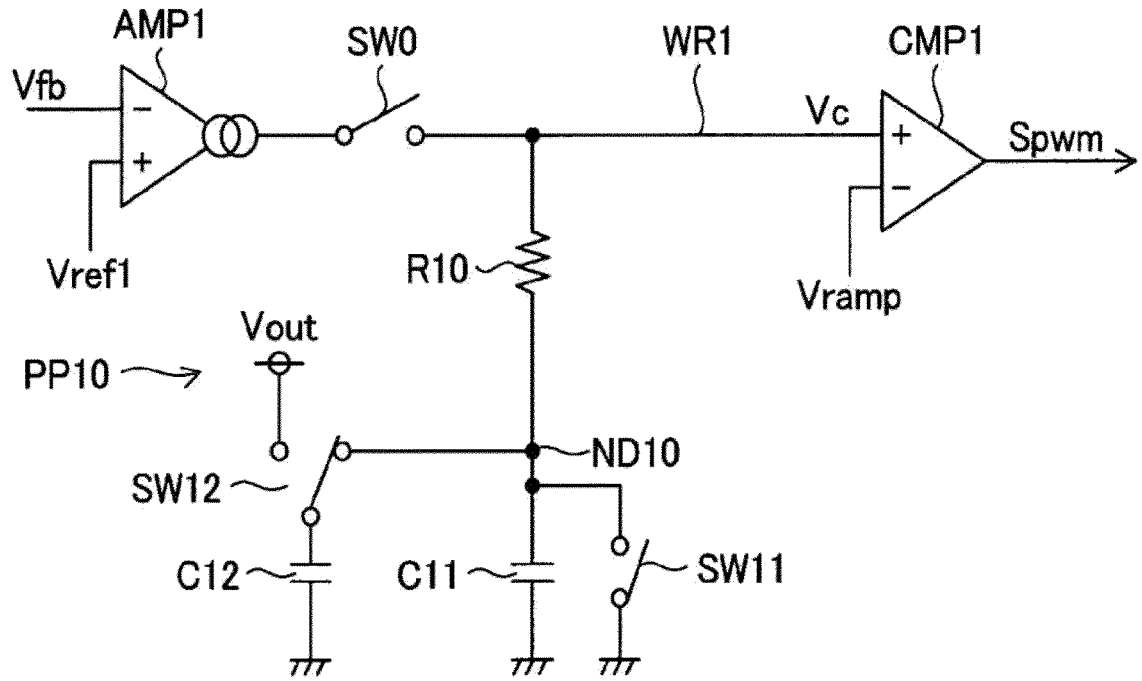
FIGS. 11A and 11B are circuit diagrams illustrating a state of switches at the time of control mode switching in the working example EX1_1.
Figure 11B:
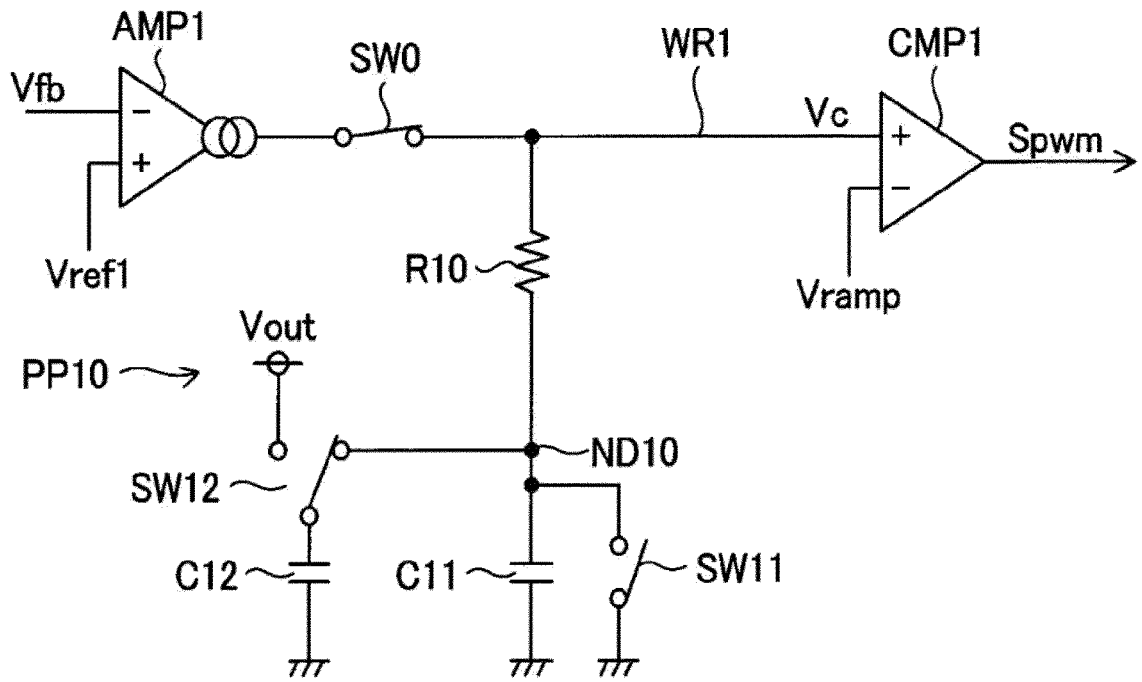

At the timing $T_{A1}$, the control mode is switched from the auto mode to the forced PWM mode. Together with this switching, the switch controlling circuit SWC switches the switch SW11 from an on state to an off state and switches the connection destination of the second end of the capacitor C12 through the switch SW12 from the application end of the output voltage Vout to the node ND10. Then, until after the specific period ends, the switch SW0 is kept in an off state, and at a timing $T_{A2}$ equivalent to an end timing of the specific period, the switch SW0 is switched to an on state. The state of the switches during the specific period is depicted in FIG. 11A, and the state of the switches after the specific period is depicted in FIG. 11B. Further, in response to transition to the forced PWM mode, the ramp voltage generation circuit Gramp starts its action at timing $T_{A1}$, and the ramp voltage Vramp starts its variation within its variation range as described hereinabove from the start point given by the timing $T_{A1}$.

In the example of FIG. 10, the specific period is a period from the timing $T_{A1}$ to the timing $T_{A2}$ and has a length equal to one or more periods of the PWM control. One period of the PWM control indicates the length of the PWM control and is equal to the period of the ramp voltage. In short, for example, if the switching frequency of the PWM control is 100 kHz (kilohertz), then the length of the PWM period is ten microseconds, and the length of the specific period in this case is ten microseconds or more.

Although, in the example of FIG. 10, the length of the specific period coincides with the length of one cycle of the PWM control, the length of the specific period is freely selected if it is equal to or longer than one period of the PWM control and is represented by "$q \times P_{PWM}$." Here, $P_{PWM}$ represents a period of time of one cycle of the PWM control (for example, 10 microseconds), and q is a real number equal to or greater than 1. Although q may basically be equal to or greater than 1 (for example, 1, 2, or 3), it may otherwise be a number other than an integer (for example, may be 1.5 or 2.5). It is to be noted that the description relating to the length of the specific period described in connection with the working example EX1_1 is applied in common with any other working example and any other embodiment hereinafter described.

In the case where the capacitance value of the capacitor C11 is represented by reference sign "C11" and the capacitance value of the capacitor C12 is represented by reference sign "C12," a relation of "C11:C12=(1−k):k is satisfied."The coefficient k satisfies "0<k<1." Consequently, within the specific period, a voltage equal to k times the output voltage Vout, namely, a voltage (k×Vout), is generated at the node ND10. Since this voltage (k×Vout) is applied to the wire WR1 through the resistor R10, the voltage (k×Vout) is set as the initial voltage of the contrast voltage Vc.

The initial voltage of the contrast voltage Vc indicates a voltage at an initial stage of the contrast voltage Vc at the time of switching from the sleep control to the PWM control (similarly, this also applies to any other working example and any other embodiment hereinafter described). More particularly, the initial voltage of the contrast voltage Vc indicates a voltage at an initial stage of the contrast voltage Vc at the time of starting of a switching action when a switching action is started by the forced PWM control from a state in which the switching action is stopped by the sleep control in the auto mode (similarly, this also applies to any other working example and any other embodiment hereinafter described).

On other hand, it is sufficient if the amplitude of the ramp voltage Vramp is set to "k×Vin." Accordingly, if it is assumed that the lower limit of the variation range of the ramp voltage Vramp is 0 V, then the initial value of the on-duty Don when a switching action is started can be made "Vout/Vin" that coincides with the theoretical value described hereinabove (actually, the lower limit of the variation range of the ramp voltage Vramp may be set to 0 V). In the case where the lower limit of the variation range of the ramp voltage Vramp is a positive value, the initial value for the on-duty Don may be set to or approximated to "Vout/Vin" by adjusting the capacitance value of the capacitors C11 and C12, the amplitude of the ramp voltage Vramp or the like, by additionally providing a switch S16 and a capacitor C16 hereinafter described (refer to FIG. 16) or by some other means taking the lower limit of the variation range of the ramp voltage Vramp (Vramp_MIN) into consideration.

In any case, the voltage generated at the node ND10 during the specific period is made a voltage within the variation range of the ramp voltage Vramp. Then, within the specific period, since the switch SW0 is off, drawing of current by the amplifier AMP1 does not occur, and a switching action that is to be started from turning on of the transistor M1 is started without fail at the start point given by the timing $T_{A1}$. After the switch SW0 is turned on through the specific period, the contrast voltage Vc is controlled according to the output voltage Vout by the amplifier AMP1, and thus, the on-duty Don changes according to the output voltage Vout.

In this manner, according to the working example EX1_1, a switching action can be started with certainty at the same time with switching of the control mode, and by starting a switching action with an optimum on-duty Don, an overshoot and an undershoot can be prevented.

Figure 12:
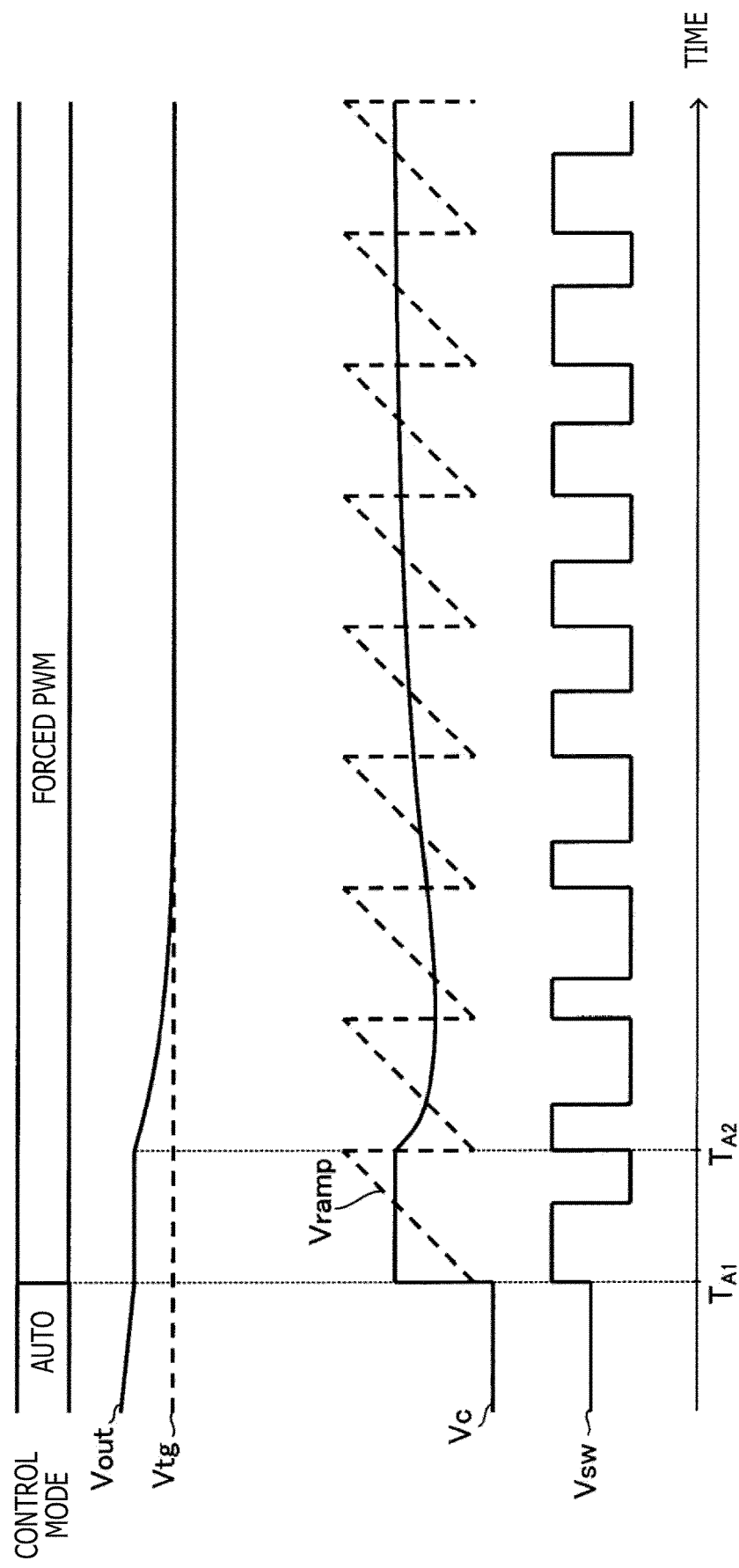
FIG. 12 is a timing chart at the time of control mode switching in the working example EX1_1.

FIG. 12 depicts another timing chart relating to the working example EX1_1. FIG. 12 corresponds to the timing chart of FIG. 10. Within the specific period between the timing $T_{A1}$ and the timing $T_{A2}$, since the switching power supply device acts with an ideal on-duty Don, little variation occurs with the output voltage Vout. After the specific period, the contrast voltage Vc is controlled according to the output voltage Vout. In particular, if the output voltage Vout is higher than the target voltage Vtg, then the contrast voltage Vc and the on-duty Don decrease, but if the output voltage Vout is lower than the target voltage Vtg, then the contrast voltage Vc and the on-duty Don increase, and the output voltage Vout approaches the target voltage Vtg. Consequently, the target voltage Vtg is reached almost without causing an overshoot or an undershoot.

It is to be noted, after the timing $T_{A2}$, due to the high output voltage Vout, the amplifier AMP1 draws current, and the contrast voltage Vc sometimes becomes lower than the lower limit of the variation range of the ramp voltage Vramp. However, since a switching action is once started within the specific period, within a period within which the contrast voltage Vc is equal to or lower than the ramp voltage Vramp after the specific period, the transistor M1 is kept in an off state and besides the transistor M2 is kept in an on state, also including a period within which the contrast voltage Vc is lower than the lower limit of the variation range of the ramp voltage Vramp. This is equivalent to that the PWM control is performed with the on-duty Don of 0%. If the transistor M2 is in an on state, then since current flows into the ground through the transistor M2 from the output terminal OUT (refer to FIG. 1), the output voltage Vout gradually drops. Then, if the output voltage Vout drops to a voltage lower than the target voltage Vtg, then the contrast voltage Vc rises until it becomes higher than the lower limit of the variation range or the ramp voltage Vramp, and consequently, a switching action is thereafter performed in every PWM period. The action described above after the specific period is similar also to any other working example and any other embodiment hereinafter described.

Working Example EX1_2

Figure 13:
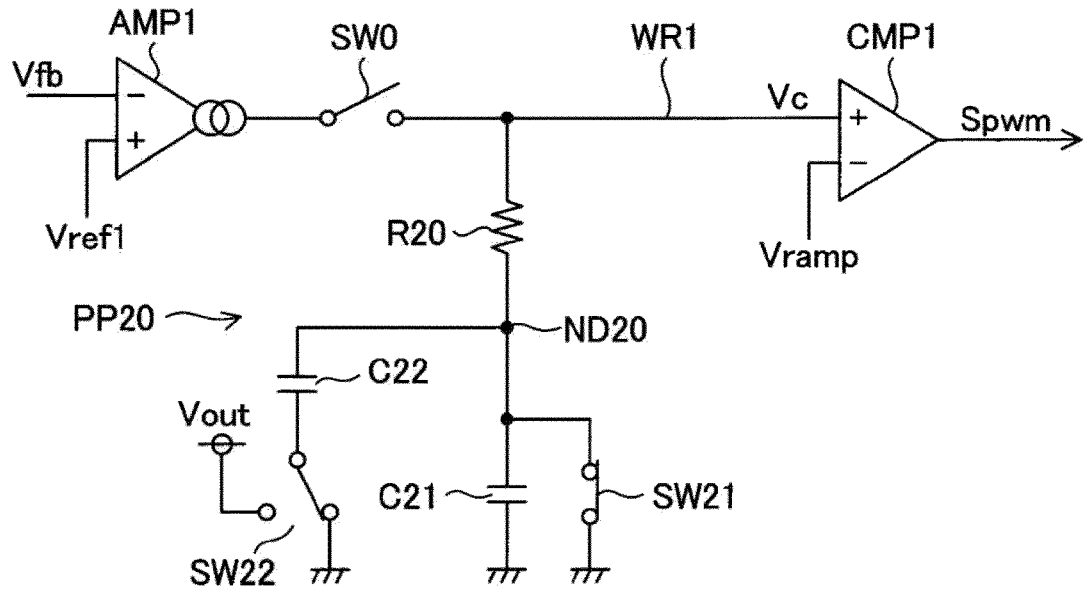
FIG. 13 is a circuit diagram of a phase compensation circuit and peripheral circuits according to a working example EX1_2 belonging to the first embodiment.

The working example EX1_2 is described. FIG. 13 depicts a phase compensation circuit PP20 according to the working example EX1_2 together with its peripheral circuits. In the working example EX1_2, the phase compensation circuit PP20 is used as the phase compensation circuit PP of FIG. 1.

The phase compensation circuit PP20 includes a phase compensation resistance section including a resistor R20, a phase compensation capacitance section including capacitors C21 and C22, and a switch group including switches SW21 and SW22. The state of the switches SW0, SW21, and SW22 is controlled by the switch controlling circuit SWC (refer to FIG. 1).

In the phase compensation circuit PP20, the resistor R20 is connected at one end thereof to the wire WR1 and the non-negated input terminal of the comparator CMP1 and at the other end thereof to a predetermined node ND20. The capacitor C21 is connected at one end thereof to the node ND20 and at the other end thereof to the ground. The switch SW21 is connected in parallel to the capacitor C21. In other words, the switch SW21 is connected at one end and the other end thereof to the one end and the other end of the capacitor C21, respectively. Therefore, when the switch SW21 is off, the node ND20 is cut off in terms of DC from the ground, but when the switch SW21 is on, the node ND20 is connected to the ground though the switch SW21 and the potential at the node ND20 becomes 0 V. In the phase compensation circuit PP20, the capacitor C22 is connected at one end thereof to the node ND20. Here, between the opposite ends of the capacitor C22, one end connected to the node ND20 is referred to as a first end and the other end is referred to as a second end. In the phase compensation circuit PP20, the switch SW22 switchably connects the second end of the capacitor C22 to the application end of the output voltage Vout (that is, terminal to which the output voltage Vout is applied) or the ground.

Figure 14:
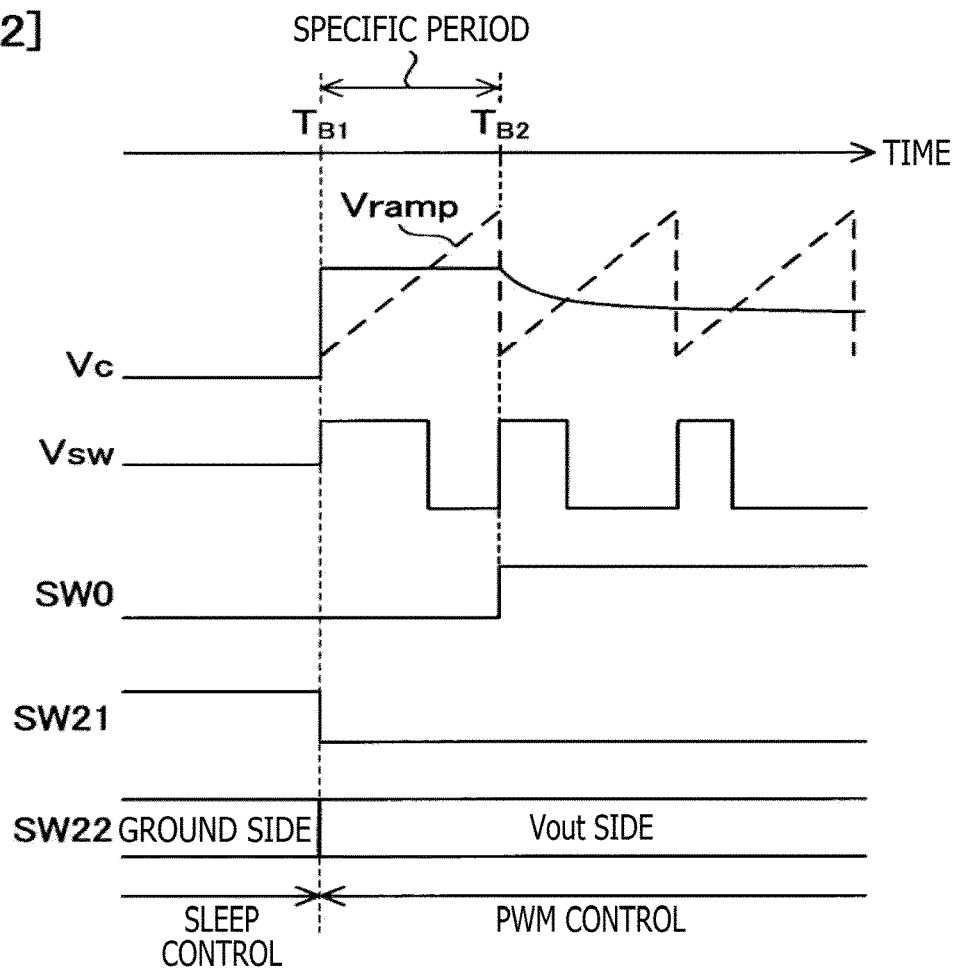
FIG. 14 is a timing chart at the time of control mode switching in the working example EX1_2.

FIG. 14 is a timing chart relating to the working example EX1_2. Until a timing $T_{B1}$, the switching power supply device acts in the auto mode, and it is assumed that, immediately before the timing $T_{B1}$, the switching action is stopped by the sleep control because of a low load. In FIG. 13, the state of the switches when the switching action is stopped by the sleep control is depicted. In the phase compensation circuit PP20, when the switching action is stopped by the sleep control, the switch SW0 is off and the switch SW21 is on, and by the switch SW22, the second end of the capacitor C22 is connected to the ground. Further, when the switch action is stopped by the sleep control, the contrast voltage Vc is 0 V because the switch SW21 is on, and the ramp voltage Vramp is 0 V by the stop of action of the ramp voltage generation circuit Gramp.

Figure 15A:
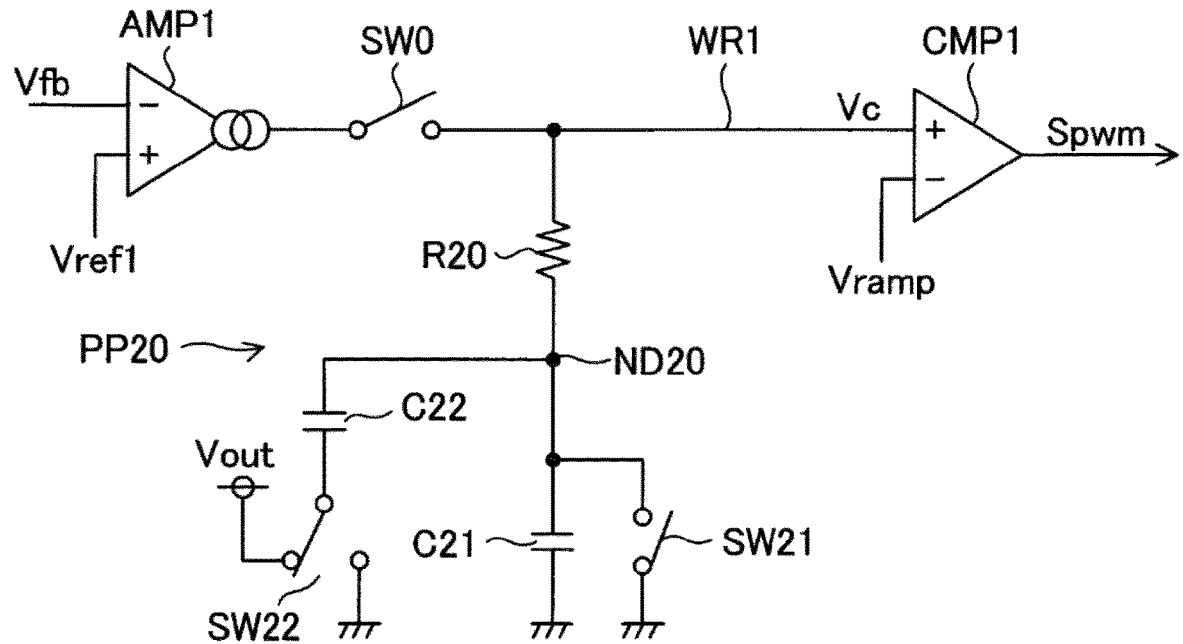
FIGS. 15A and 15B are circuit diagrams illustrating a state of switches at the time of control mode switching in the working example EX1_2.
Figure 15B:
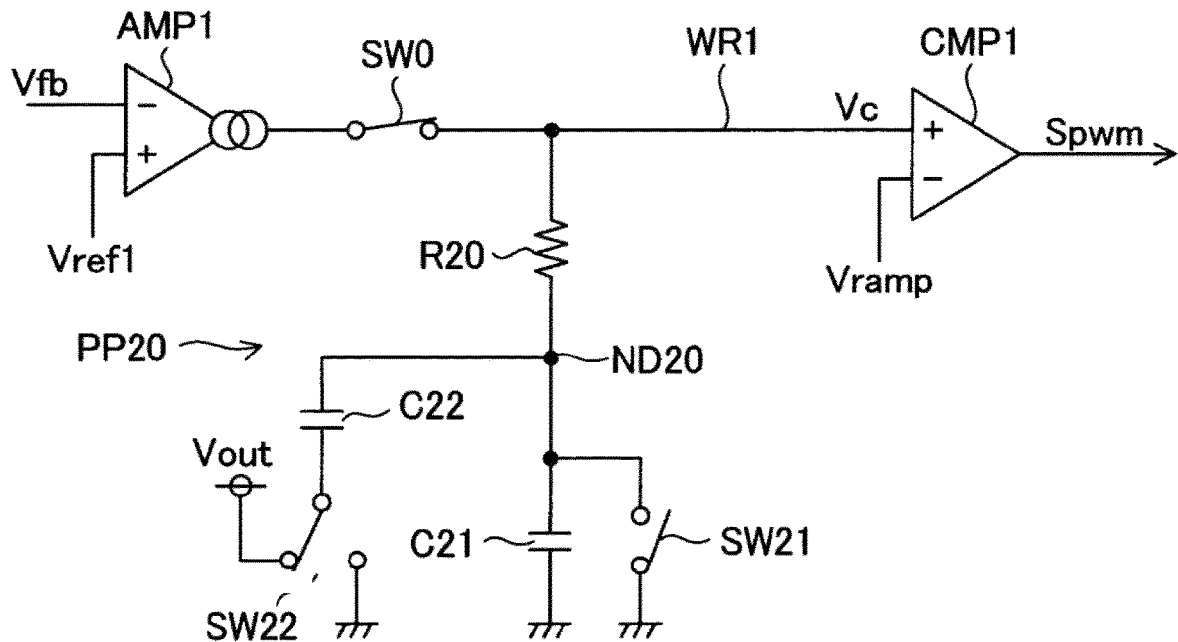

At the timing $T_{B1}$, the control mode is switched from the auto mode to the forced PWM mode. Together with the switching, the switch controlling circuit SWC switches the switch SW21 from an on state to an off state and switches the connection destination of the second end of the capacitor C22 through the switch SW22 from the ground to the application end of the output voltage Vout across the timing $T_{B1}$. However, the switch SW0 is kept in an off state until the specific period comes to an end, and at a timing $T_{B2}$ equivalent to the end timing of the specific period, the switch SW0 is switched to an on state. FIG. 15A depicts the state of the switches during the specific period, and FIG. 15B depicts the state of the switches after the specific period. Further, by transition to the forced PWM mode, the ramp voltage generation circuit Gramp starts its action at the timing $T_{B1}$ and the ramp voltage Vramp starts variation within the variation range of itself as depicted hereinabove at the start point given by the timing $T_{B1}$.

In the example of FIG. 14, the specific period is a period from the timing $T_{B1}$ to the timing $T_{B2}$, and the specific period has a length "$q \times P_{PWN}$" that is equal to or longer than one period of the PWM control as described hereinabove in connection with the working example EX1_1.

Within the specific period, a voltage equal to k times the output voltage Vout, namely, a voltage (k×Vout), is generated at the node ND20, and this voltage (k×Vout) is applied to the wire WR1 through the resistor R20 and is set as an initial voltage for the contrast voltage Vc. The value of the coefficient k depends upon the ratio between the capacitance value of the capacitor C21 and the capacitance value of the capacitor C22 (0<k<1).

On the other hand, it is sufficient if the amplitude of the ramp voltage Vramp is set to "k×Vin." Accordingly, if it is assumed that the lower limit of the variation range of the ramp voltage Vramp is 0 V, then the initial value of the on-duty Don when a switching action is to be started can be made "Vout/Vin" that coincides with the theoretical value described hereinabove (actually the lower limit of the variation range of the ramp voltage Vramp may be set to 0 V). In the case where the lower limit of the variation range of the ramp voltage Vramp is a positive value, taking the lower limit of the variation range of the ramp voltage Vramp (Vramp_MIN) into consideration, the initial value for the on-duty Don may be set or approximated to "Vout/Vin" by adjusting the capacitance value of the capacitors C21 and C22 or the amplitude of the ramp voltage Vramp, or by adding a switch S16 and a capacitor C16 hereinafter described (refer to FIG. 16) or by some other suitable means.

In any case, the voltage generated at the node ND20 within the specific period is made a voltage within the variation range of the ramp voltage Vramp. Then, within the specific period, since the switch SW0 is off, drawing of current by the amplifier AMP1 does not occur, and a switching action that is to start from turning on of the transistor M1 is started without fail at the start point given by the timing TB1. After the switch SW0 is turned on after the specific period, the contrast voltage Vc is controlled in response to the output voltage Vout by the amplifier AMP1, and therefore, the on-duty Don changes in response to the output voltage Vout.

In this manner, also by the working example EX1_2, a switching action can be started with certainty at the same time with switching of the control mode, and by starting a switching action with an optimum on-duty Don, an overshoot and an undershoot can be prevented.

Working Example EX1_3

A working example EX1_3 is described. The method indicated by the working examples EX1_1 and EX1_2 belongs to a first method by which, within a specific period, while the switch SW0 is controlled off, the voltage within the variation range of the ramp voltage Vramp (for example, a voltage that corresponds to the output voltage Vout and is within the variation range of the ramp voltage Vramp) is set to an initial voltage for the contrast voltage Vc. As long as this setting is implemented, the implementation method for the first method can be selected freely.

Figure 16:
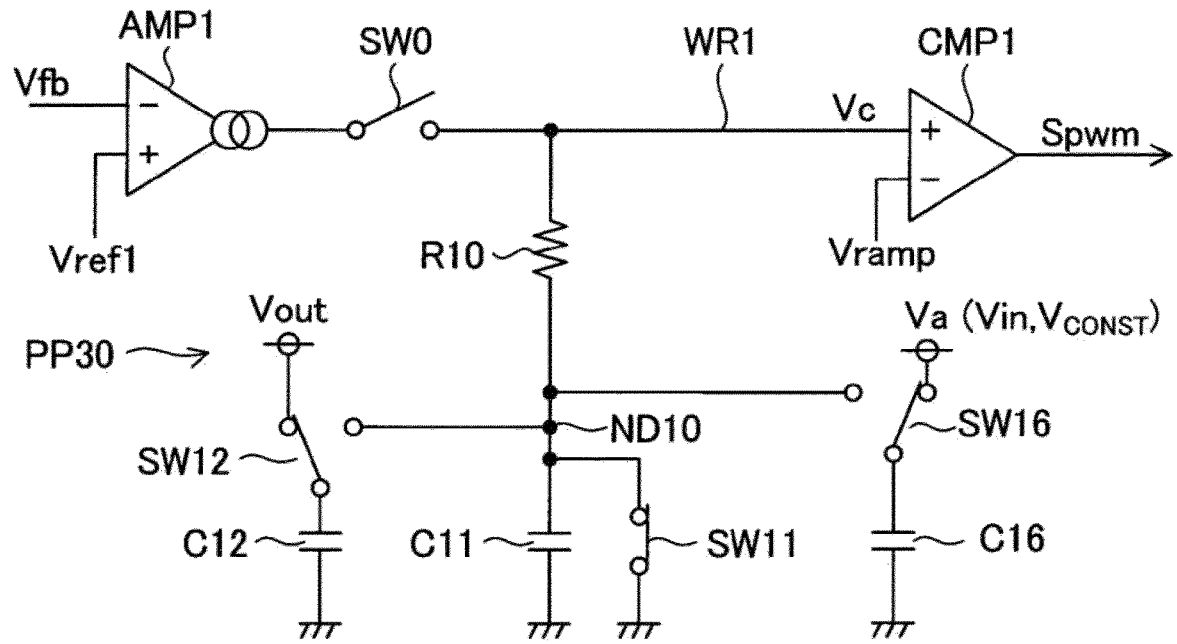
FIG. 16 is a circuit diagram of a phase compensation circuit and peripheral circuits according to a working example EX1_3 belonging to the first embodiment.

For example, the phase compensation circuit PP10 of FIG. 9 may be modified to a phase compensation circuit PP30 of FIG. 16 such that the phase compensation circuit PP30 is used as the phase compensation circuit PP (refer to FIG. 1). The phase compensation circuit PP30 includes a phase compensation resistance section including a resistor R10, a phase compensation capacitance section including capacitors C11, C12, and C16, and a switch group including switches SW11, SW12, and SW16. The state of the switches SW0, SW11, SW12, and SW16 is controlled by the switch controlling circuit SWC (refer to FIG. 1).

The phase compensation circuit PP30 is configured such that the phase compensation circuit PP10 of FIG. 9 additionally includes the capacitor C16 and the switch SW16. Except for this addition, the phase compensation circuit PP30 is similar in configuration and action to the phase compensation circuit PP10. The phase compensation circuit PP30 is described by especially focusing on the difference between the circuits PP10 and PP30 (in regard to matters not specifically described, the description of the working example EX1_1 is also applied to the phase compensation circuit PP30).

The capacitor C16 is connected at a first end thereof to the ground, and the switch SW16 switchably connects the second end of the capacitor C16 to the application end of a voltage Va (that is, to a terminal to which the voltage Va is applied) or the node ND10. The voltage Va may be the input voltage Vin or may be a predetermined positive DC voltage $V_{CONST}$ (for example, 3.3 V) generated on the basis of the input voltage Vin.

An example of action in FIG. 10 relating to the phase compensation circuit PP30 is considered. The phase compensation circuit PP30 acts in the auto mode until a timing $T_{A1}$, and it is assumed that, immediately before the timing $T_{A1}$, a switching action is stopped by the sleep control due to a low load. FIG. 16 depicts the state of the switches when the switching action is stopped by the sleep control. In the phase compensation circuit PP30, when the switching action is stopped by the sleep control, the switch SW0 is off and the switch SW11 is on, and the second terminal of the capacitor C12 is connected to the application end of the output voltage Vout by the switch SW12 while the second end of the capacitor C16 is connected to the application end of the voltage Va. Therefore, when the switching action is stopped by the sleep control, the capacitor C12 is charged by the output voltage Vout and the capacitor C16 is charged by the voltage Va.

At the timing $T_{A1}$, the control mode is switched from the auto mode to the forced PWM mode. The state of the switches SW0, SW11, and SW12 at and after the timing $T_{A1}$ is such as described hereinabove in connection with the working example EX1_1. In the phase compensation circuit PP30, at the timing $T_{A1}$, the connection destination of the second end of the capacitor C16 through the switch SW16 is switched from the application end of the voltage Va to the node ND10. Consequently, in comparison with an alternative case in which the phase compensation circuit PP10 of FIG. 9 is used, the initial voltage for the contrast voltage Vc can be increased by an amount corresponding to the accumulated charge of the capacitor C16. This is useful for optimization of the initial voltage for the contrast voltage Vc and the initial value for the on-duty Don.

It is also possible to add the capacitor C16 and the switch SW16 to the phase compensation circuit PP20 of FIG. 13, and in this case, it is sufficient if the connection destination of the second end of the capacitor C16 through the switch SW16 during the specific period is set to the node ND20.

Working Example EX1_4

Figure 17:
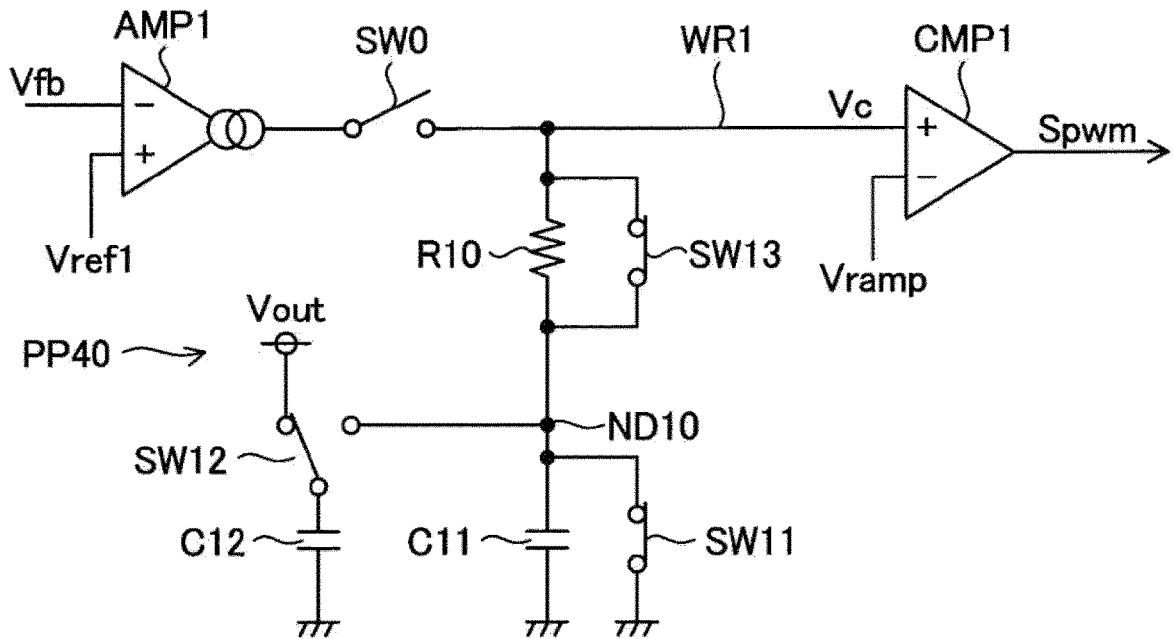
FIG. 17 is a circuit diagram of a phase compensation circuit and peripheral circuits according to a working example EX1_4 belonging to the first embodiment.

The working example EX1_4 is described. FIG. 17 depicts a phase compensation circuit PP40 according to the working example EX1_4 together with peripheral circuits. In the working example EX1_4, the phase compensation circuit PP40 is used as the phase compensation circuit PP of FIG. 1.

The phase compensation circuit PP40 includes a phase compensation resistance section including a resistor R10, a phase compensation capacitance section including capacitors C11 and C12, and a switch group including switches S11 to S13. The state of the switches SW0 and S11 to S13 is controlled by the switch controlling circuit SWC (refer to FIG. 1).

The phase compensation circuit PP40 is configured such that the phase compensation circuit PP10 of FIG. 9 additionally includes a switch SW13, and except for this addition, the phase compensation circuits PP10 and PP30 are the same as each other, and therefore, overlapping description of the same components is omitted. In the phase compensation circuit PP40, the switch SW13 is connected in parallel to the resistor R10. In particular, the switch SW13 is connected at one end thereof to the wire WR1 and at the other end thereof to the node ND10.

Figure 18:
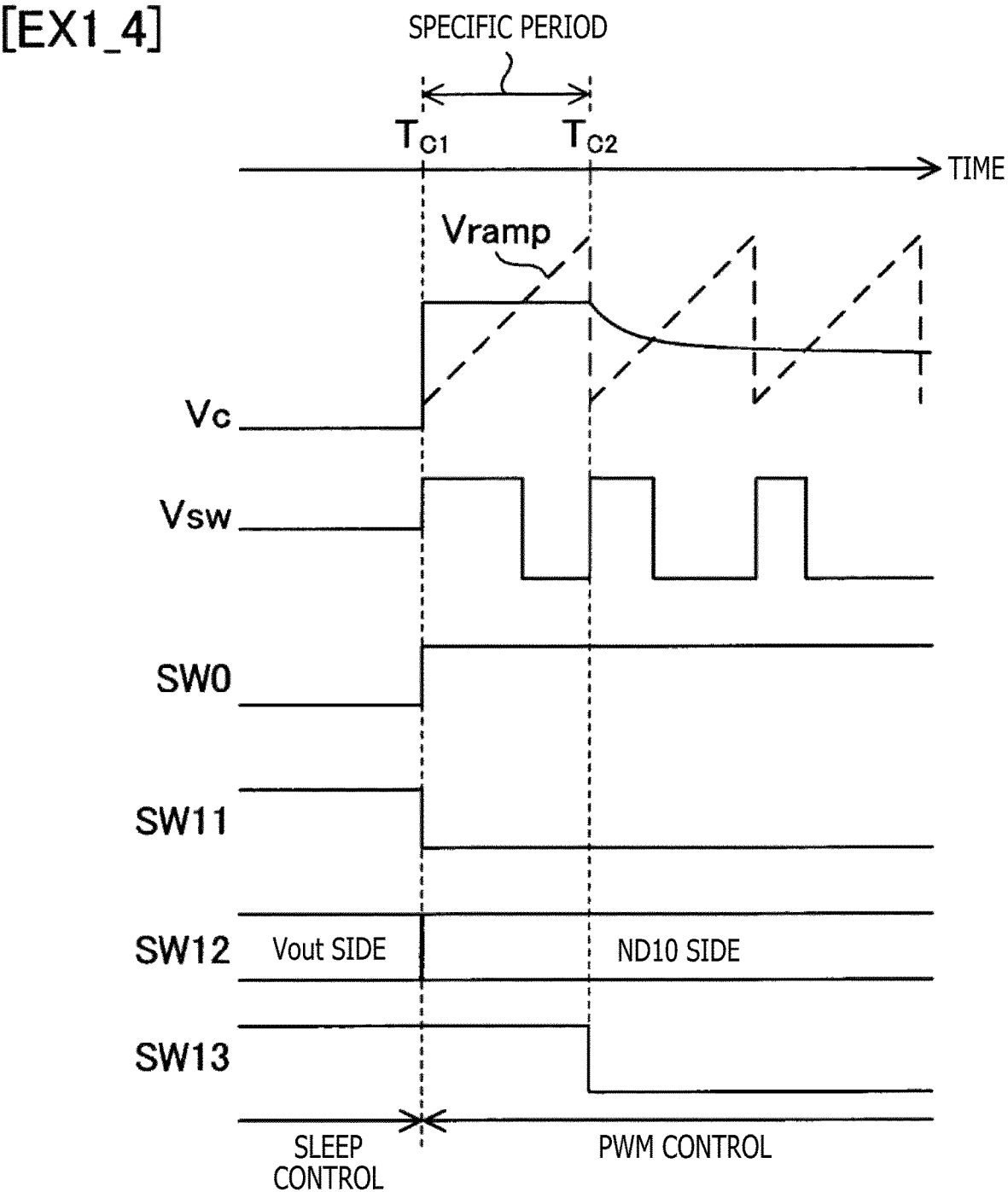
FIG. 18 is a timing chart at the time of control mode switching in the working example EX1_4.

FIG. 18 is a timing chart relating to the working example EX1_4. The phase compensation circuit PP40 acts in the auto mode until a timing $T_{C1}$, and it is assumed that, immediately before the timing $T_{C1}$, the switching action is stopped by the sleep control. In FIG. 17, the state of the switches when the switching action is stopped by the sleep control is depicted. In the phase compensation circuit PP40, when the switching action is stopped by the sleep control, the switch SW0 is off and the switch SW11 is on while the switch SW13 is on, and the second end of the capacitor C12 is connected to the application end of the output voltage Vout by the switch SW12 (as described in connection with the working example EX1_1, the first end of the capacitor C12 is connected to the ground). Therefore, when the switching action is stopped by the sleep control, the capacitor C12 is charged by the output voltage Vout. Further, when the switching action is stopped by the sleep control, the contrast voltage Vc is 0 V because the switch SW11 is on, and the ramp voltage Vramp is 0 V by stop of action of the ramp voltage generation circuit Gramp. It is to be noted that, when the switching action is stopped by the sleep control, the switch SW13 may otherwise be off.

Figure 19A:
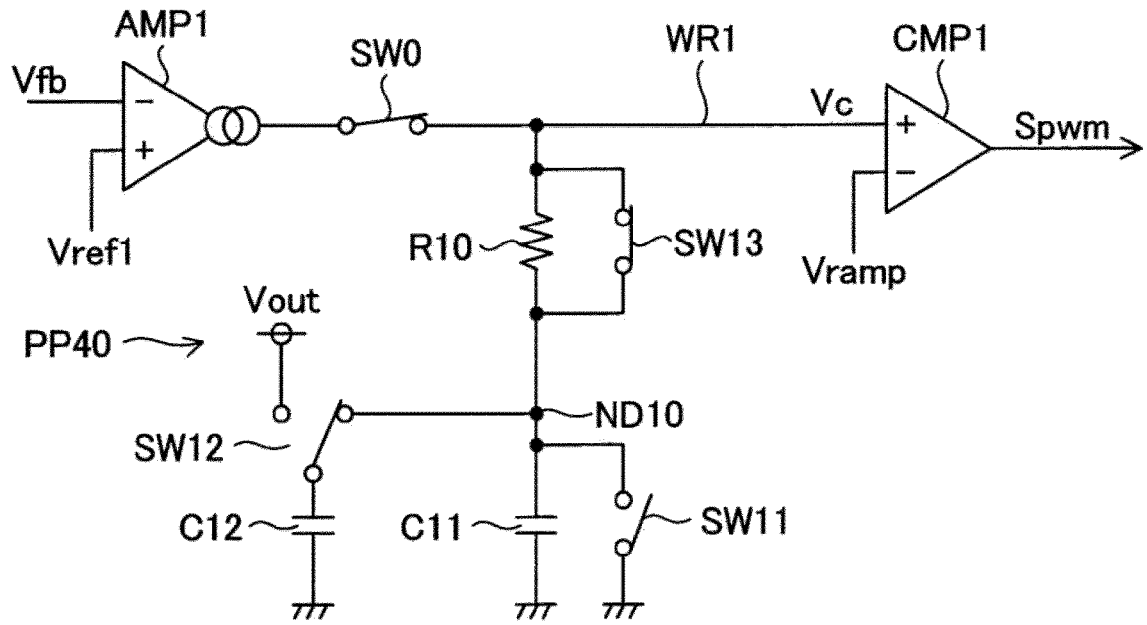
FIGS. 19A and 19B are circuit diagrams illustrating a state of switches at the time of control mode switching in the working example EX1_4.
Figure 19B:
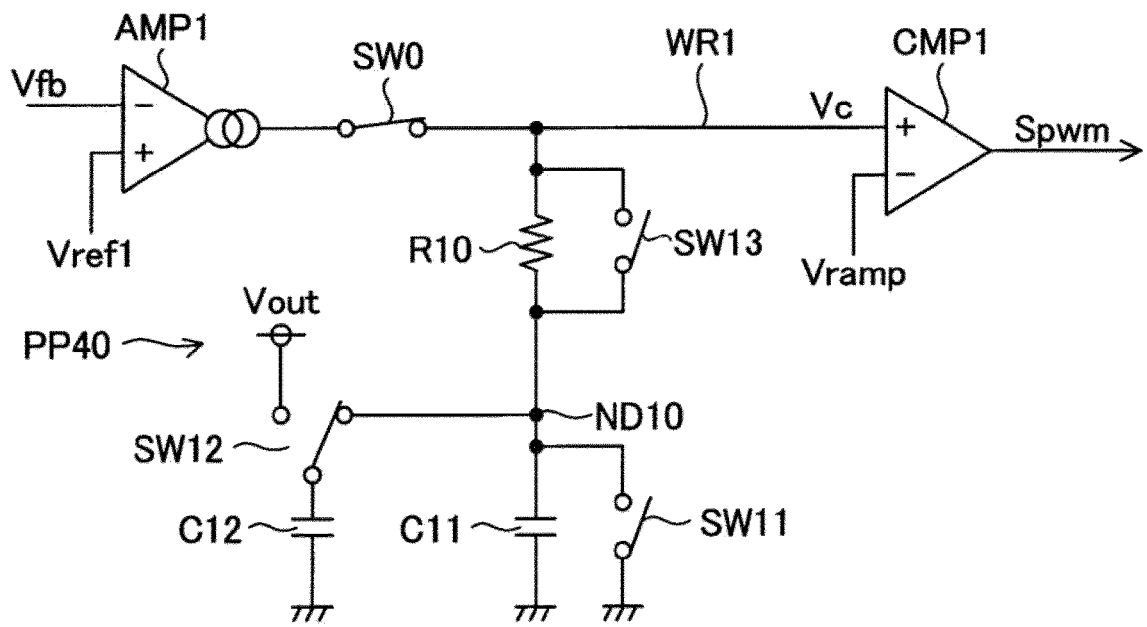

At the timing $T_{C1}$, the control mode is switched from the auto mode to the forced PWM mode. Together with this switching, the switch controlling circuit SWC switches the switch SW0 from an off state to an on state, and switches the switch SW11 from an on state to an off state, and further switches the connection destination of the second end of the capacitor C12 through the switch SW12 from the application end of the output voltage Vout to the node ND10 across the timing $T_{C1}$. However, until the specific period comes to an end, the switch controlling circuit SWC keeps the switch SW13 in an on state and switches the switch SW13 into an off state at a timing $T_{C2}$ that corresponds to an end timing of the specific period. FIG. 19A depicts the state of the switches during the specific period, and FIG. 19B depicts the state of the switches after the specific period. Further, in response to the transition to the forced PWM mode, the ramp voltage generation circuit Gramp starts its action at the timing $T_{C1}$, and the ramp voltage Vramp starts variation within its own variation range as described above at the start point given by the timing $T_{C1}$.

In the example of FIG. 18, the specific period is a period from the timing $T_{C1}$ to the timing $T_{C2}$ and has the length "q×$P_{PWN}$" equal to or longer than one period of the PWM control similarly as described hereinabove in connection with the working example EX1_1.

Further, as described hereinabove, in the case where the capacitance value of the capacitor C11 is represented by "C11" and the capacitance value of the capacitor C12 is represented by "C12," they satisfy the relation of "C11:C12 =(1−k):k." The coefficient k satisfies "0 <k <1." Consequently, within the specific period, a voltage equal to k times the output voltage Vout, namely, the voltage (k×Vout), is generated at the node ND10. This voltage (k×Vout) is applied to the wire WR1 through the parallel circuit of the resistor R10 and the switch SW13 to set the voltage (k×Vout) as the initial voltage for the contrast voltage Vc.

Since the switch SW0 is in an on state during the specific period, the amplifier AMP1 sometimes inputs or outputs current from or to the wire WR1 through the switch SW0. However, since the resistance value between the node ND10 and the wire WR1 within the specific period substantially has a value dropped substantially to an on resistance value of the switch SW13, within the specific period, the voltage (k×Vout) generated at the node ND10 is substantially set as the initial voltage for the contrast voltage Vc. The on resistance value of the switch SW13 is sufficiently lower than the resistance value of the resistor R10, and it may be considered that the opposite ends of the resistor R10 are short-circuited by turning on of the switch SW13.

On the other hand, it is sufficient if the amplitude of the ramp voltage Vramp is set to "k×Vin." Accordingly, if it is assumed that the lower limit of the variation range of the ramp voltage Vramp is 0 V, then it is possible to set the initial value for the on-duty Don when a switching action is to be started to "Vout/Vin" coincident with the theoretical value described hereinabove (actually the lower limit of the variation range of the ramp voltage Vramp may be set to 0 V). In the case where the lower limit of the variation range of the ramp voltage Vramp is a positive value, taking the lower limit of the variation range of the ramp voltage Vramp (Vramp_MIN) into consideration, the initial value for the on-duty Don may be set or approximated to "Vout/Vin" by adjusting the capacitance value of the capacitors C11 and C12 or the amplitude of the ramp voltage Vramp, by adding the switch S16 and the capacitor C16 described hereinabove (refer to FIG. 16) or by some other suitable means.

In any case, the voltage generated at the node ND10 within the specific period is made a voltage within the variation range of the ramp voltage Vramp. Then, within the specific period, since the switch SW13 is on, a voltage drop between the node ND10 and the wire WR1 does not substantially occur, and a switching action that is to start from turning on of the transistor M1 is started without fail at the start point given by the timing $T_{C1}$. After the switch SW13 is turned off after the specific period, the contrast voltage Vc is controlled according to the output voltage Vout by the amplifier AMP1 in a state in which the phase of the contrast voltage Vc is compensated for with an appropriate phase compensation constant by the resistor R10 and the capacitors C11 and C12, and the on-duty Don changes according to the output voltage Vout.

In this manner, according to the working example EX1_4, a switching action can be started with certainty at the same time with switching of the control mode, and since a switching action is started with an optimum on-duty Don, an overshoot and an undershoot can be prevented.

In the phase compensation circuit PP40, the resistor R10 and the switch SW13 are connected in parallel, and since the resistance value between the phase compensation capacitance section and the wire WR1 changes depending upon the state of the switch SW13, it can also be considered that the phase compensation resistance section includes the parallel circuit of the resistor R10 and the switch SW13. The resistor R10 has a predetermined resistance value, and within an on period of the switch SW13 including the specific period, the resistance value of the phase compensation resistance section including the parallel circuit of the resistor R10 and the switch SW13 is lower than the predetermined resistance value. Then, if the switch SW13 is placed into an off state after the specific period, then the resistance value of the phase compensation resistance section including the parallel circuit of the resistor R10 and the switch SW13 returns to the resistance value of the resistor R10 (predetermined resistance value).

Working Example EX1_5

Figure 20:
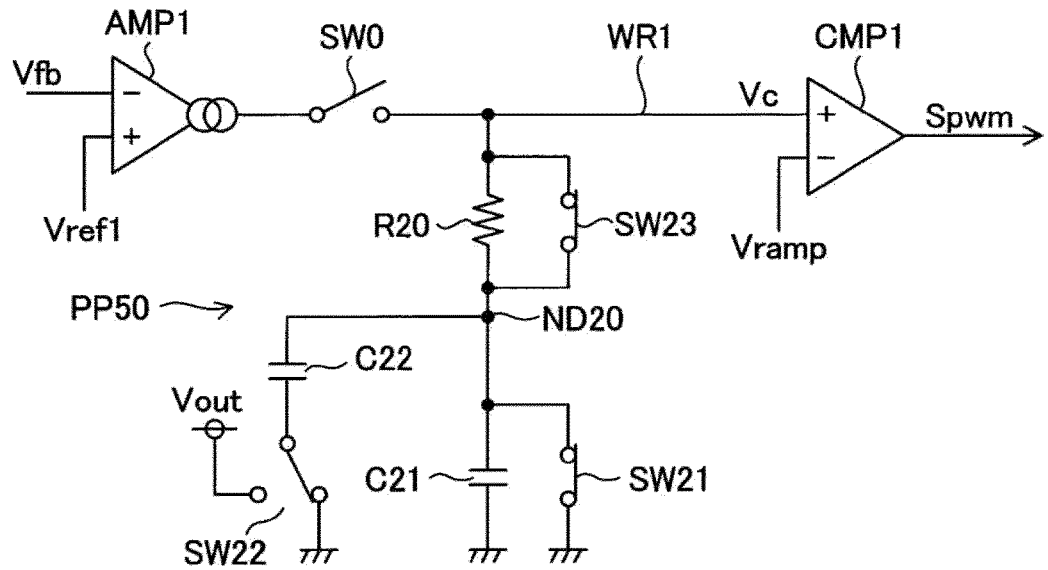
FIG. 20 is a circuit diagram of a phase compensation circuit and peripheral circuits according to a working example EX1_5 belonging to the first embodiment.

The working example EX1_5 is described. FIG. 20 depicts a phase compensation circuit PP50 according to the working example EX1_5 together with associated peripheral circuits. In the working example EX1_5, the phase compensation circuit PP50 is used as the phase compensation circuit PP of FIG. 1. The working example EX1_5 is equivalent to a modification of the configuration and action of the working example EX1_2 (FIGS. 13 and 14) similarly as in the case where the configuration and the action of the working example EX1_1 (FIGS. 9 and 10) are modified to those of the working example EX1_4 (FIGS. 17 and 18).

The phase compensation circuit PP50 includes a phase compensation resistance section including a resistor R20, a phase compensation capacitance section including capacitors C21 and C22, and a switch group including switches SW21 to SW23. The state of the switches SW0 and SW21 to SW23 is controlled by the switch controlling circuit SWC (refer to FIG. 1).

The phase compensation circuit PP50 is configured such that the phase compensation circuit PP20 of FIG. 13 additionally includes the switch SW23, and the phase compensation circuits PP20 and PP50 are the same as each other in configuration except for the addition. Therefore, overlapping description of the same components is omitted here. In the phase compensation circuit PP50, the switch SW23 is connected in parallel to the resistor R20. In particular, the switch SW23 is connected at one end thereof to the wire WR1 and at the other end thereof to the node ND20.

Figure 21:
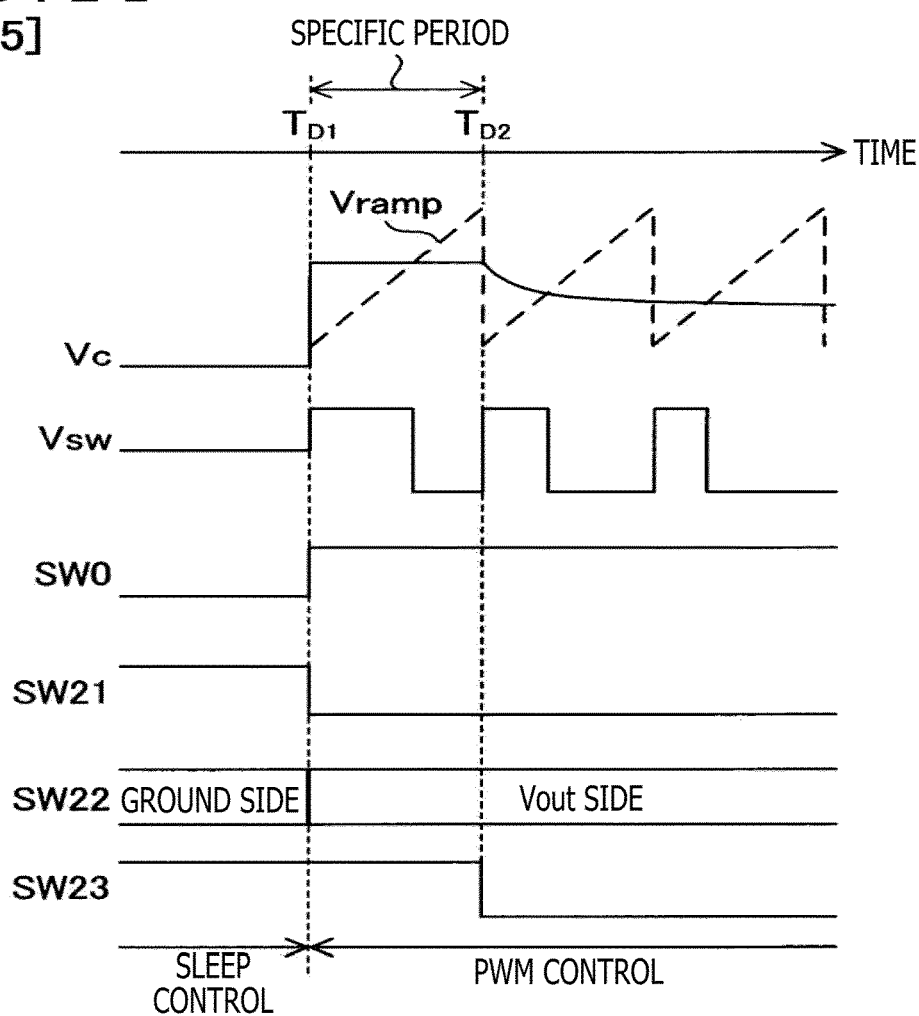
FIG. 21 is a timing chart at the time of control mode switching in the working example EX1_5.

FIG. 21 is a timing chart relating to the working example EX1_5. The switching power supply device acts in the auto mode until a timing $T_{D1}$, and it is assumed that, immediately before the timing $T_{D1}$, the switching action is stopped by the sleep control because of a low load. FIG. 20 depicts the state of the switches when the switching action is stopped by the sleep control. In the phase compensation circuit PP50, when the switching action is stopped by the sleep control, the switch SW0 is off, and the switch SW21 is on while the switch SW23 is on, and the second end of the capacitor C22 is connected to the ground by the switch SW22 (as described hereinabove in connection with the working example EX1_2, the capacitor C22 is connected at the first end thereof to the node ND20). Further, when the switching action is stopped by the sleep control, the contrast voltage Vc is 0 V because the switch SW21 is on, and the ramp voltage Vramp is 0 V by stop of the action of the ramp voltage generation circuit Gramp. It is to be noted that, when the switching action is stopped by the sleep control, the switch SW23 may otherwise be off.

Figure 22A:
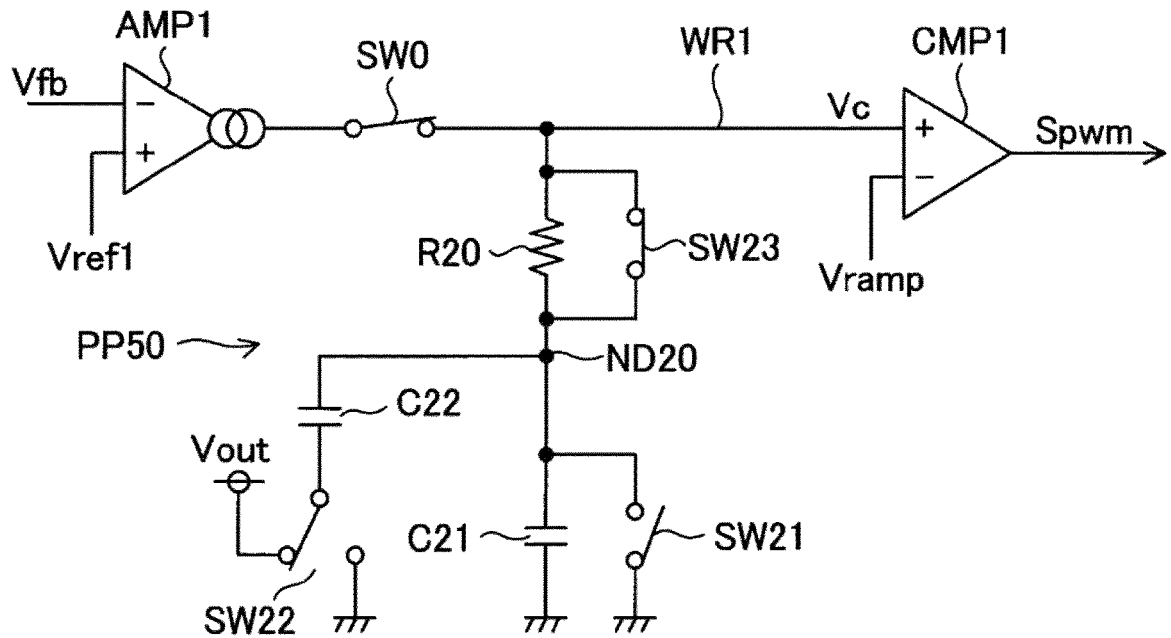
FIGS. 22A and 22B are circuit diagrams illustrating a state of switches at the time of control mode switching in the working example EX1_5.
Figure 22B:
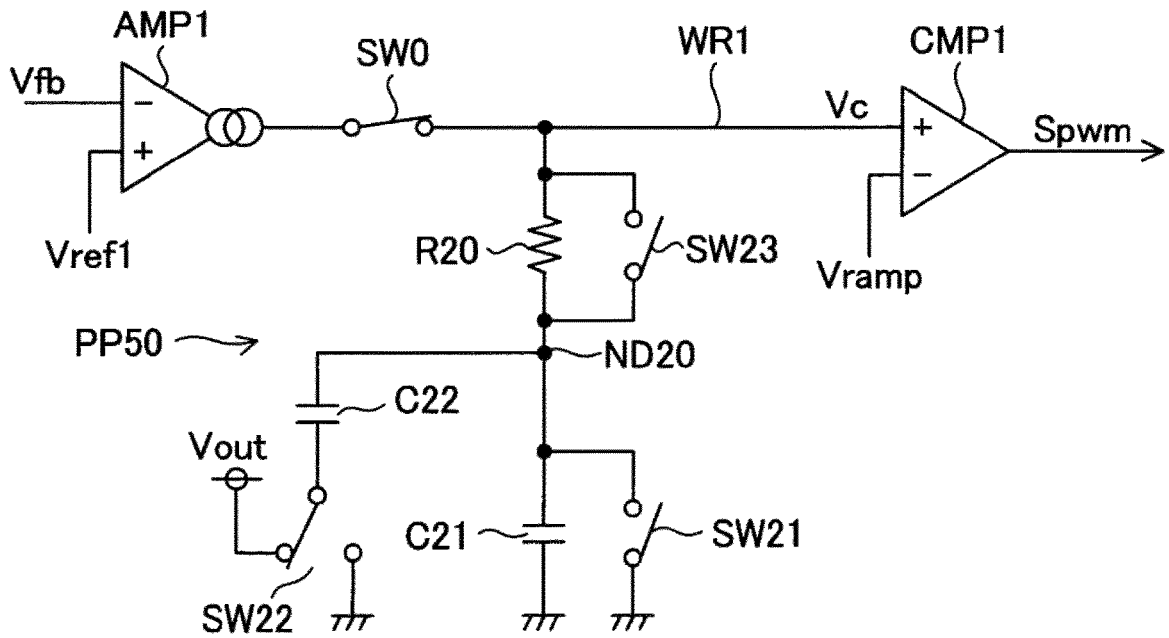

At the timing $T_{D1}$, the control mode is switched from the auto mode to the forced PWM mode. Together with the switching, the switch controlling circuit SWC switches the switch SW0 from an off state to an on state, and switches the switch SW21 from an on state to an off state, and further switches the connection destination of the second end of the capacitor C22 through the switch SW22 from the ground to the application end of the output voltage Vout across the timing $T_{D1}$. However, specific period comes to an end, the switch controlling circuit SWC keeps the switch SW23 in an on state and switches the switch SW23 to an off state at a timing $T_{D2}$ corresponding to the end timing of the specific period. FIG. 22A depicts the state of the switches during the specific period, and FIG. 22B depicts the state of the switches after the specific period. Further, together with transition to the forced PWM mode, the ramp voltage generation circuit Gramp starts its action at the timing $T_{D1}$ and starts its variation within its own variation range as described hereinabove at the start point given by the timing $T_{D1}$.

In the example of FIG. 21, the specific period is a period from the timing $T_{D1}$ to the timing $T_{D2}$ and has a length "$q \times P_{PWM}$" equal to or longer than one period of the PWM control as described hereinabove in connection with the working example EX1_1.

Within the specific period, a voltage equal to k times the output voltage Vout, namely, a voltage (k×Vout), is generated at the node ND20. The value of the coefficient k depends upon the ratio between the capacitance value of the capacitor C21 and the capacitance value of the capacitor C22 (0<k<1). This voltage (k×Vout) is applied to the wire WR1 through the parallel circuit of the resistor R20 and the switch SW23 and is set as an initial voltage for the contrast voltage Vc.

Since the switch SW0 is in an on state during the specific period, the amplifier AMP1 sometimes inputs or outputs current from or to the wire WR1 through the switch SW0. However, since the resistance value between the node ND20 and the wire WR1 during the specific period has a value substantially decreased to the on resistance value of the switch SW23, the voltage (k×Vout) generated at the node ND20 is set substantially as an initial voltage for the contrast voltage Vc. The on resistance value of the switch SW23 is sufficiently lower than the resistance value of the resistor R20, and it may be considered that the opposite ends of the resistor R20 are short-circuited by turning on of the switch SW23.

On the other hand, it is sufficient if the amplitude of the ramp voltage Vramp is set to "k×Vin." Accordingly, if it is assumed that the lower limit of the variation range of the ramp voltage Vramp is 0 V, then the initial value for the on-duty Don when a switching action is to be started can be made "Vout/Vin" that coincides with the theoretical value described hereinabove (actually, the lower limit of the variation range of the ramp voltage Vramp may be set to 0 V). In the case where the lower limit of the variation range of the ramp voltage Vramp is a positive value, taking the lower limit of the variation range of the ramp voltage Vramp (Vramp_MIN) into consideration, the initial value for the on-duty Don may be set or approximated to "Vout/Vin" by adjusting the capacitance value of the capacitors C21 and C22 or the amplitude of the ramp voltage Vramp, by adding the switch S16 and the capacitor C16 described hereinabove (refer to FIG. 16) or by some other suitable means.

In any case, the voltage generated at the node ND20 within the specific period is made a voltage within the variation range of the ramp voltage Vramp. Then, within the specific period, since the switch SW23 is on as described hereinabove, a voltage drop between the node ND20 and the wire WR1 does not substantially occur, and a switching action that is to be started from turning on of the transistor M1 is started without fail at the start point given by the timing $T_{D1}$. After the switch SW23 is turned off after the specific period elapses, the contrast voltage Vc is controlled according to the output voltage Vout by the amplifier AMP1 in a state in which the phase of the contrast voltage Vc is compensated for with an appropriate phase compensation constant by the resistor R20 and the capacitors C21 and C22, and the on-duty Don changes according to the output voltage Vout.

In this manner, also according to the working example EX1_5, a switching action can be started with certainty at the same time with switching of the control mode, and since a switching action is started with an optimum on-duty Don, an overshoot and an undershoot can be prevented.

In the phase compensation circuit PP50, the resistor R20 and the switch SW23 are connected in parallel, and since the resistance value between the phase compensation capacitance section and the wire WR1 changes depending upon the state of the switch SW23, it can also be considered that the phase compensation resistance section includes the parallel circuit of the resistor R20 and the switch SW23. The resistor R20 has a predetermined resistance value, and within an on period of the switch SW23 including the specific period, the resistance value of the phase compensation resistance section including the parallel circuit of the resistor R20 and the switch SW23 is lower than the predetermined resistance value. Then, if the switch SW23 is placed into an off state after the specific period, then the resistance value of the phase compensation resistance section including the parallel circuit of the resistor R20 and the switch SW23 returns to the resistance value of the resistor R20 (predetermined resistance value).

Working Example EX1_6

The working example EX1_6 is described. The method indicated in the working examples EX1_4 and EX1_5 belongs to a second method by which, during a specific period, while the resistance value of the phase compensation resistance section is temporarily decreased, the voltage within the variation range of the ramp voltage Vramp (for example, a voltage that corresponds to the output voltage Vout and besides is within the variation range of the ramp voltage Vramp) is set to an initial voltage for the contrast voltage Vc. As long as this setting is implemented, the implementation method of the second method can be selected freely.

For example, the capacitor C16 and the switch SW16 depicted in FIG. 16 may be added to the phase compensation circuit PP40 of FIG. 17. At this time, the connection relation of the capacitor C16, the switch SW16, the ground, the application end of the voltage Va, and the node ND10 is such as described hereinabove in connection with the working example EX1_3 (refer to FIG. 16). Further, as regards the phase compensation circuit PP40 to which the capacitor C16 and the switch SW16 are added, it is sufficient if, when the switching action before the timing $T_{C1}$ of FIG. 18 is stopped, the second end of the capacitor C16 is connected to the application end of the voltage Va by the switch SW16 to charge the capacitor C16 with the voltage Va and, then at the timing $T_{C1}$, the connection destination of the second end of the capacitor C16 is switched to the node ND10.

It is also possible to add the capacitor C16 and the switch S16 to the phase compensation circuit PP50 of FIG. 20, and in this case, it is sufficient if the connection destination of the second end of the capacitor C16 through the switch SW16 is set to the node ND20 during the specific period.

Figure 23:
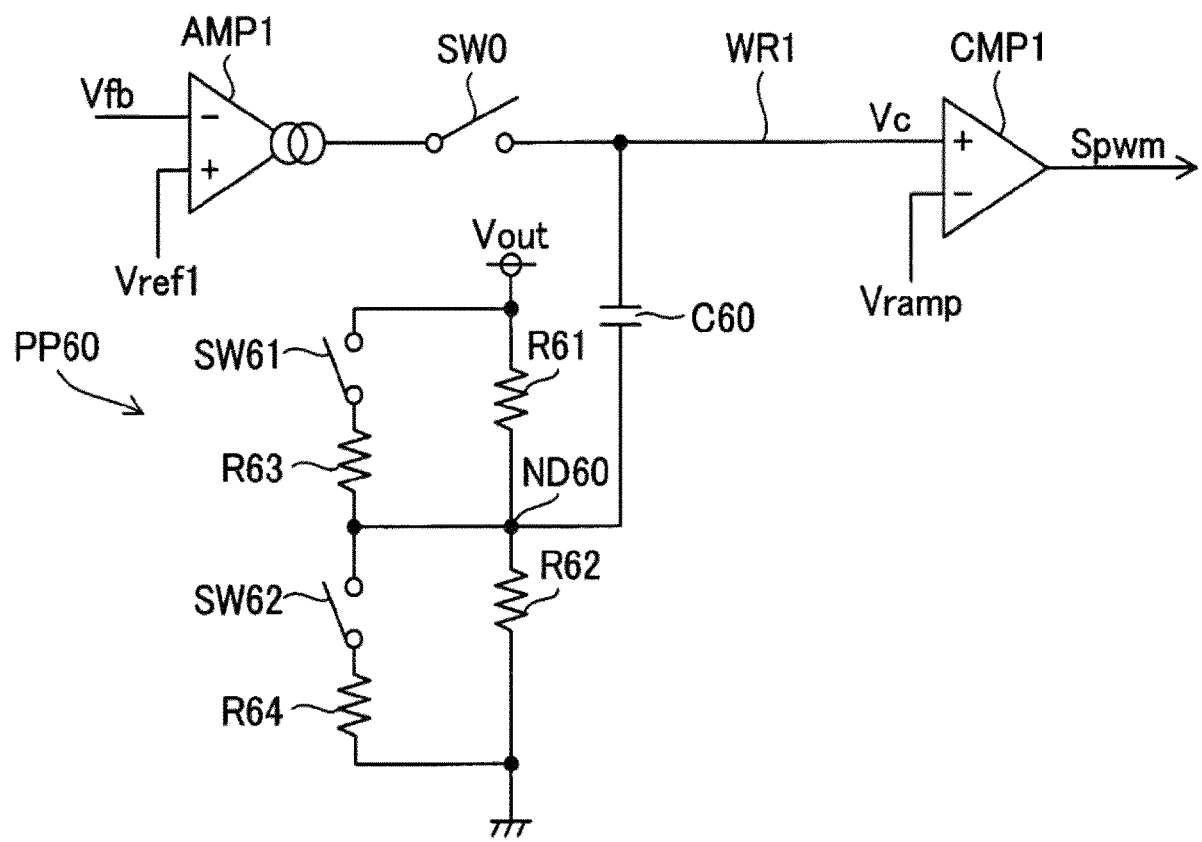
FIG. 23 is a circuit diagram of a phase compensation circuit and peripheral circuits according to a working example EX1_6 belonging to the first embodiment.

It is also possible to adopt a phase compensation circuit PP60 of FIG. 23 as the phase compensation circuit PP (refer to FIG. 1). The phase compensation circuit PP60 includes a phase compensation resistance section including resistors R61 to R64, a phase compensation capacitance section including a capacitor C60, and a switch group including switches SW61 and SW62. The state of the switches SW0, SW61, and SW62 is controlled by the switch controlling circuit SWC (refer to FIG. 1).

The capacitor C60 is connected at one end thereof to the wire WR1 and the non-negated input terminal of the comparator CMP1 and at the other end thereof to a predetermined node ND60. The resistor R61 is connected at one end thereof to the application end of the output voltage Vout and at the other end thereof to the node ND60. The resistor R62 is connected at one end thereof to the node ND60 and at the other end thereof to the ground. The switch SW61 and the resistor R63 are connected in series to each other, and the series circuit of the switch SW61 and the resistor R63 is connected in parallel to the resistor R61. The switch SW62 and the resistor R64 are connected in series to each other, and the series circuit of the switch SW62 and the resistor R64 is connected in parallel to the resistor R62.

In the case where the resistance values of the resistors R61, R62, R63, and R64 are represented by reference signs "R61," "R62," "R63," and "R64," respectively, they satisfy "R61:R62=R63:R64," "R61»R63," and "R62»R64." Note that it is assumed that the on resistance value of the switches SW61 and SW62 is so low that it can be ignored and is considered zero for the convenience of simplified description.

When the switches SW61 and SW62 are in an off state, a DC voltage that depends upon the output voltage Vout and the ratio "R61:R62" is generated at the node ND60. In the case where the switches SW61 and SW62 are in an on state, the same DC voltage is generated at the node ND60.

In the case where the phase compensation circuit PP60 is used as the phase compensation circuit PP (refer to FIG. 1), the following switches can be controlled. In particular, when the switching action is stopped by the sleep control, all of the switches SW0, SW61, and SW62 are controlled off. If the control mode is switched from the auto mode to the forced PWM mode at a certain first timing, then the switch controlling circuit SWC switches all of the switches SW0, SW61, and SW62 from an off state to an on state across the first timing. However, while the switch SW0 is thereafter kept in an on state as long as the forced PWM mode continues, the switches SW61 and SW62 have an on state only within the specific period from the first timing to a second timing, and both of them are switched to an off state at the second timing. The specific period between the first and second timings has the length "$q \times P_{PWN}$" that is equal to or longer than one period of the PWM control similarly as described hereinabove in connection with the working example EX1_1.

Since the switch SW0 is in an on state during the specific period, the amplifier AMP1 sometimes inputs or outputs current from or to the wire WR1 through the switch SW0. This current flows in terms of alternating current via the phase compensation resistance section through the capacitor C60 and a voltage drop occurs through the phase compensation resistance section. It can be considered that, in the phase compensation circuit PP60, the phase compensation resistance section is formed from the resistances R61 to R64 and the switches SW61 and SW62, and during an on period of the switches SW61 and SW62 (during the specific period), the resistance value of the phase compensation resistance section drops in comparison with that during the off period of the switches SW61 and SW62. Therefore, the voltage drop across the phase compensation resistance section when the amplifier AMP1 inputs or outputs current from or to the wire WR1 through the switch SW0 during the specific period can be suppressed low. Occurrence of such a phenomenon that, immediately after the first timing, the contrast voltage Vc becomes lower than the lower limit of the variation range of the ramp voltage Vramp can be prevented.

Working Example EX1_7

The working example EX1_7 is described. Although the control mode of the IC 100 may possibly transit from the auto mode to the forced PWM mode based on a signal from an external apparatus (microcomputer or the like not depicted), transition from the auto mode to the forced PWM mode sometimes occurs on the basis of detection of an overvoltage state. In this case, the actions described hereinabove with reference to the working examples EX1_1 to EX1_6 can also be executed and are useful. This is described below.

An overvoltage detection circuit (not depicted) for comparing the feedback voltage Vfb or the output voltage Vout with a predetermined decision voltage to detect an overvoltage state is additionally provided in the main control circuit 110 of the IC 100. This overvoltage detection circuit outputs a decision signal of the low level or the high level according to a result of the comparison between the feedback voltage Vfb or the output voltage Vout and the predetermined decision voltage. The decision signal has the low level in principle, and if the output voltage Vout becomes equal to or higher than a first predetermined voltage, which is higher than the predetermined voltage $Vth_H$ (refer to FIG. 4), from a start point given by a state in which the decision signal has the low level, then the decision signal becomes the high level. After the decision signal becomes high level, if the output voltage Vout becomes equal to or lower than a second predetermined voltage that is lower than the first predetermined voltage, then the decision signal becomes the low level. The decision signal of the high level indicates that the output voltage Vout is in an overvoltage state.

In a state in which the switching action is stopped by the sleep control in the auto mode, the decision signal sometimes becomes the high level arising from a failure such as high level short-circuiting. In this case, the control mode transits from the auto mode to the forced PWM mode taking it as a trigger that the decision signal becomes the high level (that is, taking it as a trigger that an overvoltage state is detected). The transition timing to the forced PWM mode here may be a transition timing to the forced PWM mode in any one of the working examples EX1_1 to EX1_6 (for example, one of timings $T_{A1}$, $T_{B1}$, $T_{C1}$, and $T_{D1}$), and the state control of each switch having a relation to the transition may be any of those of the working examples EX1_1 to EX1_6.

In the case described above, since the feedback voltage Vfb is high due to an overvoltage state, after a switching action is started during a specific period (for example, a period between the timings $T_{A1}$ and $T_{A2}$), the contrast voltage Vc gradually decreases by the function of the amplifier AMP1 and the on-duty Don decreases in an interlocking relation with the decrease of the contrast voltage Vc. As a result, a drop of the output voltage Vout is expected from drawing of current from the output terminal OUT to the switch terminal SW. If the decision signal switches from the high level to the low level by the drop of the output voltage Vout, then the control mode switches from the forced PWM mode to the auto mode immediately or after a fixed interval of time. After the control mode returns to the auto mode, if the control signal SLP has the high level, then the switching action is stopped by the sleep control.

Also in such a case as described above, if the configuration and the action indicated in any of the working examples EX1_1 to EX1_6 are used, then a switching action can be started with certainty during the specific period upon transition to the forced PWM mode. As a result, an overvoltage state can be eliminated quickly.

It is to be noted that, when switching from the sleep control to the forced PWM mode is performed without detection of an overvoltage state in the auto mode, the method of the present disclosure that includes setting of a specific period may not be carried out (however, this may be carried out; similarly, this also applies to the second embodiment hereinafter described). This is because, at a timing at which switching from the sleep control to the forced PWM mode is performed without detection of an overvoltage state in the auto mode, since the output voltage Vout is close to the target voltage Vtg, such a phenomenon as described hereinabove with reference to FIG. 8 does not occur or is less likely to occur. Therefore, for example, if, in the case where the phase compensation circuit PP10 of FIG. 9 is used as the phase compensation circuit PP of FIG. 1, the timing of the switching from the sleep control to the PWM control without detection of an overvoltage state in the auto mode is the timing $T_{A1}$ described hereinabove (refer to FIG. 10), then the switch SW0 may be switched to an on state across the timing $T_{A1}$. This may be applied similarly also where other phase compensation circuits are used.

Second Embodiment

A second embodiment of the present disclosure is described. The second embodiment and a third embodiment hereinafter described are embodiments that are based on the first embodiment, and in regard to matters not specifically described in the description of the second and third embodiments, if there is no contradiction, then the description of the first embodiment is also applied to the second and third embodiments. On the other hand, in interpretation of the description of the second embodiment, matters that are contradictory between the first and second embodiments, the description of the second embodiment may take precedence (similarly, this also applies to the third embodiment hereinafter described). As long as there is no contradiction, a plurality of any ones of the first to third embodiments may be combined.

The control method for a switching power supply device to which the present disclosure is applied can be selected freely. In the second embodiment, a switching power supply device that adopts a current mode controlling method is described. FIG. 24 is a block diagram of an overall switching power supply device 2 according to the second embodiment of the present disclosure. The switching power supply device 2 of FIG. 24 includes a switching power supply IC 200 that is a switching power supply circuit (switching power supply semiconductor device), and a plurality of discrete parts externally connected to the switching power supply IC 200. The plurality of discrete parts includes a capacitor C1, a coil L1, and resistors R1 and R2. The switching power supply device 2 is configured as a stepdown type switching power supply device that generates a desired output voltage Vout from a desired input voltage Vin. The output voltage Vout is supplied to a load LD connected to an output terminal OUT. The input voltage Vin and the output voltage Vout are positive DC voltages, and the output voltage Vout is lower than the input voltage Vin. The output voltage Vout appears at an output terminal OUT of the switching power supply device 2. The input voltage Vin is, for example, 12 V. By adjusting the resistance values of the resistors R1 and R2, the output voltage Vout can be stabilized at a desired positive voltage value lower than 12 V (for example, 3.3 V or 5 V). Current flowing to the load LD through the output terminal OUT is referred to as output current Iout.

Similarly as in the IC 100, an input terminal IN, a switch terminal SW, a feedback terminal FB, an output monitoring terminal OS, and a ground terminal GND are provided for the IC 200, and an input voltage Vin is supplied to the input terminal IN from the outside of the IC 200. The coil L1 is interposed in series between the switch terminal SW and the output terminal OUT. The output terminal OUT is connected to the ground through the capacitor C1. The output terminal OUT is connected to one end of the resistor R1, and the resistor R1 is connected at the other end thereof to the ground through the resistor R2. The connection node between the resistors R1 and R2 is connected to the feedback terminal FB. Further, an output voltage Vout is applied to the output monitoring terminal OS, and the ground terminal GND is connected to the ground.

The IC 200 includes an output stage circuit MM and a main control circuit 210 for controlling the output stage circuit MM. The configuration of the output stage circuit MM in the IC 200 is the same as that of the IC 100, and also the relation between the gates G1 and G2 and the states of the transistors M1 and M2 are such as described hereinabove in connection with the first embodiment. Here, however, it is assumed that the transistor M2 is connected at the source thereof to the ground through a sense resistor 212a. Similarly as in the first embodiment, the transistor M1 functions as an output transistor, and the transistor M2 functions as a synchronous rectification transistor. The coil L1 and the capacitor C1 configure a rectifying and smoothing circuit that rectifies and smoothes a switch voltage Vsw of a rectangular waveform appearing at the switch terminal SW to generate an output voltage Vout. The connection node between the resistors R1 and R2 is connected to the feedback terminal FB such that a divided voltage appearing at the connection node is inputted as a feedback voltage Vfb to the feedback terminal FB.

The main control circuit 210 includes an amplifier AMP1, a comparator CMP1 that is a PWM comparator, a phase compensation circuit PP, a ramp voltage generation circuit Gramp, a logic circuit LL, a switch SW0, a switch controlling circuit SWC, and a low load detection comparator CMP2, which are the same in configuration, action, and connection scheme as those described in connection with the first embodiment. However, in the IC 200, the input to the amplifier AMP1 is different from that in the IC 100 (details are hereinafter described). It is to be noted that, when the description of the first embodiment is applied to the second embodiment, the "switching power supply device 1" and the "IC 100" in the first embodiment are deemed to be replaced with the "switching power supply device 2" and the "IC 200" in the second embodiment, respectively.

The main control circuit 210 further includes an amplifier AMP0, a phase compensation circuit 211, a current detection circuit 212, a clamp circuit 213, an OR circuit 214, a reverse current forcing circuit 215, and overvoltage detection comparators CMP3 and CMP4.

The amplifier AMP0 is a current output type transconductance amplifier and functions as an error amplifier in the main control circuit 210. To the negated input terminal of the amplifier AMP0, a voltage applied to the feedback terminal FB (that is, the feedback voltage Vfb) is supplied, and to the non-negated input terminal of the amplifier AMP0, a predetermined reference voltage Vref1 is supplied. The reference voltage Vref1 and the reference voltages Vref2 to Vref4 hereinafter described are DC voltages having positive voltage values different from one another and are generated by an unillustrated reference voltage generation circuit in the IC 200. The amplifier AMP0 outputs an error current signal I0 according to the difference between the feedback voltage Vfb and the reference voltage Vref1 from an output terminal of itself. Charge by the error current signal I0 is inputted to and outputted from a wire WR0 that is an error signal wire. In particular, when the feedback voltage Vfb is lower than the reference voltage Vref1, the amplifier AMP0 outputs current according to the error current signal I0 toward the wire WR0 such that the potential at the wire WR0 rises, but when the feedback voltage Vfb is higher than the reference voltage Vref1, the amplifier AMP0 draws current according to the error current signal I0 from the wire WR0 such that the potential at the wire WR0 drops. As the absolute value of the difference between the feedback voltage Vfb and the reference voltage Vref1 increases, the magnitude of the current according to the error current signal I0 also increases.

The phase compensation circuit 211 is provided between the wire WR0 and the ground and receives an input of the error current signal I0 to generate an error voltage Vcmp on the wire WR0. The phase compensation circuit 211 includes a series circuit of a resistor 211a and a capacitor 211b. In particular, the resistor 211a is connected at one end thereof to the wire WR0 and at the other end thereof to the ground through the capacitor 211b. By appropriately setting the resistance value of the resistor 211a and the capacitance value of the capacitor 211b, the phase of the error voltage Vcmp can be compensated for to prevent oscillation of the output feedback loop.

The current detection circuit 212 samples coil current IL flowing to the coil L1 at a predetermined timing and outputs a current detection signal Isns indicative of the sampled value of the coil current IL. Since the current detection signal Isns is a voltage signal, a voltage represented by the current detection signal Isns is sometimes referred to as a voltage Isns. It is assumed that the polarity of the coil current IL from the switch terminal SW toward the output terminal OUT is positive and the polarity of the coil current IL from the output terminal OUT toward the switch terminal SW is negative. When the polarity of the coil current IL is positive, the voltage Isns is in the positive, and besides, when the polarity of the coil current IL is negative, the voltage Isns is in the negative. The absolute value of the voltage Isns changes in proportion to the absolute value of the coil current IL and increases as the absolute value of the coil current IL increases. In the switching power supply device 2 of FIG. 24, the current detection circuit 212 includes a sense resistor 212a provided between the source of the transistor M2 and the ground and generates a voltage Isns by sampling a voltage drop of the sense resistor 212a within a period within which the transistor M2 is on. In particular, although the coil current IL is detected by detecting current flowing to the transistor 10L, the current detection circuit 212 may otherwise generate a voltage Isns through detection of current flowing to the transistor M1 or through direct detection of current flowing to the coil L1.

In the IC 200, the error voltage Vcmp applied to the wire WR0 is supplied to the non-negated input terminal of the amplifier AMP1, and the voltage Isns is supplied to the negated input terminal of the amplifier AMP1. Therefore, in the IC 200, the amplifier AMP1 outputs a current signal I1 according to the difference between the error voltage Vcmp and the voltage Isns from its own output terminal (this is a difference from the IC 100). Similarly as in the first embodiment, the output terminal of the amplifier AMP1 is connected to the first end E1_SW0 of the switch SW0, and the switch SW0 is connected at the second end E2_SW0 thereof to the non-negated input terminal of the comparator CMP1. A contrast voltage Vc is applied to a wire WR1 that connects the second end E2_SW0 of the switch SW0 and the non-negated input terminal of the comparator CMP1 to each other.

Only when the switch SW0 is on, charge according to the current signal I1 is inputted to and outputted from the wire WR1 through the switch SW0. In particular, under the assumption that the switch SW0 is on, when the voltage Isns is lower than the error voltage Vcmp, the amplifier AMP1 in the IC 200 outputs current according to the current signal I1 from the amplifier AMP1 toward the wire WR1 such that the potential at the wire WR1 rises, but when the voltage Isns is higher than the error voltage Vcmp, the amplifier AMP1 draws current according to the current signal I1 from the wire WR1 toward the amplifier AMP1 such that the potential at the wire WR1 drops. As the absolute value of the difference between the voltage Isns and the error voltage Vcmp increases, the magnitude of current according to the current signal I1 also increases.

The phase compensation circuit PP is provided between the wire WR1 and the ground and receives an input of the current signal I1 to generate a contrast voltage Vc on the wire WR1. Action of the comparator CMP1 and that of the ramp voltage generation circuit Gramp are such as described hereinabove in connection with the first embodiment. Also action of the logic circuit LL according to the signal Spwm is such as described hereinabove in connection with the first embodiment. In the IC 200, since the amplifier AMP0 generates the current signal I0 such that the feedback voltage Vfb and the reference voltage Vref1 become equal to each other, through execution of a switching action, the output voltage Vout is stabilized at a predetermined target voltage Vtg according to the reference voltage Vref1 and the voltage division ratio by the resistors R1 and R2.

As described above, the switching power supply device 2 adopts a current mode controlling method of performing output feedback control on the basis of both the output voltage Vout and the coil current IL. The voltage Isns according to the coil current IL is feedback inputted to the amplifier AMP1, and if the error voltage Vcmp rises by an action of the amplifier AMP1, then the coil current IL increases, but if the error voltage Vcmp drops, then the coil current IL decreases. In this manner, the magnitude of the coil current IL can be controlled according to the error voltage Vcmp, and therefore, it is possible to indirectly restrict the coil current IL by applying restriction to the error voltage Vcmp.

Figure 25A:
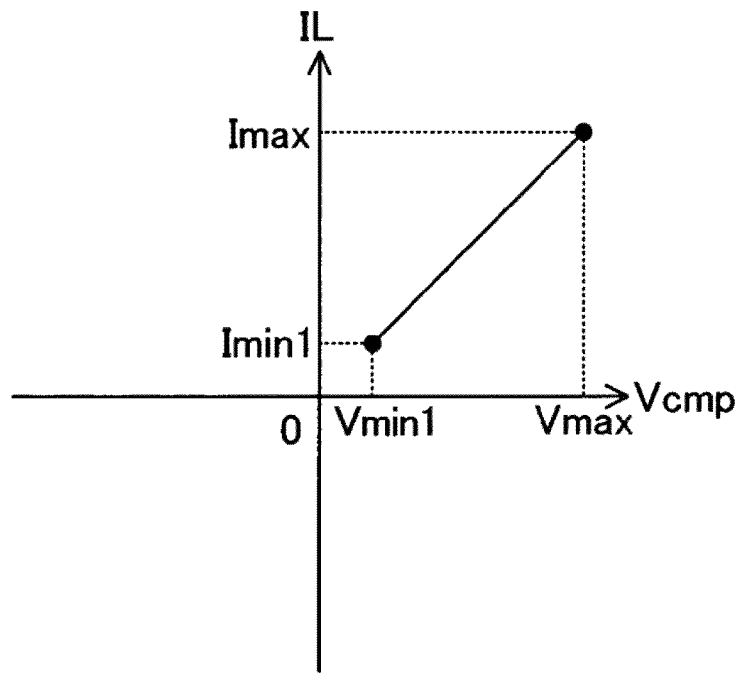
FIGS. 25A and 25B are diagrams related to the second embodiment and illustrating a voltage and current variation ranges in an ordinary clamp state and an extended clamp state of a clamp circuit.
Figure 25B:
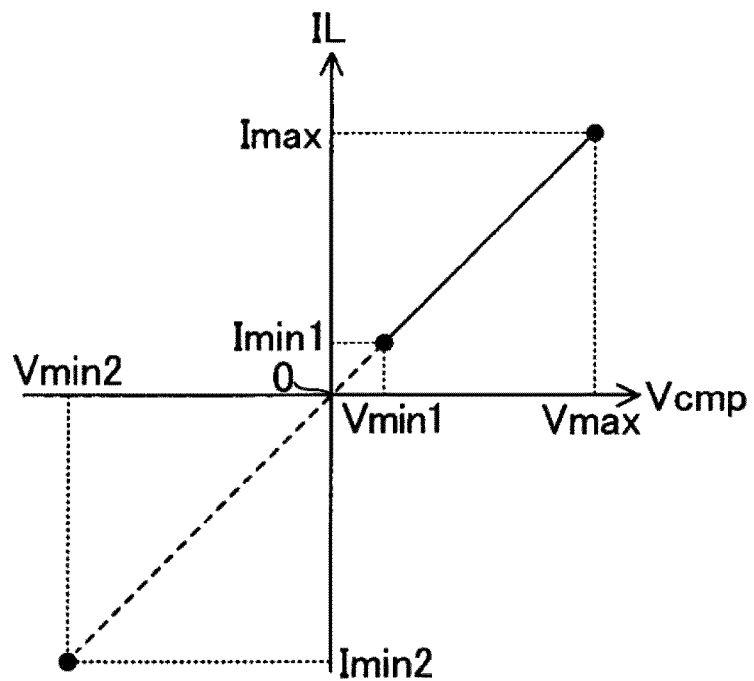

The clamp circuit 213 applies restriction to the variation range of the error voltage Vcmp to restrict the variation range of the coil current IL (more particularly, restrict the variation range of the coil current IL during execution of a switching action). As depicted in FIGS. 25A and 25B, the state of the clamp circuit 213 is, under the control of the logic circuit LL, one of an ordinary clamp state in which the variation range of the error voltage Vcmp is a predetermined ordinary variation range and an extended clamp state in which the variation range of the error voltage Vcmp is a predetermined extended variation range.

As depicted in FIG. 25A, the ordinary variation range is a voltage range equal to or higher than a predetermined lower limit voltage value Vmin1 and equal to or lower than a predetermined upper limit voltage value Vmax. Therefore, in the ordinary clamp state, the clamp circuit 213 applies restriction to the error voltage Vcmp such that the value of the error voltage Vcmp at the wire WR0 does not become lower than the lower limit voltage value Vmin1 and besides does not become higher than the upper limit voltage value Vmax. When the value of the error voltage Vcmp is equal to the lower limit voltage value Vmin1, the output feedback loop including the amplifier AMP1 generates a current signal I1 such that the value of the voltage Isns becomes coincident with the lower limit voltage value Vmin1. Similarly, when the value of the error voltage Vcmp is equal to the upper limit voltage value Vmax, the output feedback loop including the amplifier AMP1 generates a current signal I1 such that the value of the voltage Isns becomes coincident with the upper limit voltage value Vmax. Therefore, if the values of the coil current IL when the value of the voltage Isns coincides with the lower limit voltage value Vmin1 and the upper limit voltage value Vmax are represented as "Imin1" and "Imax," respectively, then the variation range of the coil current IL in the ordinary clamp state is restricted to a value equal to or higher than the lower limit current value Imin1 and equal to or lower than the current upper limit value Imax.

As depicted in FIG. 25B, the extended variation range is a voltage range equal to or higher than a predetermined lower limit voltage value Vmin2 and equal to or lower than the predetermined upper limit voltage value Vmax. Therefore, in the extended clamp state, the clamp circuit 213 applies restriction to the error voltage Vcmp such that the value of the error voltage Vcmp at the wire WR0 does not become lower than the lower limit voltage value Vmin2 and does not become higher than the upper limit voltage value Vmax. When the value of the error voltage Vcmp is equal to the lower limit voltage value Vmin2, the output feedback loop including the amplifier AMP1 generates a current signal I1 such that the value of the voltage Isns becomes coincident with the lower limit voltage value Vmin2. Similarly, when the value of the error voltage Vcmp is equal to the upper limit voltage value Vmax, the output feedback loop including the amplifier AMP1 generates a current signal I1 such that the value of the voltage Isns becomes coincident with the upper limit voltage value Vmax. Therefore, if the values of the coil current IL when the value of the voltage Isns coincides with the lower limit voltage value Vmin2 and the upper limit voltage value Vmax are presented by "Imin2" and "Imax," respectively, then in the extended clamp state, the variation range of the coil current IL is restricted to a value equal to or higher than the lower limit current value Imin2 and equal to or lower than the current upper limit value Imax.

In regard to the variation range of each of the error voltage Vcmp and the coil current IL, an upper limit value (upper limit voltage value, upper limit current value) and a lower limit value (lower limit voltage value, lower limit current value) are values with the polarity taken into consideration, and any positive value is higher than any negative value. Further, in regard to a negative value, it is interpreted that, as the absolute value of the value increases, the value becomes smaller. "Vmin2<0<Vmin1<Vmax" and "Imin2<0<Imin1<Imax" are satisfied. Therefore, for example, when "Vcmp≥Vmin1" is satisfied and "IL≥Imin1" is satisfied accordingly, positive coil current IL flows, but when "0>Vcmp≥Vmin2" is satisfied and "0>IL≥Imin2" is satisfied accordingly, negative coil current IL flows. For example, the current values Imin2, Imin1, and Imax are −3 A (amperes), 0.4 A, and 3 A, respectively.

Provision of an upper limit to the coil current IL through upper limit setting for the error voltage Vcmp functions as overcurrent protection for preventing overcurrent from flowing to the output stage circuit MM and the coil L1. On the other hand, since the switching power supply device 2 supplies positive current to the coil L1 to stabilize the output voltage Vout at the positive target voltage Vtg and supply power to the load LD connecting to the output terminal OUT, the coil L1 should not originally be supplied with negative current (that is, current to flow from the output terminal OUT to the switch terminal SW, and the current is hereinafter sometimes referred to as reverse current). In the ordinary clamp state, the lower limit for the coil current IL is set to the positive value "Imin1" to suppress generation of reverse current (to render reverse current protection operative). Although it may be generally sufficient to cause reverse current protection to normally continue to be operative, in the switching power supply device 2, under a certain condition, reverse current is intentionally generated utilizing an extended clamp state. The significance of this will become apparent from the description hereinafter given.

The low load detection comparator CMP2 is a comparator for detecting a low load state, and compares the feedback voltage Vfb inputted to the non-negated input terminal thereof and the reference voltage Vref2 inputted to the negated input terminal thereof with each other and outputs a control signal SLP indicative of a result of the comparison. In this comparison, a hysteresis is set. Here, setting a state in which the feedback voltage Vfb is lower than the reference voltage Vref2 and the control signal SLP has the low level as a start point, if the feedback voltage Vfb becomes higher than the reference voltage Vref2, then the low load detection comparator CMP2 outputs the control signal SLP of the high level, and if the feedback voltage Vfb thereafter becomes lower than a voltage (Vref2−ΔHYS2), then the low load detection comparator CMP2 switches the level of the control signal SLP from the high level to the low level. The voltage (Vref2−ΔHYS2) is a voltage lower by a positive hysteresis voltage ΔHYS2 than the reference voltage Vref2.

The overvoltage detection comparators CMP3 and CMP4 are comparators for detecting an overvoltage state (a state in which the output voltage Vout is excessively high), and the overvoltage detection comparators CMP3 and CMP4 and the OR circuit 214 form an overvoltage detection circuit.

The overvoltage detection comparator CMP3 compares the feedback voltage Vfb inputted to the non-negated input terminal thereof and a reference voltage Vref3 inputted to the negated input terminal thereof with each other and outputs a signal Sig3 indicative of a result of the comparison. In this comparison, a hysteresis is set. Here, setting a state in which the feedback voltage Vfb is lower than the reference voltage Vref3 and the signal Sig3 has the low level as a start point, if the feedback voltage Vfb becomes higher than the reference voltage Vref3, then the overvoltage detection comparator CMP3 outputs the signal Sig3 of the high level, and if the feedback voltage Vfb thereafter becomes lower than a voltage (Vref3−ΔHYS3), then the overvoltage detection comparator CMP3 switches the level of the signal Sig3 from the high level to the low level. The voltage (Vref3−ΔHYS3) is a voltage lower by a positive hysteresis voltage ΔHYS3 than the reference voltage Vref3.

The overvoltage detection comparator CMP4 compares the output voltage Vout inputted to the non-negated input terminal thereof and a reference voltage Vref4 inputted to the negated input terminal thereof with each other and outputs a signal Sig4 indicative of a result of the comparison. In this comparison, a hysteresis is set. Here, setting a state in which the output voltage Vout is lower than the reference voltage Vref4 and the signal Sig4 has the low level as a start point, if the output voltage Vout becomes higher than the reference voltage Vref4, then the overvoltage detection comparator CMP4 outputs the signal Sig4 of the high level, and if the output voltage Vout thereafter becomes lower than a voltage (Vref4−ΔHYS4), then the overvoltage detection comparator CMP4 switches the level of the signal Sig4 from the high level to the low level. The voltage (Vref4−ΔHYS4) is a voltage lower by a positive hysteresis voltage ΔHYS4 than the reference voltage Vref4.

The OR circuit 214 outputs an OR signal of the signals Sig3 and Sig4 as a control signal OVP_DET. In particular, the OR circuit 214 outputs the control signal OVP_DET of the high level when at least one of the signals Sig3 and Sig4 has the high level, but outputs the control signal OVP_DET of the low level only when both of the signals Sig3 and Sig4 have the low level. It can be considered that any of the signal Sig3 of the high level, the signal Sig4 of the high level, and the control signal OVP_DET of the high level is an overvoltage detection signal indicative of occurrence of an overvoltage state in which the output voltage Vout is excessively high. It can be considered that the overvoltage detection circuit including the comparators CMP3 and CMP4 and the OR circuit 214 detects, on the basis of the feedback voltage Vfb or the output voltage Vout, whether or not the output voltage Vout is in an overvoltage state, and outputs, when the output voltage Vout is in an overvoltage state, an overvoltage detection signal indicative of such an overvoltage state. The control signal SLP and the control signal OVP_DET are inputted to the logic circuit LL.

The reference voltage Vref3 is set to a higher voltage than the reference voltage Vref2 such that, in a process in which the feedback voltage Vfb monotonously rises, the feedback voltage Vfb first becomes higher than the reference voltage Vref2 and then the feedback voltage Vfb becomes higher than the reference voltage Vref3. Further, the reference voltage Vref4 is higher than the reference voltage Vref3 and besides is higher than the output voltage Vout when the feedback voltage Vfb coincides with the reference voltage Vref2. Although the hysteresis voltages ΔHYS2 to ΔHYS4 may be different from one another, it is assumed here that they are equal to one another.

The reverse current forcing circuit 215 is connected to the wire WR0 and acts, when the signal Sig4 has the high level, to lower the value of the error voltage Vcmp at the wire WR0 to the lower limit voltage value determined by the clamp circuit 213 irrespective of the error current signal I0 outputted from the amplifier AMP0. The lower limit voltage value here is Vmin1 if the clamp circuit 213 is in the ordinary clamp state but is Vmin2 if the clamp circuit 213 is in the extended clamp state.

In particular, for example, the reverse current forcing circuit 215 includes a series circuit of a constant current circuit 215a and an N-channel MOSFET 215b inserted between the wire WR0 and a power supply end 216 to which a voltage lower than the lower limit voltage value Vmin2 is applied. The signal Sig4 is applied to the gate of the MOSFET 215b. When the signal Sig4 has the high level, the constant current circuit 215a acts so as to supply fixed current from the wire WR0 toward the power supply end 216 through the MOSFET 215b. Consequently, the error voltage Vcmp drops rapidly to the lower limit voltage value determined by the clamp circuit 213. In order to implement this, the magnitude of current to be drawn from the wire WR0 by the constant current circuit 215a is set sufficiently greater than a maximum value of current that can be discharged from the amplifier AMP0 toward the wire WR0. When the signal Sig4 has the low level, the reverse current forcing circuit 215 is inactive. When the reverse current forcing circuit 215 is inactive, the electric path between the wire WR0 and the power supply end 216 is cut, and the constant current circuit 215a does not input nor output current from or to the wire WR0.

As the phase compensation circuit PP of the IC 200, the phase compensation circuit indicated by any one of the working examples EX1_1 to EX1_6 described hereinabove (for example, the phase compensation circuit PP10, PP20, PP30, PP40, PP50, or PP60) can be used. In the IC 200, the state control of the switch SW0 and each switch in the phase compensation circuit PP is similar to that indicated by any one of the working examples EX1_1 to EX1_6. The control mode of the IC 200 is sometimes caused to transit from the auto mode to the forced PWM mode on the basis of a signal from an external apparatus (microcomputer or the like not depicted). When the control mode transits from a state in which the switching action is stopped to the forced PWM mode on the basis of a signal from the external apparatus, if a switching action is started by any of the methods indicated in the working examples EX1_1 to EX1_6, then the switching action can be started with certainty at the same time with switching of the control mode. Thus, by starting the switching action with an optimum on-duty Don, an overshoot and an undershoot can be prevented.

The second embodiment includes the following working examples EX2_1 to EX2_3. Unless otherwise specified, the matters described hereinabove in connection with the second embodiment are applied to the following working examples EX2_1 to EX2_3 as long as there is no contradiction, and, in the working examples, in regard to matters contradictory to the foregoing matters, the description in the working examples may take precedence. Further, as long as there is no contradiction, it is possible to apply a matter described in connection with any one of the working examples EX2_1 to EX2_3 to any other one of the working examples (in other words, it is also possible to combine two or more any ones of the plurality of working examples).

Working Example EX2_1

The working example EX2_1 is described. In the working example EX2_1, it is assumed that the IC 200 does not receive a forced PWM mode designation signal for the instruction for transition to the forced PWM mode from an external apparatus (microcomputer or the like not depicted) provided outside the switching power supply device 2.

Low load control implemented by the switching power supply device 2 is described presupposing that the control signal OVP_DET is kept at the low level. When the control signal OVP_DET is kept at the low level, the clamp circuit 213 is in the ordinary clamp state (refer to FIG. 25A).

The low load control by the IC 200 is control executed in a low load state (that is, when the power consumption of the load LD is reasonably low) and includes coil current limit control of limiting the coil current IL such that the minimum current of the coil current IL does not become smaller than zero through lower limit setting for the error voltage Vcmp and sleep control (switching stop control) of stopping the switching action when, as a result of the limitation mentioned above, the output voltage Vout rises to a predetermined voltage (equivalent to $Vth_H$ of FIG. 26) higher than the target voltage Vtg.

Figure 26:
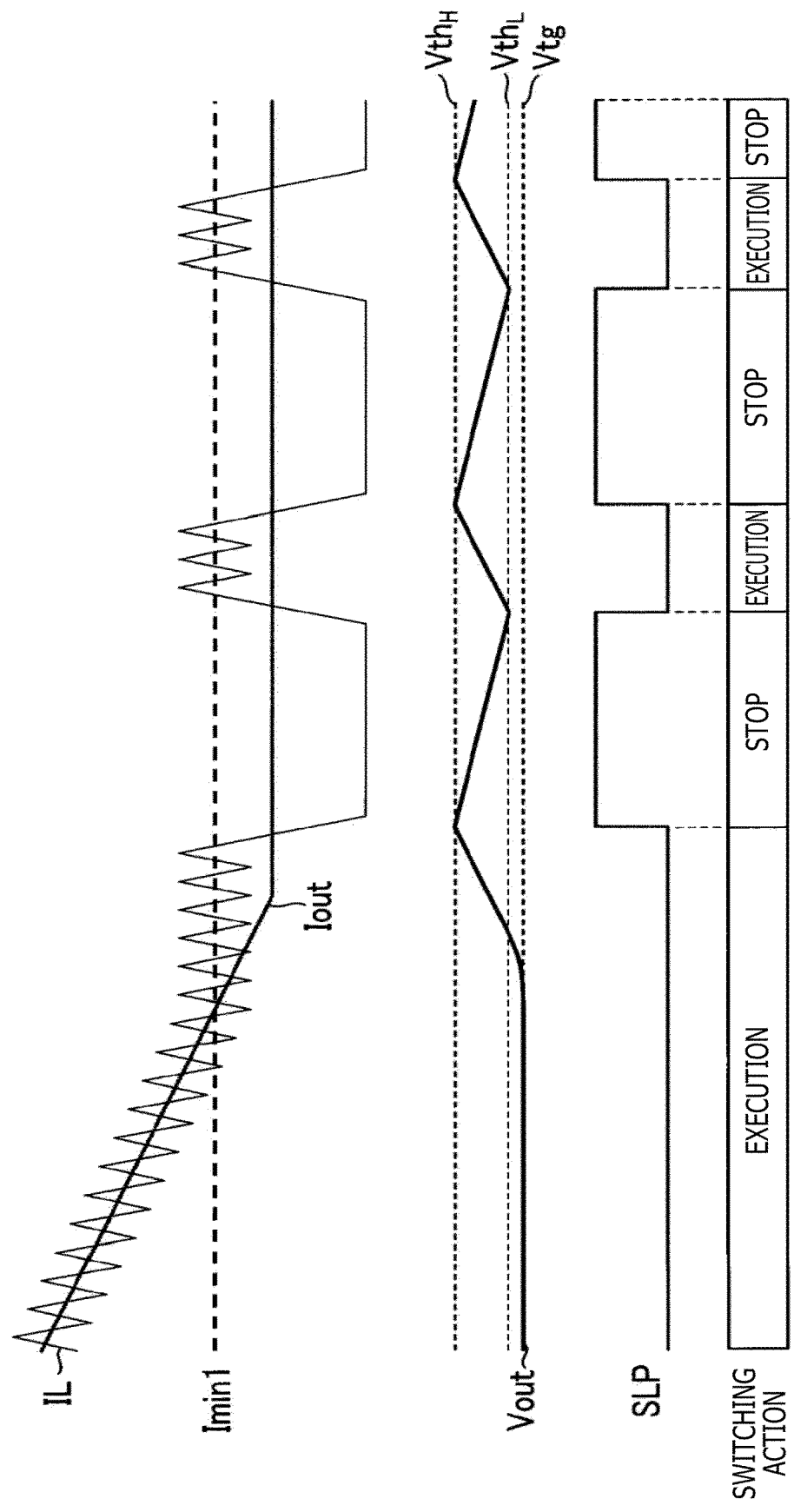
FIG. 26 is a timing chart illustrating low load control according to the second embodiment.

FIG. 26 is a waveform diagram relating to action of the low load control. When a switching action is being executed, the coil current IL changes in the PWM period. The waveforms depicted in FIG. 26 (especially the waveform of the coil current IL) are schematic and may be different from actual waveforms. Further, it is assumed that, when the output voltage Vout coincides with the predetermined voltage $Vth_H$, the feedback voltage Vfb coincides with the reference voltage Vref2, and besides, when the output voltage Vout coincides with the predetermined voltage $Vth_L$, the feedback voltage Vfb coincides with the voltage (Vref2−ΔHYS2).

A situation in which, setting a state in which the control signal SLP has the low level and a switching action is being executed as a start point, the power consumption of the load LD gradually decreases toward considerably low power (that is, a situation in which the load LD gradually decreases) is supposed. In this case, the amplifier AMP0 gradually decreases the error voltage Vcmp through the output feedback control, and the coil current IL also decreases together. Then, when the value of the error voltage Vcmp decreases to the lower limit voltage value Vmin1 corresponding to the lower limit current value Imin1, since further decrease of the error voltage Vcmp is limited, the coil current IL is kept in the proximity of the lower limit current value Imin1. In short, the decrease of the coil current IL (more particularly, of an average value of the coil current IL, for example, in PWM periods) is limited to the lower limit current value Imin1 that is higher than zero to thereby suppress occurrence of reverse current.

Even if the coil current IL decreases to the lower limit current value Imin1, in the case where power from the output stage circuit MM toward the output terminal OUT is higher than the power consumption of the load LD, the output voltage Vout increases in excess of the target voltage Vtg, and if the output voltage Vout reaches the predetermined voltage $Vth_H$, then the control signal SLP switches from the low level to the high level. The logic circuit LL performs the sleep control of stopping the switching action when the control signal SLP has the high level. The stop of the switching action signifies to keep both of the transistors M1 and M2 in an off state irrespective of the signal Spwm.

If the output voltage Vout decreases through the stop of the switching action until the output voltage Vout drops to the predetermined voltage $Vth_L$ that is lower than the predetermined voltage $Vth_H$, then the control signal SLP switches from the high level to the low level. The logic circuit LL restarts the switching action in response to the switching of the control signal SLP from the high level to the low level.

Thereafter, while the low load state (that is, such a state that, even if the coil current IL decreases to the lower limit current value Imin1 in the switching action, the output voltage Vout increases) is kept, stopping and restarting of the switching action are repeated and the output voltage Vout reciprocates generally between the predetermined voltage $Vth_H$ and the predetermined voltage $Vth_L$. The control signal SLP of the high level functions as a signal indicating that the state of the switching power supply device 2 is a low load state. By such low load control, in a low load state, a switching action is executed intermittently, and improvement of the efficiency can be achieved through reduction of the switching loss. Further, while the sleep control is performed, it is preferable to stop action of the amplifier AMP0, the amplifier AMP1, the comparator CMP1, and the ramp voltage generation circuit Gramp. This achieves reduction of the power consumption.

Here, assumed is a virtual switching power supply device which is configured such that the comparators CMP3 and CMP4, the OR circuit 214, and the reverse current forcing circuit 215 are removed from the switching power supply device 2 and besides in which the clamp circuit 213 is placed in the ordinary clamp state. In the virtual switching power supply device, in the case where some failure occurs, depending upon the type of the failure, the output voltage Vout may possibly rise abnormally. When such failure occurs, if the abnormal rise of the output voltage Vout cannot be stopped, then there is the possibility that the load LD may be disabled from normal action or may be damaged. Such a failure that can give rise to such abnormal rise of the output voltage Vout is referred to as a specific failure for the convenience of description. As the specific failure, high level short-circuiting, leak of the transistor M1, an open failure of an electric path that is to transmit a voltage according to the output voltage Vout and so forth may be applicable.

In order to suppress an abnormal rise of the output voltage Vout when a specific failure occurs, the switching power supply device 2 utilizes the control signal OVP_DET in the following manner.

FIG. 27 illustrates a relation between the level of the control signals SLP and OVP_DET and presence/absence of execution of switching control. If there is no failure, then the control signal SLP is kept at the low level or transits between the low level and the high level as depicted in FIG. 26 relying upon the weight of the load LD.

When both of the control signals SLP and OVP_DET have the low level, the logic circuit LL performs the first control of executing switching action and controlling the clamp circuit 213 to the ordinary clamp state. At this time, the error voltage Vcmp is controlled by the output of the amplifier AMP0.

When the control signal SLP has the high level and the control signal OVP_DET has the low level, the logic circuit LL performs second control (sleep control) for stopping the switching action. At this time, since the state of the clamp circuit 213 does not have any influence on the coil current IL and the output voltage Vout, it may be any of the ordinary clamp state and the extended clamp state. Since, in the second control, the switching action is stopped, the error voltage Vcmp does not have any influence on the coil current IL and the output voltage Vout.

Upon high level short-circuiting or when leak of the transistor M1 occurs, both the control signal SLP and the control signal OVP_DET can become the high level. When both of the control signals SLP and OVP_DET have the high level, the logic circuit LL performs the third control of executing a switching action and placing the clamp circuit 213 into an extended clamp state. At this time, if the signal Sig4 has the high level, then the reverse current forcing circuit 215 acts, and the value of the error voltage Vcmp is forcibly made Vmin2 irrespective of the error current signal I0 outputted from the amplifier AMP0. Even if the signal Sig4 has the low lever, since the output voltage Vout is in an overvoltage state, the amplifier AMP0 receiving the high feedback voltage Vfb acts to lower the error voltage Vcmp to the lower limit voltage value (Vmin2) in the extended clamp state. In other words, since, in the third control, a switching action is performed in such a mode that the coil current IL is performed to become negative current (typically, for example, such a switching action as to make the value of the coil current IL coincide with the lower limit current value Imin2), it is possible to eliminate or avoid the overvoltage state (an example of detailed action is indicated in the working example EX2_2 hereinafter described).

When an electric path that is to transmit a voltage according to the output voltage Vout is cut or the like (more particularly, for example, the resistor R1 is in an open-destroyed state and the feedback voltage Vfb is 0 V irrespective of the output voltage Vout), the control signal SLP and the control signal OVP_DET can become the low level and the high level, respectively. When the control signal SLP has the low level and the control signal OVP_DET has the high level, the logic circuit LL performs fourth control of executing a switching action and besides placing the clamp circuit 213 into an extended clamp state. Since "Vref2<Vref3 is satisfied," if the control signal SLP has the low level, then the signal Sig3 is also in a low level state. Therefore, the case in which the control signal SLP has the low level and the control signal OVP_DET has the high level is restricted only to a case in which the signal Sig4 becomes high level. Therefore, when the fourth control is performed, the reverse current forcing circuit 215 acts and the value of the error voltage Vcmp is forcibly made the lower limit voltage value Vmin2 irrespective of the error current signal I0 outputted from the amplifier AMP0. Therefore, in the fourth control, since a switching action is performed in a mode that permits the coil current IL to become negative current similarly as in the third control (typically, since a switching action is performed such that the value of the coil current IL becomes coincident with the lower limit current value Imin2), it is possible to eliminate or avoid an overvoltage state.

However, as an exception process, after the control signal OVP_DET switches from the high level to the low level (that is, after elimination of an overvoltage state is detected), until after a predetermined time period $t_{HLD}$ elapses, the logic circuit LL continues to execute the switching action and besides maintains the clamp circuit 213 in the extended clamp state irrespective of whether the level of the control signal SLP is the high level or the low level (operation/working effect of the exception process is indicated by the working example EX2_2 hereinafter described). If the predetermined time period $t_{HLD}$ elapses after the control signal OVP_DET switches from the high level to the low level, then the first to fourth controls are performed on the basis of the control signal SLP and the control signal OVP_DET as a rule.

The state in which the second control is being executed is equivalent to a state in which the switching action is stopped by the sleep control in the auto mode. Transition from the state in which the switching action is stopped by the second control (sleep control) to the state in which a switching action is started by the third control or the fourth control is equivalent to transition to the forced PWM mode. The transition timing to the forced PWM mode here may be equivalent to a transition timing to the forced PWM mode in any one of the working examples EX1_1 to EX1_6 (for example, the timing $T_{A1}$, $T_{B1}$, $T_{C1}$, or $T_{D1}$), and the state control of the switches relating to the transition is such as indicated in the working examples EX1_1 to EX1_6. Although it is estimated that, at the time of switching from the second control to the third control or the fourth control, the amplifier AMP1 acts to draw current reasonably, if the configuration and action indicated in any of the working examples EX1_1 to EX1_6 are used, then a switching action can be started with certainty within a specific period upon transition to the forced PWM mode. As a result, it is possible to eliminate an overvoltage state quickly (a particular example of action is indicated by the working example EX2_2).

Working Example EX2_2

The working example EX2_2 is described. In the working example EX2_2, specifically, a situation in which high level short-circuiting or leak of the transistor M1 occurs as a specific failure is assumed. The high level short-circuiting includes not only a situation in which the input terminal IN is short-circuited to the switch terminal SW or the output terminal OUT without the intervention of the transistor M1 but also a situation in which the input terminal IN is connected to the switch terminal SW or the output terminal OUT through a resistance component having some resistance value (for example, several tens Ω to several kilo Ω) without the intervention of the transistor M1. The leak of the transistor M1 indicates a failure that, although the transistor M1 is in an off state, non-ignorable current flows through the transistor M1 from the input terminal IN toward the switch terminal SW. It is to be noted that, in the working example EX2_2, the IC 200 does not receive a forced PWM mode designation signal for designating transition to the forced PWM mode from an external apparatus (microcomputer or the like not depicted) provided outside the switching power supply device 2.

FIG. 28 depicts an example of a waveform of the control signals SLP and OVP_DET together with presence/absence of a switching action of the like. As time passes, timings $T_{H1}$, $T_{H2}$, $T_{H3}$, and $T_{H4}$ come in this order. Before the timing $T_{H1}$, any failure including a specific failure does not occur, and both of the control signals SLP and OVP_DET have the low level. Thus, a switching action continues to be executed and the clamp circuit 213 is in the ordinary clamp state. However, due to the load LD being low or such a failure as high level short-circuiting, from between the control signals SLP and OVP_DET, only the control signal SLP is switched from the low level to the high level at the timing $T_{H1}$. Consequently, the logic circuit LL stops the switching action.

Although the low load control including stopping of the switching action normally suppresses a drop of the output voltage Vout until an overvoltage state is reached, in the example of FIG. 28, the control signal OVP_DET switches from the low level to the high level at the timing $T_{H2}$ from an influence of the high level short-circuiting or the like. Consequently, the logic circuit LL places the clamp circuit 213 into an extended clamp state at the timing $T_{H2}$ (or without a delay after the timing $T_{H2}$) to restart a switching action. At this time, since the value of the error voltage Vcmp changes toward the lower limit voltage value Vmin2, the switching action is performed such that negative coil current IL flows, and accordingly, drop of the output voltage Vout can be expected. In the example of FIG. 28, the control signal OVP_DET switches from the high level to the low level at the timing $T_{H3}$, and then, after the predetermined time period $t_{HLD}$ elapses, the timing $T_{H4}$ comes. In this case, between the timings $T_{H2}$ and $T_{H4}$, the switching action continues to be executed irrespective of the level of the control signal SLP and besides the clamp circuit 213 is kept in the extended clamp state. After the timing $T_{H4}$, the above-described first to fourth controls based on the control signal SLP and the control signal OVP_DET are performed. However, in the example of FIG. 28, after the timing $T_{H1}$, since the control signal SLP is kept in the high level by the continued low load state, the switching action is stopped at the timing $T_{H4}$. It is to be noted that, although FIG. 28 depicts an example in which the reverse current forcing circuit 215 acts between the timings $T_{H2}$ and $T_{H3}$, there is also a case in which the reverse current forcing circuit 215 does not act between the timings $T_{H2}$ and $T_{H3}$.

Figure 29:
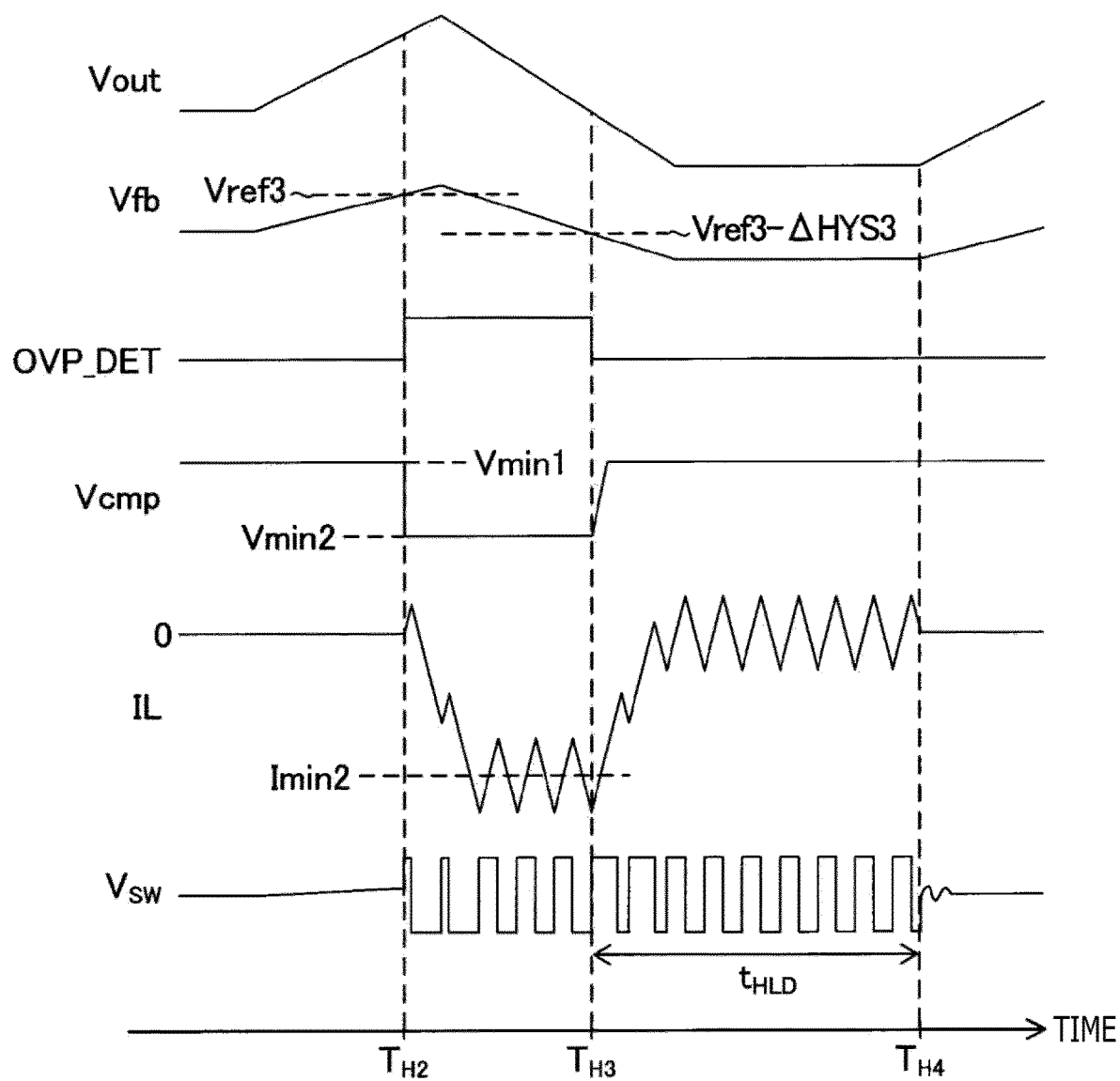
FIG. 29 is a waveform diagram illustrating signal waveforms when a specific failure occurs according to the second embodiment.

FIG. 29 depicts several signal waveforms during a period after the timing $T_{H1}$ of FIG. 28. It is to be noted that the waveforms depicted in FIG. 29 (especially waveforms of the coil current IL and the switch voltage Vsw) are schematic and may possibly be different from actual waveforms.

After the timing $T_{H1}$, usually, the output voltage Vout drops and an overvoltage state is not entered due to the low load control including stopping of the switching action. However, in the example of FIG. 29, the output voltage Vout gradually rises by an influence of high level short-circuiting or the like, and at the timing $T_{H2}$, the feedback voltage Vfb reaches the reference voltage Vref3 (or the output voltage Vout reaches the reference voltage Vref4), whereupon the control signal OVP_DET switches from the low level to the high level. It is to be noted that, after the timing $T_{H1}$ but before the timing $T_{H2}$ is reached, the switching action is stopped by the low load control based on the control signal SLP of the high level and the feedback voltage Vfb is reasonably high. Therefore, the error voltage Vcmp is lowered to the lower limit (Vmin1) of the ordinary variation range determined by the clamp circuit 213 by the amplifier AMP0. Since, between the timings $T_{H1}$ and $T_{H2}$, the switching action is stopped, the coil current IL is zero.

If the control signal OVP_DET switches from the low level to the high level at the timing $T_{H2}$, then the logic circuit LL places the clamp circuit 213 into an extended clamp state and restarts a switching action. At this time, the amplifier AMP0 acts, on the basis of the feedback voltage Vfb that is high corresponding to the output voltage Vout in an overvoltage state, so as to lower the error voltage Vcmp to the lower limit voltage value (Vmin2) in the extended clamp state. Alternatively, if the signal Sig4 has the high level, then the value of the error voltage Vcmp forcibly changes toward the lower limit voltage value Vmin2 by an action of the reverse current forcing circuit 215. In any case, the value of the error voltage Vcmp changes toward the lower limit voltage value Vmin2 rapidly. Consequently, by the switching action from the timing $T_{H2}$, negative current flows to the coil L1 and the output voltage Vout and the feedback voltage Vfb gradually drop (however, it possibly occurs that the output voltage Vout and the feedback voltage Vfb transiently rise only for a small period of time immediately after the timing $T_{H2}$).

In the example of FIG. 29, since the value of the error voltage Vcmp is set to the lower limit voltage value Vmin2 immediately after the timing $T_{H2}$, a switching action is restarted in a state in which the on-duty is sufficiently low. Then, after a transient response when the coil current IL gradually decreases toward the lower limit current value Imin2 corresponding to the lower limit voltage value Vmin2, the coil current IL is stabilized substantially at the lower limit current value Imin2, and thereafter, at the timing $T_{H3}$, the feedback voltage Vfb drops to a voltage lower than the voltage (Vref3−ΔHYS3).

Consequently, the signal Sig3 switches from the high level to the low level at the timing $T_{H3}$. Further, at the timing $T_{H3}$, the signal Sig4 also has the low level. Therefore, at the timing $T_{H3}$, the control signal OVP_DET switches from the high level to the low level, and thereafter, the timing $T_{H4}$ comes after lapse of the predetermined time period tHLD. Between the timings $T_{H2}$ and $T_{H4}$, the switching action continues to be executed and the clamp circuit 213 is kept in the extended clamp state irrespective of the level of the control signal SLP. Together with the drop of the output voltage Vout between the timings $T_{H2}$ and $T_{H3}$, the signal Sig4 has the low level between the timings $T_{H3}$ and $T_{H4}$ and the reverse current forcing circuit 215 does not act. Therefore, the output feedback control for stabilizing the output voltage Vout at a desired target voltage Vtg (output feedback control by which the error voltage Vcmp is determined in response to the output voltage Vout) functions. Therefore, the coil current IL rises after the start point given by the lower limit current value Imin2.

In the example of FIG. 29, it is supposed that the current flowing into the capacitor C1 from the input terminal IN by high level short-circuiting or leak of the transistor M1 and the current flow to the load LD from the capacitor C1 are substantially equal to each other. Therefore, after the transient response immediately after the timing $T_{H3}$, at least immediately before the timing $T_{H4}$, the coil current IL is stabilized in the proximity of zero (this is because, as the coil current IL comes near to zero, the output voltage Vout is stabilized at the target voltage Vtg).

After the timing $T_{H4}$, the first to fourth controls based on the control signal SLP and the control signal OVP_DET are performed. However, in the example of FIG. 29 (also refer to FIG. 28 corresponding to FIG. 29), it is supposed that, after the timing $T_{H1}$, the control signal SLP is kept at the high level by the continued low load state, and therefore, the switching action is stopped at the timing $T_{H4}$. Although different from the example of FIG. 29, if the control signal SLP is already in the low level state at the timing $T_{H4}$, then the switching action continues to be executed also after the timing $T_{H4}$.

As in the present working example, by lowering, at the time of detection of an overvoltage state, the error voltage Vcmp forcibly to a lower limit value Vmin corresponding to the negative coil current IL and restarting a switching action (by switching the control from the stopped control of the switching action by the low load control to the PWM control), the output voltage Vout can be lowered to eliminate the overvoltage state.

However, when the negative coil current IL is supplied, if the absolute value of the coil current IL is made excessively high, then there is the possibility that the coil L1 and the transistor M2 may be deteriorated, and therefore, the magnitude of the current to be drawn from the capacitor C1 should be restricted appropriately. In this regard, in the switching power supply device 2, since the error voltage Vcmp for supplying negative coil current IL is set appropriately (since the lower limit voltage value Vmin2 is determined such that such deterioration as described above does not occur), such deterioration as described above can be suppressed.

Further, if the switching action is stopped at the timing $T_{H3}$, then the switching action is stopped in a state in which the absolute value of the coil current IL is high. At this time, the coil current IL having the high absolute value flows into the input terminal IN through a parasitic diode formed in parallel between the source and the drain of the transistor M1. However, supplying such high current to the parasitic diode damages the transistor M1 and causes deterioration of the transistor M1. Further, the flow of high current through the parasitic diode can have a disadvantageous influence also on circuit action around the transistor M1 in the IC 200 (disadvantageous parasitic action possibly occurs). By switching the control to the low load control after the predetermined time period $t_{HLD}$ elapses after the control signal OVP_DET switches from the high level to the low level as described above, degradation of the transistor and parasitic action can be prevented.

In the examples of action of FIGS. 28 and 29, the situation after the timing $T_{H1}$ to a timing immediately before the timing $T_{H2}$ is equivalent to the situation in which the switching action is stopped by the sleep control in the auto mode. Then, it can be considered that the control mode transits to the forced PWM mode at the timing $T_{H2}$. The transition timing to the forced PWM mode here may be equivalent to the transition timing to the forced PWM mode in any one of the working examples EX1_1 to EX1_6 (for example, the timing $T_{A1}$, $T_{B1}$, $T_{C1}$, or $T_{D1}$), and the state control of the switches relating to the transition is such as indicated in the working examples EX1_1 to EX1_6. Although it is estimated that the amplifier AMP1 acts to reasonably draw current at and immediately after the timing $T_{H2}$, if the configuration and the action indicated by any of the working examples EX1_1 to EX1_6 are used, then it is possible to start a switching action with certainty within a specific period upon transition to the forced PWM mode. As a result, an overvoltage state can be eliminated rapidly.

It is to be noted that, where only such a case that a feedback voltage Vfb according to the output voltage Vout is inputted to the IC 200 as in the examples of action of FIGS. 28 and 29 is taken into consideration, the reverse current forcing circuit 215 may not be essential, and also the overvoltage detection comparator CMP4 can be omitted. However, in the case where such a failure that the resistor R1 is open-destroyed or brought out of a pattern occurs, even if the output voltage Vout becomes an overvoltage, the signal Sig3 does not change to the high level and the feedback voltage Vfb becomes 0 V. Therefore, the amplifier AMP0 outputs a current signal I0 in a direction in which the error voltage Vcmp is increased. Taking this into consideration, in the IC 200, in order to detect presence or absence of an overvoltage by using also an output of the comparator CMP4, when the output signal Sig4 of the comparator CMP4 has the high level, the reverse current forcing circuit 215 is rendered operative in preparation for the possibility that the feedback voltage Vfb may be 0 V or the like.

Working Example EX2_3

The working example EX2_3 is described. In the IC 100 of FIG. 1 and the IC 200 of FIG. 24, the switch SW0 is a feedback path switch inserted in a feedback path for propagating a signal according to the feedback voltage Vfb to the comparator CMP1. It is also possible to modify the insertion position of the switch SW0 from that described hereinabove in the feedback path.

Figure 30:
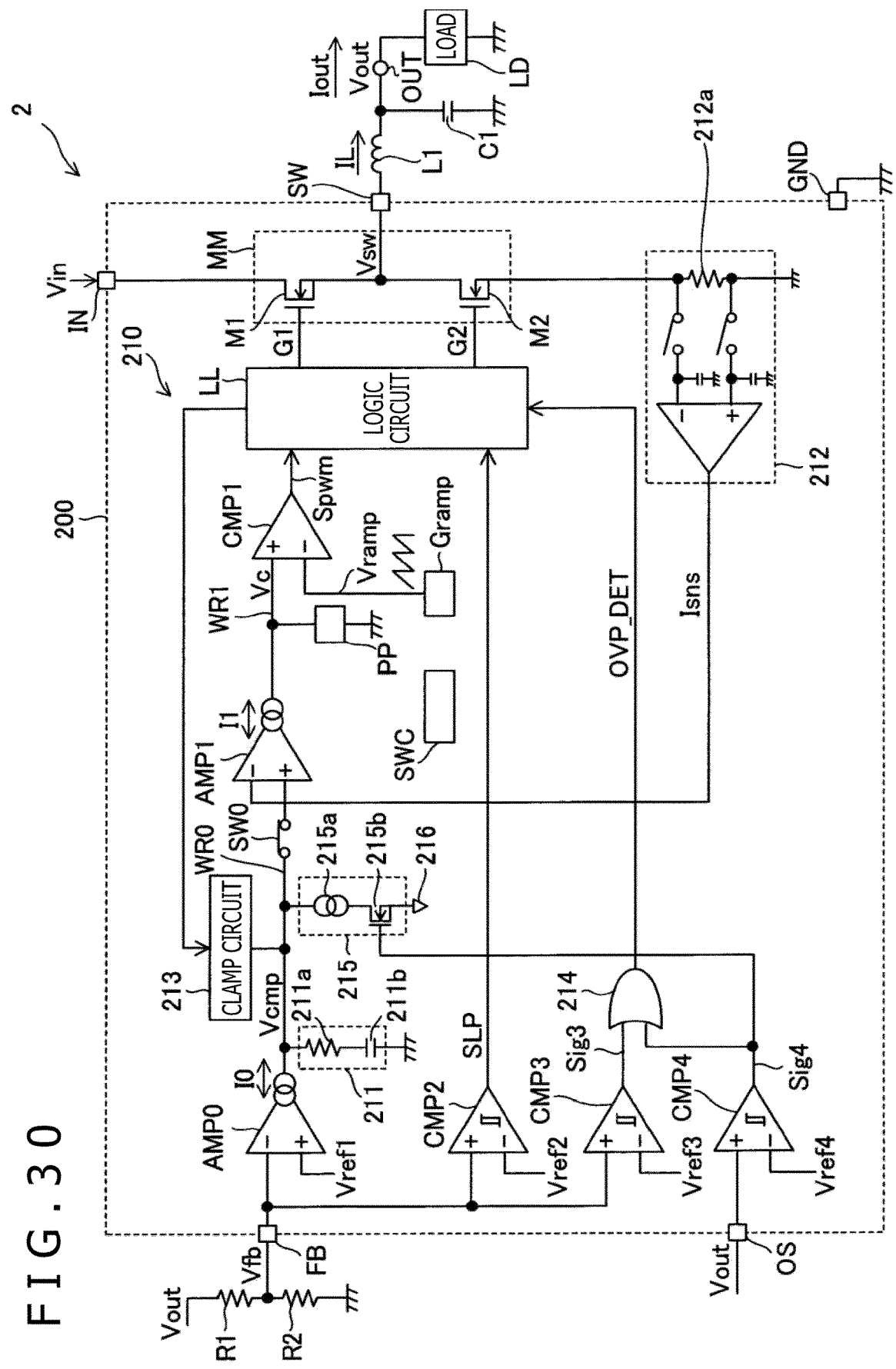
FIG. 30 is a block diagram of an overall modified switching power supply device according to the second embodiment.

For example, such modified configuration of the IC 200 as depicted in FIG. 30 may be adopted. In the modified configuration of the IC 200 depicted in FIG. 30, only the insertion position of the switch SW0 is modified with reference to the IC 200 of FIG. 24. In particular, as depicted in FIG. 30, in the modified configuration of the IC 200, the amplifier AMP1 is connected at the output terminal thereof directly to the non-negated input terminal of the comparator CMP1 through the wire WR1 while the switch SW0 is inserted in series in the wire WR0. More particularly, the switch SW0 is inserted in series between a node with which the output terminal of the amplifier AMP0, the resistor 211a, and the constant current circuit 215a are connected in common and the non-negated input terminal of the amplifier AMP1.

To the modified configuration of the IC 200 of FIG. 30, the technology according to any one of the working examples EX1_1 to EX1_3, that is, the first method of setting, within a specific period, the switch SW0 to off and setting a voltage within the variation range of the ramp voltage Vramp (for example, a voltage according to the output voltage Vout within the variation range of the ramp voltage Vramp) to the initial voltage for the contrast voltage Vc, can be applied. In this case, a circuit for forcibly setting the potentials at the non-negated input terminal and the negated input terminal of the amplifier AMP1 during the specific period to an equal potential is additionally provided in the modified configuration of the IC 200 such that, during the specific period, the switch SW0 is controlled off and the additionally provided circuit is used to forcibly set the potentials at the non-negated input terminal and the negated input terminal of the amplifier AMP1 to an equal potential. Consequently, since the amplifier AMP1 does not perform inputting and outputting of current during the specific period, the voltage (for example, "k×Vout") generated at a predetermined node (for example, the node ND10 or the node ND20) in the phase compensation circuit PP during the specific period can be set as the initial voltage for the contrast voltage Vc through a phase compensation resistance section (for example, the resistor R10 or the resistor R20). As a result, a switching action can be started with certainty at the same time with switching of the control mode. Thus, by starting a switching action with an optimum on-duty Don, an overshoot and an undershoot can be prevented. The switch SW0 of FIG. 30 (the switch SW0 inserted in series in the wire WR0) is switched from off to on at the time of the end of the specific period.

Third Embodiment

The third embodiment of the present disclosure is described. In the description of the third embodiment, a technology that can be carried out in combination with the first or second embodiment or a modified technology applicable to the first and second embodiments is described. The third embodiment includes the following working examples EX3_1 to EX3_3 that can be combined with each other.

Working Example EX3_1

Figure 31A:
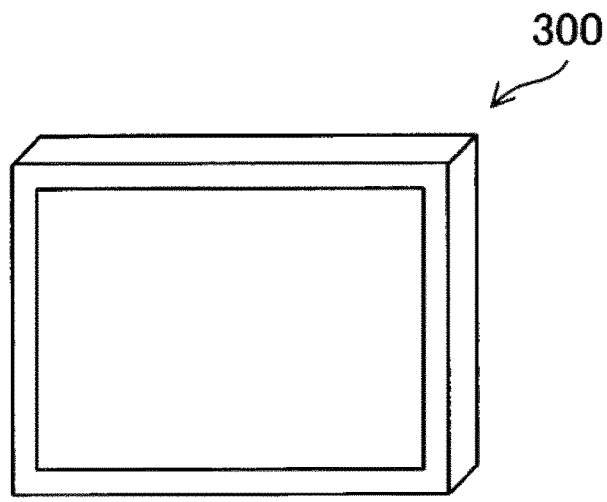
FIGS. 31A and 31B are an appearance view and a block diagram of a general configuration, respectively, of a car navigation apparatus according to a third embodiment of the present disclosure.
Figure 31B:
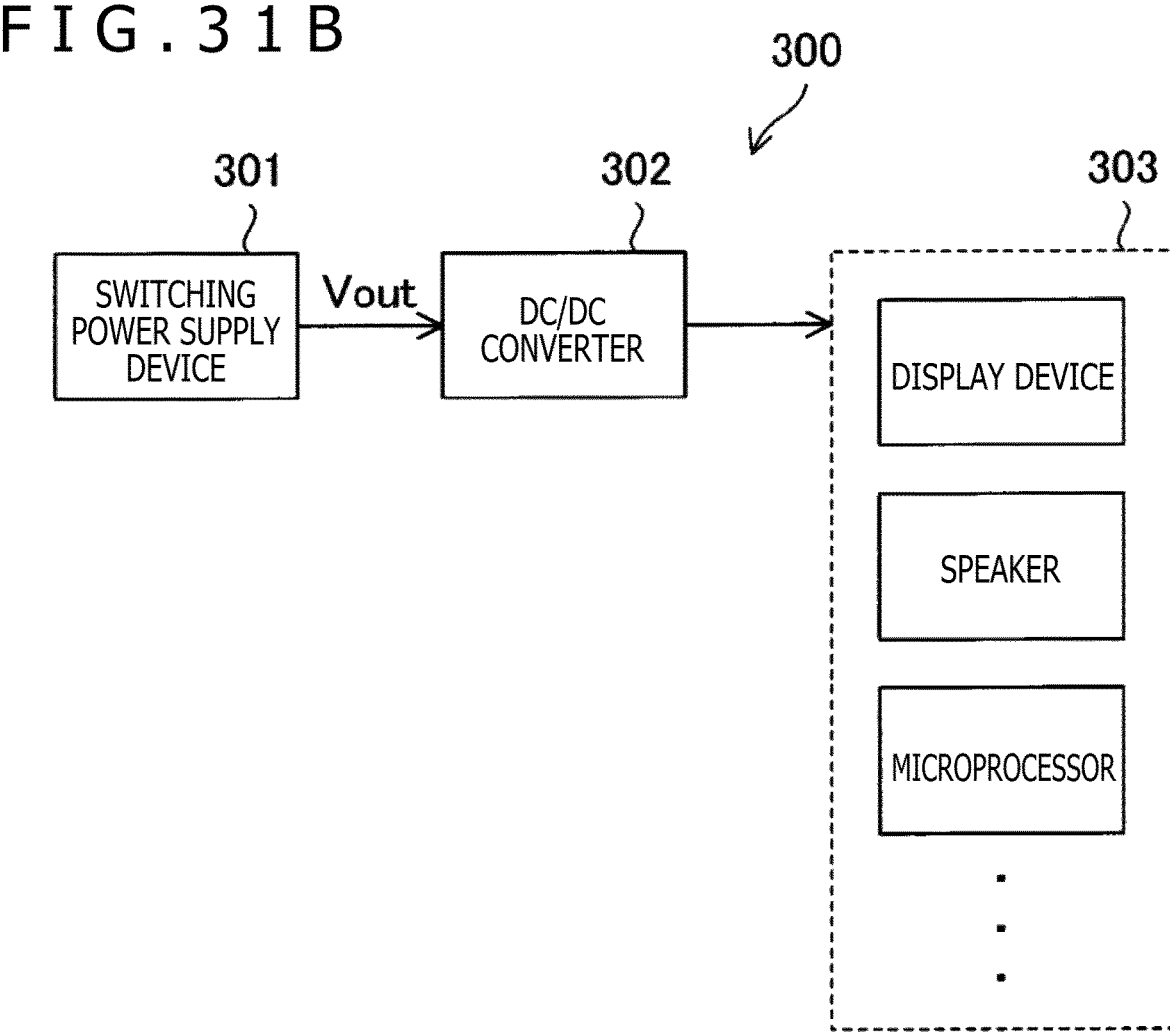

The working example EX3_1 is described. FIG. 31A is an appearance view of a car navigation apparatus 300 according to the working example EX3_1, and FIG. 31B is a block diagram of a general configuration of the car navigation apparatus 300. The car navigation apparatus 300 includes a switching power supply device 301, a DC/DC converter 302, and a function block 303. As the switching power supply device 301, the switching power supply device 1 or 2 described hereinabove is used. An input voltage Vin to the switching power supply device 301 may be supplied from a battery provided on a vehicle in which the car navigation apparatus 300 is incorporated. The DC/DC converter 302 converts an output voltage Vout of the switching power supply device 301 to one or more DC voltages having desired voltage values and supplies the resulting DC voltages to the function block 303. The function block 303 acts on the basis of the DC voltages supplied thereto from the DC/DC converter 302. The function block 303 includes a plurality of components that implements functions of the car navigation apparatus 300 and includes a display unit, a speaker, a microprocessor and so forth. It is to be noted that the output voltage of the switching power supply device 301 may possibly be supplied directly to the function block 303.

It can be considered that, in the car navigation apparatus 300, the DC/DC converter 302 and the function block 303 are the load LD of the switching power supply device 301. Naturally, the switching power supply device 1 or 2 may be incorporated not only in a car navigation apparatus but also in any apparatus that includes any load LD.

Working Example EX3_2

The working example EX3_2 is described. In the IC 100 and the IC 200, it is also possible to directly input the output voltage Vout to the feedback terminal FB. In this case, the feedback voltage Vfb is the output voltage Vout itself. Even if the feedback voltage Vfb is the output voltage Vout itself, the feedback voltage Vfb still is a feedback voltage according to the output voltage Vout.

Working Example EX3_3

The working example EX3_3 is described.
The circuit elements of the IC 100 and the IC 200 are formed in the form of a semiconductor integrated circuit, and a semiconductor device is configured by sealing such semiconductor integrated circuit in a housing (package) including resin. However, a plurality of discrete parts may be used to configure a circuit equivalent to a circuit in the IC 100 or the IC 200. Several circuit elements described hereinabove that are described as being included in the IC 100 or the IC 200 (for example, the transistors M1 and M2) may be provided outside the IC 100 or the IC 200 and externally connected to the IC 100 or the IC 200.

In regard to any signal or voltage, the relation between the high level and the low level may be reversed as long as the purpose described hereinabove is not undermined.

The transistor M1 may otherwise include a P-channel MOSFET. In this case, the voltage level to be supplied to the gate of the transistor M1 is modified from that described above such that the switching action described hereinabove can be implemented. Further, the channel type of any FET can be changed optionally.

Each of the transistors described hereinabove may be any type. For example, it is also possible to replace a transistor described hereinabove as a MOSFET with a junction type FET, an insulated gate bipolar transistor (IGBT), or a bipolar transistor. Any transistor has a first electrode, a second electrode, and a control electrode. In an FET, one of the first and second electrodes is the drain and the other is the source, and the control electrode is the gate. In an IGBT, one of the first and second electrodes is the collector and the other is the emitter, and the control electrode is the gate. In a bipolar transistor that does not belong to an IGBT, one of the first and second electrodes is the collector and the other is the emitter, and the control electrode is the base.

《Consideration of the Present Disclosure》

The present disclosure embodied by the embodiments described above is considered.

A switching power supply device $W_A$ according to an aspect of the present disclosure includes an output stage circuit (MM) for generating an output voltage (Vout) from an input voltage (Vin) by a switching action and a main control circuit (110, 210) capable of executing PWM control of controlling the output stage circuit to perform a switching action on the basis of a feedback voltage (Vfb) according to the output voltage or sleep control of stopping the switching action of the output stage circuit. The main control circuit includes a contrast voltage generation section (AMP1 and so forth) configured to generate a contrast voltage (Vc) according to the feedback voltage in the PWM control, and a PWM comparator (CMP1) configured to compare the contrast voltage with a ramp voltage (Vramp), which has a voltage value that changes periodically, in the PWM control, and causes the output stage circuit to perform a switching action on the basis of a result of the comparison of the PWM comparator in the PWM control. The main control circuit further includes a feedback path switch (SW0) inserted in a feedback path for propagating a signal according to the feedback voltage to the PWM comparator, and causes, when switching from the sleep control to the PWM control is to be performed, the contrast voltage generation section to control the contrast voltage by controlling, within a specific period (for example, between the timings $T_{A1}$ and $T_{A2}$ of FIG. 10 or between the timings $T_{B1}$ and $T_{B2}$ of FIG. 14) equal to one or more periods of the PWM control, the feedback path switch off while setting a voltage within a variation range of the ramp voltage as an initial voltage for the contrast voltage to thereby start a switching action and then controlling the feedback path switch on after the specific period.

When switching to the PWM control is to be performed in an alternative configuration that does not include the feedback path switch, depending upon the output voltage at the timing of switching to the PWM control, the initial voltage for the contrast voltage is displaced from an ideal one. Alternatively, there is also the possibility that the contrast voltage may go out of the variation range of the ramp voltage to thereby disable starting of a switching action. According to the switching power supply device $W_A$, after switching to the PWM control, a switching action can be started immediately and with certainty, and by starting a switching action with an optimum on-duty, an overshoot and an undershoot can be prevented.

It is to be noted that, in the IC 100 of FIG. 1, the contrast voltage generation section of the switching power supply device $W_A$ includes the amplifier AMP1 (similarly, this also applies to a switching power supply device $W_B$ hereinafter described). In the IC 200 of FIG. 24, the contrast voltage generation section of the switching power supply device $W_A$ includes the amplifier AMP1 and a part or parts provided in the amplifier AMP1 and between the feedback terminal FB and the amplifier AMP1 (the amplifier AMP0 and the circuits 211, 213, and 215) (similarly, this also applies to the switching power supply device $W_B$ hereinafter described). It may be interpreted that also the phase compensation circuit PP is included as a component of the contrast voltage generation section.

In particular, for example, the switching power supply device $W_A$ may be configured such that the main control circuit includes a phase compensation circuit (PP) connected to a specific wire (WR1), which is interposed between the PWM comparator and the feedback path switch and to which the contrast voltage is applied, and configured to compensate for the phase of the contrast voltage, and a transition controlling circuit (SWC). The transition controlling circuit controls, during the specific period, the feedback path switch off and controls the phase compensation circuit to generate a voltage within the variation range of the ramp voltage and apply the generated voltage as the initial voltage for the contrast voltage to the specific wire through the phase compensation circuit.

Figure 24:
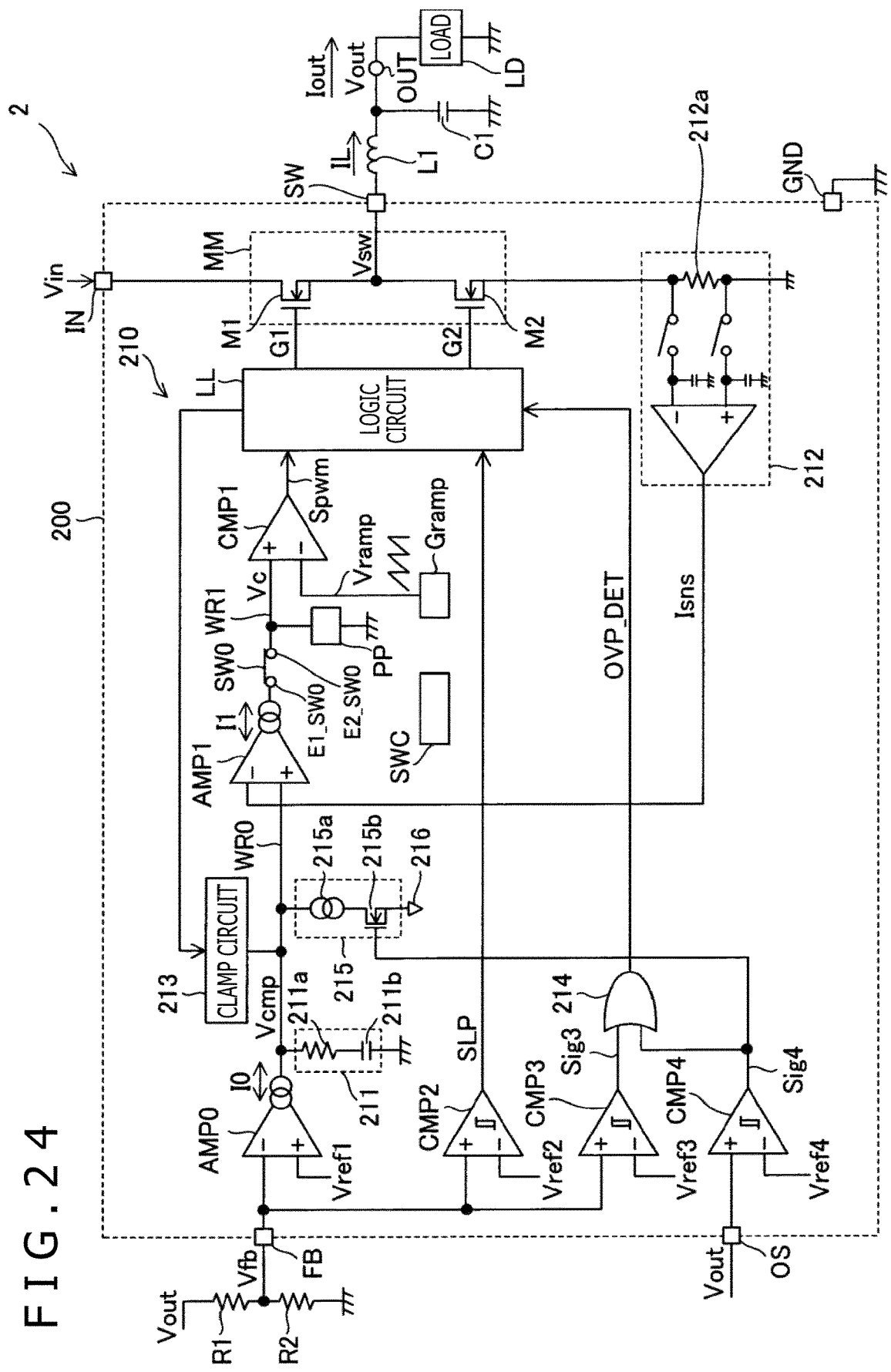
FIG. 24 is a block diagram of an overall switching power supply device according to a second embodiment of the present disclosure.

In the configuration of FIG. 1 or 24, the switch controlling circuit SWC takes charge of a function of the transition controlling circuit of the switching power supply device $W_A$ (similarly, this also applies to the switching power supply device $W_B$.)

More particularly, for example, the switching power supply device $W_A$ may be configured such that the phase compensation circuit includes a phase compensation capacitance section (for example, C11 and C12 or C21 and C22) including a plurality of capacitors and connected to a predetermined node (for example, ND10 or ND20), and a phase compensation resistance section (for example, R10 or R20) provided between the specific wire and the predetermined node. The transition controlling circuit controls, during the specific period, the feedback path switch off and controls the predetermined node to generate a voltage within the variation range of the ramp voltage and apply the generated voltage as the initial voltage for the contrast voltage to the specific wire through the phase compensation resistance section.

A switching power supply device $W_B$ according to another aspect of the present disclosure includes an output stage circuit (MM) for generating an output voltage (Vout) from an input voltage (Vin) by a switching action and a main control circuit (110, 210) capable of executing PWM control of controlling the output stage circuit to perform a switching action on the basis of a feedback voltage (Vfb) according to the output voltage or sleep control of stopping the switching action of the output stage circuit. The main control circuit includes a contrast voltage generation section (AMP1 and so forth) configured to generate a contrast voltage (Vc) in response to the feedback voltage in the PWM control, a PWM comparator (CMP1) configured to compare the contrast voltage with a ramp voltage (Vramp), which has a voltage value that changes periodically, in the PWM control, and a phase compensation circuit (PP) connected to a specific wire (WR1) to which the contrast voltage is applied and configured to compensate for a phase of the contrast voltage, and causes the output stage circuit to perform a switching action on the basis of a result of the comparison of the PWM comparator in the PWM control. The phase compensation circuit includes a phase compensation resistance section and a phase compensation capacitance section, and, when switching from the sleep control to the PWM control is to be performed, the main control circuit sets, while temporarily decreasing, a resistance value of the phase compensation resistance section from a predetermined resistance value within a specific period (for example, between the timings $T_{C1}$ and $T_{C2}$ of FIG. 18 or between the timings $T_{D1}$ and $T_{D2}$ of FIG. 21) equal to or longer than one period of the PWM control, a voltage within a variation range of the ramp voltage as an initial voltage for the contrast voltage to start a switching action and returns the resistance value of the phase compensation resistance section to the predetermined resistance value after the specific period.

Upon switching to the PWM control, depending upon the output voltage at the time of switching to the PWM control, the input/output current of the contrast voltage generation section according to the feedback voltage (input/output current from/to the specific wire) sometimes becomes reasonably great. If, in such a virtual configuration in which such a specific period is not provided as described above, the input/output current of the contrast voltage generation section (input/output current from/to the specific wire) at the time of switching becomes reasonably great, then the voltage drop of the phase compensation resistance section also becomes great. As a result, the initial voltage for the contrast voltage is displaced from an ideal one. Alternatively, also there is the possibility that the contrast voltage may go out of the variation range of the ramp voltage and a switching action may not be started. According to the switching power supply device $W_B$, such disadvantages can be eliminated or suppressed by temporarily decreasing the resistance value of the phase compensation resistance section at the time of switching to the PWM control. In short, according to the switching power supply device $W_B$, at the time of switching to the PWM control, a switching action can be started immediately and with certainty, and by starting a switching action with an optimum on-duty, an overshoot and an undershoot can be prevented.

In particular, for example, the switching power supply device $W_B$ may be configured such that the main control circuit includes a transition controlling circuit (SMC) configured to control the phase compensation circuit to generate, within the specific period, a voltage within the variation range of the ramp voltage and apply the generated voltage as an initial voltage for the contrast voltage to the specific wire through the phase compensation circuit.

More particularly, for example, the switching power supply device $W_B$ may be configured such that the phase compensation capacitance section (for example, C11 and C12 or C21 and C22) is connected to a predetermined node (for example, ND10 or ND20), the phase compensation resistance section (for example, R10 or R20) is provided between the specific wire and the predetermined node, and the transition controlling circuit causes a voltage within the variation range of the ramp voltage to be generated at the predetermined node during the specific period and causes the generated voltage to be applied as the initial voltage for the contrast voltage to the specific wire through the phase compensation resistance section.

Further, the switching power supply device $W_A$ or $W_B$ may be configured such that the contrast voltage generation section includes an amplifier (AMP1) configured to input and output current from and to the specific wire on the basis of the feedback voltage (Vfb) or on the basis of a signal (Vcmp) generated according to the feedback voltage in the PWM control.

The embodiments of the present disclosure can be suitably changed in various manners within the technical scope specified in claims. The foregoing embodiments are examples of the embodiment of the present disclosure to the last, and the significance of the terms in the present disclosure and the features of the present disclosure are not limited to those described in connection with the embodiments described above. Particular numerical values presented in the description given above are mere exemplification and can naturally be altered to various numerical values.

What is claimed is:

1. A switching power supply device comprising:
   an output stage circuit that generates an output voltage from an input voltage by a switching action; and
   a main control circuit that is capable of executing pulse width modulation control of controlling the output stage circuit to perform a switching action on a basis of a feedback voltage according to the output voltage or sleep control of stopping the switching action of the output stage circuit, wherein
   the main control circuit includes
      a contrast voltage generation section configured to generate a contrast voltage according to the feedback voltage in the pulse width modulation control, and
      a pulse width modulation comparator configured to compare the contrast voltage with a ramp voltage, the ramp voltage having a voltage value that changes periodically, in the pulse width modulation control, and
   causes the output stage circuit to perform a switching action on a basis of a result of the comparison of the pulse width modulation comparator in the pulse width modulation control, and
   the main control circuit further includes a feedback path switch inserted in a feedback path for propagating a signal according to the feedback voltage to the pulse width modulation comparator, and causes, when switching from the sleep control to the pulse width modulation control is to be performed, the contrast voltage generation section to control the contrast voltage by controlling, within a specific period equal to one or more cycles of the pulse width modulation control, the feedback path switch off and setting a voltage within a variation range of the ramp voltage as an initial voltage for the contrast voltage to thereby start a switching action and then controlling the feedback path switch on after the specific period.

2. The switching power supply device according to claim 1, wherein
   the main control circuit includes a phase compensation circuit connected to a specific wire, the specific wire being interposed between the pulse width modulation comparator and the feedback path switch and being applied the contrast voltage, and configured to compensate for a phase of the contrast voltage, and a transition controlling circuit, and
   the transition controlling circuit controls, during the specific period, the feedback path switch off and controls the phase compensation circuit to generate a voltage within the variation range of the ramp voltage and applies the generated voltage as an initial voltage for the contrast voltage to the specific wire through the phase compensation circuit.

3. The switching power supply device according to claim 2, wherein
   the phase compensation circuit includes
      a phase compensation capacitance section including a plurality of capacitors and connected to a predetermined node, and
      a phase compensation resistance section provided between the specific wire and the predetermined node, and
   the transition controlling circuit controls, during the specific period, the feedback path switch off, and controls the predetermined node to generate a voltage within the variation range of the ramp voltage and applies the generated voltage as the initial voltage for the contrast voltage to the specific wire through the phase compensation resistance section.

4. The switching power supply device according to claim 3, wherein
   the phase compensation circuit further includes a switch group including a plurality of switches whose state is controlled by the transition controlling circuit,
   the phase compensation capacitance section includes a first capacitor connected at a first end thereof to a ground and at a second end thereof to the predetermined node, and a second capacitor connected at a first end thereof to the ground, and
   the switch group includes a first switch connected in parallel to the first capacitor and a second switch that switchably connects a second end of the second capacitor to an application end of the output voltage or the predetermined node.

5. The switching power supply device according to claim 4, wherein
   the transition controlling circuit
      controls, when the sleep control is performed, the first switch on and sets a connection destination of the second end of the second capacitor through the second switch to the application end of the output voltage to charge the second capacitor by using the output voltage, and
      switches, when switching from the sleep control to the pulse width modulation control is to be performed, the first switch from on to off and switches the connection destination of the second end of the second capacitor through the second switch to the predetermined node such that a voltage according to the output voltage is generated as the voltage within the variation range of the ramp voltage in the predetermined node during the specific period.

6. The switching power supply device according to claim 3, wherein
   the phase compensation circuit further includes a switch group including a plurality of switches whose state is controlled by the transition controlling circuit,
   the phase compensation capacitance section includes a first capacitor connected at a first end thereof to a ground and at a second end thereof to the predetermined node, and a second capacitor connected at a first end thereof to the predetermined node, and the switch group includes a first switch connected in parallel to the first capacitor and a second switch configured to switchably connect a second end of the second capacitor to an application end of the output voltage or the ground.

7. The switching power supply device according to claim 6, wherein the main control circuit controls, when the sleep control is performed, the first switch on and sets the connection destination of the second end of the second capacitor through the second switch to the ground, and switches, when switching from the sleep control to the pulse width modulation control is to be performed, the first switch from on to off and switches the connection destination of the second end of the second capacitor through the second switch to the application end of the output voltage to cause a voltage according to the output voltage during the specific period to be generated as the voltage within the variation range of the ramp voltage by the predetermined node.

8. The switching power supply device according to claim 2, wherein the contrast voltage generation section includes an amplifier configured to input and output current from and to the specific wire on a basis of the feedback voltage or on a basis of a signal generated according to the feedback voltage in the pulse width modulation control.

9. A switching power supply device comprising:

an output stage circuit that generates an output voltage from an input voltage by a switching action; and a main control circuit that is capable of executing pulse width modulation control of controlling the output stage circuit to perform a switching action on a basis of a feedback voltage according to the output voltage or sleep control of stopping the switching action of the output stage circuit, wherein the main control circuit includes a contrast voltage generation section configured to generate a contrast voltage according to the feedback voltage in the pulse width modulation control, a pulse width modulation comparator configured to compare the contrast voltage with a ramp voltage, the ramp voltage having a voltage value that changes periodically, in the pulse width modulation control, and a phase compensation circuit connected to a specific wire to which the contrast voltage is applied and configured to compensate for a phase of the contrast voltage, and causes the output stage circuit to perform a switching action on a basis of a result of the comparison of the pulse width modulation comparator in the pulse width modulation control, the phase compensation circuit includes a phase compensation resistance section and a phase compensation capacitance section, and when switching from the sleep control to the pulse width modulation control is to be performed, the main control circuit sets, while temporarily decreasing a resistance value of the phase compensation resistance section from a predetermined resistance value within a specific period equal to or longer than one period of the pulse width modulation control, a voltage within a variation range of the ramp voltage as an initial voltage for the contrast voltage to start a switching action and returns the resistance value of the phase compensation resistance section to the predetermined resistance value after the specific period.

10. The switching power supply device according to claim 9, wherein the main control circuit includes a transition controlling circuit configured to control the phase compensation circuit to generate, within the specific period, a voltage within the variation range of the ramp voltage and apply the generated voltage as an initial voltage for the contrast voltage to the specific wire through the phase compensation circuit.

11. The switching power supply device according to claim 10, wherein the phase compensation capacitance section is connected to a predetermined node, the phase compensation resistance section is provided between the specific wire and the predetermined node, and the transition controlling circuit causes a voltage within the variation range of the ramp voltage to be generated at the predetermined node during the specific period and causes the generated voltage to be applied as the initial voltage for the contrast voltage to the specific wire through the phase compensation resistance section.

12. The switching power supply device according to claim 11, wherein the phase compensation circuit further includes a switch group including a plurality of switches whose state is controlled by the transition controlling circuit, the phase compensation capacitance section includes a first capacitor connected at a first end thereof to a ground and at a second end thereof to the predetermined node, and a second capacitor connected at a first end thereof to the ground, the switch group includes a first switch connected in parallel to the first capacitor, a second switch configured to switchably connect a second end of the second capacitor to an application end of the output voltage or the predetermined node, and a third switch connected in parallel to a resistor provided between the specific wire and the predetermined node, the phase compensation resistance section includes a parallel circuit of the resistor and the third switch, and the predetermined resistance value is a resistance value of the resistor, and the resistance value of the phase compensation resistance section decreases from the predetermined resistance value when the third switch is switched on.

13. The switching power supply device according to claim 12, wherein the transition controlling circuit controls, when the speed control is performed, the first switch on and sets a connection destination of the second end of the second capacitor through the second switch to the application end of the output voltage to charge the second capacitor by using the output voltage, switches, when switching from the sleep control to the pulse width modulation control is to be performed, the first switch from on to off and switches the connection destination of the second end of the second capacitor through the second switch to the predetermined node to cause a voltage according to the output voltage to be generated as the voltage in the variation range of the ramp voltage at the predetermined node during the specific period, and switches the third switch on within the specific period to cause the resistance value of the phase compensation resistance section generated by the parallel circuit of the resistor and the third switch to be made lower than the predetermined voltage value and then switches, after the specific period, the third switch off to set the resistance value of the resistor as the resistance value of the phase compensation resistance section.

14. The switching power supply device according to claim 11, wherein the phase compensation circuit further includes a switch group including a plurality of switches whose state is controlled by the transition controlling circuit, the phase compensation capacitance section includes a first capacitor connected at a first end thereof to a ground and at a second end thereof to the predetermined node, and a second capacitor connected at a first end thereof to the predetermined node, the switch group includes a first switch connected in parallel to the first capacitor, a second switch configured to switchably connect a second end of the second capacitor to an application end of the output voltage or the ground, and a third switch connected in parallel to a resistor provided between the specific wire and the predetermined node, the phase compensation resistance section includes the parallel circuit of the resistor and the third switch, and the predetermined resistance value is a resistance value of the resistor and the resistance value of the phase compensation resistance section decreases from the predetermined resistance value when the third switch is controlled on.

15. The switching power supply device according to claim 14, wherein the main control circuit controls, when the sleep control is performed, the first switch on and sets the connection destination of the second end of the second capacitor through the second switch to the ground, switches, when switching from the sleep control to the pulse width modulation control is to be performed, the first switch from on to off and switches the connection destination of the second end of the second capacitor through the second switch to the application end of the output voltage to cause a voltage according to the output voltage to be generated as the voltage within the variation range of the ramp voltage at the predetermined node within the specific period, and switches the third switch on within the specific period to cause the resistance value of the phase compensation resistance section generated by the parallel circuit of the resistor and the third switch to be made lower than the predetermined voltage value and then switches, after the specific period, the third switch off to set the resistance value of the resistor as the resistance value of the phase compensation resistance section.

16. The switching power supply device according to claim 9, wherein the contrast voltage generation section includes an amplifier configured to input and output current from and to the specific wire on a basis of the feedback voltage or on a basis of a signal generated according to the feedback voltage in the pulse width modulation control.

17. The switching power supply device according to claim 1, wherein the main control circuit sets the specific period when switching from the sleep control to the pulse width modulation control is to be performed on a basis of a signal from an external apparatus provided outside the switching power supply device.

18. The switching power supply device according to claim 1, wherein the main control circuit further includes an overvoltage detection circuit configured to detect whether or not the output voltage is in an overvoltage state on a basis of the feedback voltage or the output voltage, and performs, when the overvoltage state is detected while the switching action of the output stage circuit is stopped by the sleep control, switching from the speed control to the pulse width modulation control and sets the specific period at the time of the switching.

* * * * *